US011933951B2

(12) United States Patent
Umeda

(10) Patent No.: US 11,933,951 B2
(45) Date of Patent: Mar. 19, 2024

(54) VARIABLE MAGNIFICATION OPTICAL SYSTEM, OPTICAL APPARATUS, AND METHOD FOR PRODUCING VARIABLE MAGNIFICATION OPTICAL SYSTEM

(71) Applicant: Nikon Corporation, Tokyo (JP)

(72) Inventor: Takeshi Umeda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 17/393,379

(22) Filed: Aug. 3, 2021

(65) Prior Publication Data

US 2021/0373302 A1 Dec. 2, 2021

Related U.S. Application Data

(63) Continuation of application No. 16/645,484, filed as application No. PCT/JP2017/032693 on Sep. 11, 2017, now Pat. No. 11,106,023.

(51) Int. Cl.
*G02B 15/14* (2006.01)
*G02B 13/18* (2006.01)

(52) U.S. Cl.
CPC ............ *G02B 15/144113* (2019.08); *G02B 15/145113* (2019.08); *G02B 15/1461* (2019.08); *G02B 13/18* (2013.01)

(58) Field of Classification Search
CPC .... G02B 15/144113; G02B 15/145113; G02B 15/145121; G02B 15/145129; G02B 15/1461
See application file for complete search history.

(56) References Cited

U.S. PATENT DOCUMENTS 6,249,383 B1 6/2001 Kohno
2006/0132928 A1 6/2006 Nakatani et al.
(Continued)

FOREIGN PATENT DOCUMENTS

JP H05-224125 A 9/1993
JP 2000-122171 A 4/2000
(Continued)

OTHER PUBLICATIONS

Office Action dated Nov. 3, 2021, in Chinese Patent Application No. 201780094549.3.
(Continued)

*Primary Examiner* — Darryl J Collins
(74) *Attorney, Agent, or Firm* — Potomac Law Group, PLLC

(57) ABSTRACT

A variable magnification optical system comprising, in order from an object side, a first lens group having positive refractive power, a second lens group having negative refractive power, a third lens group having positive refractive power, and a rear lens group having positive refractive power; upon varying a magnification, a distance between the first lens group and the second lens group being varied, a distance between the second lens group and the third lens group being varied, and a distance between the third lens group and the rear lens group being varied; the rear lens group comprising a focusing lens group which is moved upon carrying out focusing from an infinitely distant object to a closely distant object; and predetermined conditional expression(s) being satisfied, thereby various aberrations being corrected superbly.

14 Claims, 26 Drawing Sheets

(56) References Cited

U.S. PATENT DOCUMENTS

| | | |
|---|---|---|
| 2008/0218878 A1 | 9/2008 | Arai et al. |
| 2009/0046366 A1 | 2/2009 | Take |
| 2009/0067061 A1 | 3/2009 | Ono et al. |
| 2009/0122418 A1 | 5/2009 | Atsuumi et al. |
| 2009/0147374 A1 | 6/2009 | Mogi |
| 2009/0195885 A1 | 8/2009 | Yamanaka et al. |
| 2010/0033838 A1 | 2/2010 | Saori |
| 2011/0228159 A1 | 9/2011 | Imaoka et al. |
| 2012/0050603 A1 | 3/2012 | Imaoka et al. |
| 2013/0033621 A1 | 2/2013 | Maruyama |
| 2013/0093940 A1 | 4/2013 | Matsumura |
| 2014/0132830 A1 | 5/2014 | Izuhara et al. |
| 2015/0002943 A1* | 1/2015 | Ono .................. G02B 9/34 359/684 |
| 2015/0085165 A1 | 3/2015 | Maruyama et al. |
| 2015/0153548 A1* | 6/2015 | Kim .................. G02B 15/16 348/335 |
| 2015/0219883 A1 | 8/2015 | Mogi et al. |
| 2017/0261728 A1 | 9/2017 | Shibata et al. |
| 2017/0322399 A1 | 11/2017 | Sugita |
| 2018/0284406 A1 | 10/2018 | Iwamoto |
| 2018/0348481 A1* | 12/2018 | Iwamoto .................. G02B 9/64 |

FOREIGN PATENT DOCUMENTS

| | | |
|---|---|---|
| JP | 2005-292338 A | 10/2005 |
| JP | 2006-171655 A | 6/2006 |
| JP | 2008-032924 A | 2/2008 |
| JP | 2008-216667 A | 9/2008 |
| JP | 2009-103853 A | 5/2009 |
| JP | 2009-139917 A | 6/2009 |
| JP | 2009-157372 A | 7/2009 |
| JP | 2009-168933 A | 7/2009 |
| JP | 2009-192556 A | 8/2009 |
| JP | 2010-039426 A | 2/2010 |
| JP | 2010-186141 A | 8/2010 |
| JP | 2011-017773 A | 1/2011 |
| JP | 2011-070222 A | 4/2011 |
| JP | 2011-081062 A | 4/2011 |
| JP | 2011-090190 A | 5/2011 |
| JP | 2011-197469 A | 10/2011 |
| JP | 2011-247955 A | 12/2011 |
| JP | 2012-047814 A | 3/2012 |
| JP | 2012-173733 A | 9/2012 |
| JP | 2013-037105 A | 2/2013 |
| JP | 2013-101316 A | 5/2013 |
| JP | 2014-209226 A | 11/2014 |
| JP | 2015-064492 A | 4/2015 |
| JP | 2015-145913 A | 8/2015 |
| JP | 2016-048354 A | 4/2016 |
| JP | 2016-212248 A | 12/2016 |
| JP | 2017-201365 A | 11/2017 |
| JP | 2017-223778 A | 12/2017 |
| JP | 2018-054980 A | 4/2018 |
| JP | 2018-173487 A | 11/2018 |
| WO | WO 2013/027364 A1 | 2/2013 |
| WO | WO 2016/031256 A1 | 3/2016 |

OTHER PUBLICATIONS

International Search Report from International Patent Application No. PCT/JP2017/032693, dated Dec. 5, 2017.
Office Action dated May 21, 2021, in Chinese Patent Application No. 201780094549.3.
Office Action dated Dec. 8, 2020, in Japanese Patent Application No. 2019-540287.
Office Action dated Aug. 2, 2022, in Japanese Patent Application No. 2021-178890.
Office Action dated Jun. 6, 2023, in Chinese Patent Application No. 202210426473.2.
Office Action dated Nov. 22, 2023, in Japanese Patent Application No. 2022-191904.
Office Action dated Sep. 5, 2023, in Japanese Patent Application No. 2022-191904.
Office Action dated Jan. 26, 2024, in Chinese Patent Application No. 202210426473.2.

* cited by examiner

VARIABLE MAGNIFICATION OPTICAL SYSTEM, OPTICAL APPARATUS, AND METHOD FOR PRODUCING VARIABLE MAGNIFICATION OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is small in size but can adopt large-sized image pick-up device suitable for photo-taking a motion picture and for effecting high speed focusing. For example, refer to Japanese Patent application Laid-Open Gazette No. 2015-064492. However, in the conventional variable magnification optical system, corrections of various aberrations have not been made sufficiently.

PRIOR ART REFERENCE

Patent Document

Patent Document 1: Japanese Patent application Laid-Open Gazette No. 2015-064492.

SUMMARY OF THE INVENTION

The present invention is related to a variable magnification optical system comprising, in order from an object side, a first lens group having positive refractive power, a second lens group having negative refractive power, a third lens group having positive refractive power, and a rear lens group having positive refractive power;
upon varying a magnification, a distance between said first lens group and said second lens group being varied, a distance between said second lens group and said third lens group being varied, and a distance between said third lens group and said rear lens group being varied;
said rear lens group comprising a focusing lens group which is moved upon carrying out focusing; and
the following conditional expressions being satisfied:

$$-1.00 < f3f/f3r < -0.0500$$

$$0.100 < BFw/fw < 1.00$$

where f3f denotes a focal length of a most image plane side negative lens component in said third lens group; f3r denotes a composite focal length of lens components disposed on a side which is closer to the object than said most image plane side negative lens component, in said third lens group; BFw denotes a back focus of said variable magnification optical system in a wide angle end state; and fw denotes a focal length of said variable magnification optical system in the wide angle end state.

Further, the present invention is related to a method for manufacturing a variable magnification optical system comprising, in order from an object side, a first lens group having positive refractive power, a second lens group having negative refractive power, a third lens group having positive refractive power, and a rear lens group having positive refractive power; the method comprising the steps of:
constructing such that, upon varying a magnification, a distance between said first lens group and said second lens group is varied, a distance between said second lens group and said third lens group is varied, and a distance between said third lens group and said rear lens group is varied;
constructing such that said rear lens group comprises a focusing lens group which is moved upon carrying out focusing; and
constructing such that the following conditional expressions are satisfied:

$$-1.00 < f3f/f3r < -0.0500$$

$$0.100 < BFw/fw < 1.00$$

where f3f denotes a focal length of a most image plane side negative lens component in said third lens group; f3r denotes a composite focal length of lens components disposed on a side which is closer to the object than said most image plane side negative lens component, in said third lens group; BFw denotes a back focus of said variable magnification optical system in a wide angle end state; and fw denotes a focal length of said variable magnification optical system in the wide angle end state.

EMBODIMENT FOR CARRYING OUT THE INVENTION

Figure 1A:
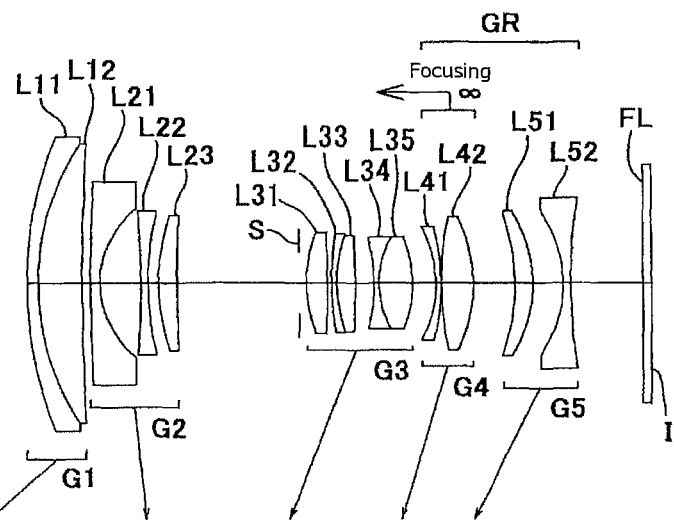
FIG. 1A, FIG. 1B and FIG. 1C are cross sectional views in the wide angle end state, in the intermediate focal length state and in the telephoto end state, respectively, of a variable magnification optical system according to a First Example.

Hereinafter, a variable magnification optical system according to the present embodiment, an optical apparatus and a method for manufacturing the variable magnification optical system, will be explained. At first, the variable magnification optical system according to the present embodiment will be explained.

The variable magnification optical system according to the present embodiment comprises, in order from an object side, a first lens group having positive refractive power, a second lens group having negative refractive power, a third lens group having positive refractive power, and a rear lens group having positive refractive power;

upon varying a magnification from a wide angle end state to a telephoto end state, a distance between said first lens group and said second lens group being varied, a distance between said second lens group and said third lens group being varied, and a distance between said third lens group and said rear lens group being varied;

said rear lens group comprising a focusing lens group which is moved upon carrying out focusing from an infinite distance object to a close distance object; and the following conditional expressions (1) and (2) being satisfied:

$$-1.00 < f3f/f3r < -0.0500 \qquad (1)$$

$$0.100 < BFw/fw < 1.00 \qquad (2)$$

where f3f denotes a focal length of a most image plane side negative lens component in said third lens group; f3r denotes a composite focal length of lens components disposed on a side which is closer to the object than said most image plane side negative lens component, in said third lens group; BFw denotes a back focus of said variable magnification optical system in a wide angle end state; and fw denotes a focal length of said variable magnification optical system in the wide angle end state.

In the present embodiment, the rear lens group of the variable magnification optical system according to the present embodiment comprises at least two lens groups. Meanwhile, in the present embodiment, a lens group means a portion which comprises at least one lens separated by an air space. Further, in the present embodiment, a lens component means a single lens or a cemented lens composed of two or more lenses cemented with each other.

The variable magnification optical system according to the present embodiment can conduct superbly aberration corrections upon varying a magnification, by varying distances between the respective lens groups upon varying a magnification from a wide angle end state to a telephoto end state. Further, the focusing lens group may be made compact and reduced in weight by disposing the focusing lens group in the rear lens group, and as a result, high speed focusing becomes possible and the variable magnification optical system and the lens barrel can be small-sized.

The conditional expression (1) defines a ratio of a focal length of a most image plane side negative lens component in the third lens group to a composite focal length of lens components disposed on a side which is closer to the object than the most image plane side negative lens component in the third lens group. With satisfying the conditional expression (1), the variable magnification optical system according to the present embodiment can correct superbly spherical aberration and astigmatism.

When the value of f3f/f3r is equal to or exceeds the upper limit of the conditional expression (1), refractive power of the most image plane side negative lens component in the third lens group increases relative to refractive power of lens components disposed on the side which is closer to the object than the most image plane side negative lens component in the third lens group, and it becomes difficult to correct superbly spherical aberration in a telephoto end state. Meanwhile, in order to secure the effect of the present embodiment more surely, it is preferable to set the upper limit value of the conditional expression (1) to −0.100. In order to secure the effect of the present embodiment much more surely, it is preferable to set the upper limit value of the conditional expression (1) to −0.150 and much more preferable to −0.190.

On the other hand, when the value of f3f/f3r is equal to or falls below the lower limit of the conditional expression (1), refractive power of lens components disposed on the side which is closer to the object than the most image plane side negative lens component in the third lens group increases relative to the refractive power of the most image plane side negative lens component in the third lens group, and it becomes difficult to correct superbly astigmatism in the wide angle end state. Meanwhile, in order to secure the effect of the present embodiment more surely, it is preferable to set the lower limit value of the conditional expression (1) to −0.800. In order to secure the advantageous effect of the present embodiment-much more surely, it is preferable to set the lower limit value of the conditional expression (1) to −0.700, more preferable to −0.600, much more preferable to −0.550 and—much more and more preferable to −0.500.

The conditional expression (2) defines a ratio of a back focus of the variable magnification optical system in the wide angle end state and a focal length of the variable magnification optical system in the wide angle end state.

With satisfying the conditional expression (2), the variable magnification optical system according to the present embodiment can correct superbly a coma aberration and other various aberrations in the wide angle end state. Meanwhile, by the term "back focus" is meant a distance from the most image side lens surface to the image plane on the optical axis.

When the value of BFw/fw is equal to or exceeds the upper limit of the conditional expression (2), the back focus of the variable magnification optical system in the wide angle end state relative to the focal length of the variable magnification optical system in the wide angle end state becomes large and it becomes difficult to correct superbly various aberrations in the wide angle end state. Meanwhile, in order to attain the advantageous effect of the present embodiment more surely, it is preferable to set the upper limit value of the conditional expression (2) to 0.91. Further, in order to attain the advantageous effect of the present embodiment much more surely, it is preferable to set the upper limit value of the conditional expression (2) to 0.85. and much more preferable to 0.80.

On the other hand, when the value of BFw/fw is equal to or falls below the lower limit of the conditional expression (2), the back focus of the variable magnification optical system in the wide angle end state relative to the focal length of the variable magnification optical system in the wide angle end state becomes small, and it becomes difficult to correct various aberrations in the wide angle end state, and in particular coma aberration superbly. Meanwhile, in order to secure the advantageous effect of the present embodiment more surely, it is preferable to set the lower limit value of the conditional expression (2) to 0.300. In order to secure the advantageous effect of the present embodiment much more surely, it is preferable to set the lower limit value of the conditional expression (2) to 0.400 and more preferable to 0.500.

Incidentally, in the conditional expression (2), "back focus of the variable magnification optical system in the wide angle end state" denoted by BFw may be made "back focus of the variable magnification optical system in the state where the whole length is smallest", and "focal length of the variable magnification optical system in the wide angle end state" denoted by fw may be "focal length of the variable magnification optical system in the state where the whole length is smallest". That is to say, the conditional expression (2) may be expressed, as below:

$$0.100 < BFs/fs < 1.00 \qquad (2)$$

where BFs denotes a back focus of said variable magnification optical system in a state where the whole length is smallest, and fs denotes a focal length of said variable magnification optical system in the state where the whole length is smallest.

By the above-mentioned configuration, the variable magnification optical system according to the present embodiment can be small-sized but be made compatible with a large sized imaging device, so the variable magnification optical system which can correct superbly various aberrations upon varying magnification and upon carrying out focusing can be realized.

In the variable magnification optical system according to the present embodiment, it is desirable that the following conditional expression (3) is satisfied:

$$2.00 < f1/fw < 8.000 \qquad (3)$$

where f1 denotes a focal length of the first lens group, and fw denotes a focal length of the variable magnification optical system in the wide angle end state.

The conditional expression (3) defines a ratio of the focal length of the first lens group to the focal length of the variable magnification optical system in the wide angle end state. With satisfying the conditional expression (3), the variable magnification optical system according to the present embodiment can correct superbly coma aberration and other various aberrations in the wide angle end state.

When the value of f1/fw is equal to or exceeds the upper limit value of the conditional expression (3) of the variable magnification optical system according to the present embodiment, refractive power of the first lens group becomes small, and it becomes difficult to correct superbly various aberrations in the wide angle end state. Meanwhile, in order to secure the advantageous effect of the present embodiment more surely, it is preferable to set the upper limit value of the conditional expression (3) to 7.000, and further in order to secure the advantageous effect of the present embodiment much more surely, it is preferable to set the upper limit value of the conditional expression (3) to 6.500, and more preferable to 6.000.

On the other hand, when the value of f1/fw in the conditional expression (3) of the variable magnification optical system according to the present embodiment, is equal to or falls below the lower limit value, refractive power of the first lens group becomes large, and it becomes difficult to correct various aberrations in the wide angle end state, and in particular coma aberration. Meanwhile, in order to secure the advantageous effect of the present embodiment more surely, it is preferable to set the lower limit value of the conditional expression (3) to 3.00. Further, in order to secure the advantageous effect of the present embodiment more surely, it is preferable to set the lower limit value of the conditional expression (3) to 4.00, and more preferable to 4.50.

In the variable magnification optical system according to the present embodiment, it is desirable that the following conditional expression (4) is satisfied:

$$0.040 < \beta Fw < 0.800 \qquad (4)$$

where βFw denotes a transverse magnification of the focusing lens group in the wide angle end state.

The conditional expression (4) defines a transverse magnification of the focusing lens group in the wide angle end state. With satisfying the conditional expression (4), the variable magnification optical system according to the present embodiment can make amount of movement of the focusing lens group upon focusing small so that the variable magnification optical system can be made small-sized.

When the value of is equal to or exceeds the upper limit value of the conditional expression (4) of the variable magnification optical system according to the present embodiment, the amount of movement of the focusing lens group upon focusing becomes large, so it becomes difficult to make the variable magnification optical system small-sized. Meanwhile, in order to secure the advantageous effect of the present embodiment surely, it is preferable to set the upper limit value of the conditional expression (4) to 0.770. Further, in order to secure the advantageous effect of the present embodiment much more surely, it is preferable to set the upper limit value of the conditional expression (4) to 0.750, and more preferable to 0.730.

On the other hand, when the value of β Fw in the conditional expression (4) of the variable magnification optical system according to the present embodiment, is equal to or falls below the lower limit value, sensitivity becomes high and the amount of movement of the focusing lens group upon focusing becomes small, so it becomes difficult to control focusing.

Meanwhile, in order to secure the advantageous effect of the present embodiment more surely it is preferable to set the lower limit value of the conditional expression (4) to 0.200. Further, in order to secure the advantageous effect of the present embodiment much more surely, it is preferable to set the lower limit value of the conditional expression (4) to 0.300 and more preferable to 0.400.

It is desirable that, in the variable magnification optical system according to the present embodiment, the rear lens group comprises a fourth lens group having positive refractive power and a fifth lens group having negative refractive power and satisfies the following conditional expression (5):

$$-3.000 < f5/f3 < -0.500 \qquad (5)$$

where f3 denotes a focal length of the third lens group, and f5 denotes a focal length of the fifth lens group.

The conditional expression (5) defines a ratio of the focal length of the fifth lens group to the focal length of the third lens group.

With satisfying the conditional expression (5), the variable magnification optical system according to the present embodiment can maintain power ratio between the third lens group and the fifth lens group properly and correct superbly astigmatism and coma aberration.

When the value of f5/f3 is equal to or exceeds the upper limit value of the conditional expression (5) of the variable magnification optical system according to the present embodiment, refractive power of the third lens group relative to refractive power of the fifth lens group becomes large and it becomes difficult to correct various aberrations in the wide angle end state and in particular astigmatism superbly. Meanwhile, in order to secure the advantageous effect of the present embodiment more surely, it is preferable to set the upper limit value of the conditional expression (5) to −0.800. In order to secure the advantageous effect of the present embodiment much more surely, it is preferable to set the upper limit value of the conditional expression (5) to −1.000, and more preferable to −1.100.

On the other hand, when the value of f5/f3 in the conditional expression (5) of the variable magnification optical system according to the present embodiment, is equal to or falls below the lower limit value, refractive power of the fifth lens group relative to refractive power of the third lens group becomes large, and it becomes difficult to correct various aberrations in the telephoto end state, and in particular coma aberration superbly. Meanwhile, in order to secure the advantageous effect of the present embodiment more surely, it is preferable to set the lower limit value of the conditional expression (5) to −2.500. Further, in order to secure the advantageous effect of the present embodiment much more surely, it is preferable to set the lower limit value of the conditional expression (5) to −2.000, and more preferable to −1.400.

Further, it is desirable that, in the variable magnification optical system according to the present embodiment, the fourth lens group comprises a focusing lens group. With such a configuration, in the variable magnification optical system according to the present embodiment, the focusing lens group may be small in size and light in weight, and as a result the variable magnification optical system and a lens barrel can be made small in size.

In the variable magnification optical system according to the present embodiment, it is desirable that the following conditional expression (6) is satisfied:

$$4.000 < f1/f1Rw < 9.000 \tag{6}$$

where f1 denotes the focal length of the first lens group, and f1Rw denotes a composite focal length of lens groups in the wide angle end state disposed on the side which is closer to the image plane than the first lens group.

The conditional expression (6) defines a ratio of the focal length of the first lens group relative to the composite focal length of lens groups in the wide angle end state disposed on the side which is closer to the image plane—than the first lens group. With satisfying the conditional expression (6), the variable magnification optical system according to the present embodiment can correct superbly coma aberration and other various aberrations in the wide angle end state. Further, with satisfying the conditional expression (6), variations in spherical aberration and other various aberrations can be suppressed upon varying magnification from the wide angle end state to the telephoto end state.

When the value of f1/f1Rw is equal to or exceeds the upper limit value of the conditional expression (6) of the variable magnification optical system according to the present embodiment, refractive power of the lens groups in the wide angle end state disposed on the side which is closer to the image plane than the first lens group, becomes large, and it becomes difficult to correct various aberrations in the wide angle end state and, in particular, coma aberration superbly. Further, upon varying magnification from the wide angle end state to the telephoto end state, it becomes difficult to suppress variations in spherical aberration and in other various aberrations. Meanwhile, in order to secure the advantageous effect of the present embodiment more surely, it is preferable to set the upper limit value of the conditional expression (6) to 8.500. Further, in order to secure the advantageous effect of the present embodiment much more surely, it is preferable to set the upper limit value of the conditional expression (6) to 8.000, and more preferable to 6.500.

On the other hand, when the value of f1/f1Rw in the conditional expression (6) of the variable magnification optical system according to the present embodiment, is equal to or falls below the lower limit value, refractive power of the first lens group becomes large, and it becomes difficult to correct various aberrations in the wide angle end state and in particular coma aberration superbly. Further, upon varying magnification from the wide angle end state to the telephoto end state, it becomes difficult to suppress variations in spherical aberration and in other various aberrations. Meanwhile, in order to secure the advantageous effect of the variable magnification optical system according to the present embodiment more surely, it is preferable to set the lower limit value of the conditional expression (6) to 5.000. And in order to secure the advantageous effect of the present embodiment much more surely, it is preferable to set the lower limit value of the conditional expression (6) to 5.100, and more preferable to 5.200.

In the variable magnification optical system according to the present embodiment, it is desirable that the following conditional expression (7) is satisfied:

$$nd3fp < 1.800 \tag{7}$$

where nd3fp denotes refractive index of a lens having the largest refractive index in the third lens group.

The conditional expression (7) defines refractive index of the lens having the largest refractive index in the third lens group. With using glass material having high refractive index satisfying the conditional expression (7), the variable magnification optical system according to the present embodiment can correct superbly longitudinal chromatic aberration and spherical aberration.

When the value of nd3fp is equal to or exceeds the upper limit value of the conditional expression (7) of the variable magnification optical system according to the present embodiment, refractive power of the third lens group becomes large, and it becomes difficult to correct superbly longitudinal chromatic aberration and spherical aberration. Meanwhile, in order to secure the advantageous effect of the present embodiment more surely, it is preferable to set the upper limit value of the conditional expression (7) to 1.750. Further, in order to secure the advantageous effect of the present embodiment much more surely, it is preferable to set the upper limit value of the conditional expression (7) to 1.700, and more preferable to 1.650.

In the variable magnification optical system according to the present embodiment, it is desirable that the following conditional expression (8) is satisfied:

$$50.000 < vd3p \tag{8}$$

where vd3p denotes Abbe's number of a lens having the smallest Abbe's number in the third lens group.

The conditional expression (8) defines Abbe's number of the lens having the smallest Abbe's number in the third lens group. With using glass material of low dispersion satisfying the conditional expression (8), the variable magnification optical system according to the present embodiment can let the third lens group have anomalous dispersion, and it becomes possible to correct superbly longitudinal chromatic aberration and spherical aberration.

When the value of vd3p in the conditional expression (8) of the variable magnification optical system according to the present embodiment, is equal to or falls below the lower limit value, it is not possible to let the third lens group have sufficient anomalous dispersion, and it becomes difficult to correct superbly longitudinal chromatic aberration and spherical aberration. Meanwhile, in order to secure the advantageous effect of the present embodiment more surely, it is preferable to set the lower limit value of the conditional expression (8) to 55.000. And, in order to secure the advantageous effect of the present embodiment much more surely, it is preferable to set the lower limit value of the conditional expression (8) to 58.000, and more preferable to 60.000.

In the variable magnification optical system according to the present embodiment, it is desirable that the following conditional expression (9) is satisfied:

$$0.500 < 1/\beta Rw < 1.000 \tag{9}$$

where βRw denotes transverse magnification of a lens group disposed on the most image plane side in the wide angle end state.

The conditional expression (9) defines the transverse magnification of the lens group disposed on the most image plane side in the wide angle end state. With satisfying the conditional expression (9), the variable magnification optical system according to the present embodiment can correct superbly astigmatism and other various aberrations in the wide angle end state.

When the value of 1/βRw is equal to or exceeds the upper limit value of the conditional expression (9) of the variable magnification optical system according to the present embodiment, the transverse magnification of the lens group disposed on the most image plane side in the wide angle end state, becomes small, and it becomes difficult to correct superbly various aberrations in the wide angle end state and, in particular, astigmatism. Meanwhile, in order to secure the advantageous effect of the present embodiment more surely, it is preferable to set the upper limit value of the conditional expression (9) to 0.950. Further, in order to secure the advantageous effect of the present embodiment much more surely, it is preferable to set the upper limit value of the conditional expression (9) to 0.900, and more preferable to 0.850.

On the other hand, when the value of $1/\beta Rw$ in the conditional expression (9) of the variable magnification optical system according to the present embodiment, is equal to or falls below the lower limit value, the transverse magnification of the lens group disposed on the most image plane side in the wide angle end state, becomes large, and curvature of field is apt to be generated in the wide angle end state, and further it becomes difficult to correct superbly various aberrations. Meanwhile, in order to secure the advantageous effect of the variable magnification optical system according to the present embodiment more surely, it is preferable to set the lower limit value of the conditional expression (9) to 0.550. And in order to secure the advantageous effect of the present embodiment much more surely, it is preferable to set the lower limit value of the conditional expression (9) to 0.600, and more preferable to 0.650.

In the variable magnification optical system according to the present embodiment, it is desirable that the following conditional expression (10) is satisfied:

$$0.500 < f2fn/f2 < 1.100 \quad (10)$$

where f2fn denotes a focal length of a most object side lens component in the second lens group, and f2 denotes a focal length of the second lens group.

The conditional expression (10) defines a ratio of the focal length of the most object side lens component in the second lens group relative to the focal length of the second lens group. With satisfying the conditional expression (10), the variable magnification optical system according to the present embodiment can arrange power of the most object side lens component in the second lens group properly, so that it is possible to correct superbly spherical aberration and other various aberrations.

When the value of f2fn/f2 is equal to or exceeds the upper limit value of the conditional expression (10) of the variable magnification optical system according to the present embodiment, refractive power of the most object side lens component in the second lens group becomes small, and it becomes difficult to correct superbly spherical aberration and other various aberrations. Meanwhile, in order to secure the advantageous effect of the present embodiment more surely, it is preferable to set the upper limit value of the conditional expression (10) to 1.000. Further, in order to secure the advantageous effect of the present embodiment much more surely, it is preferable to set the upper limit value of the conditional expression (10) to 0.900, and more preferable to 0.850.

On the other hand, when the value of f2fn/f2 in the conditional expression (10) of the variable magnification optical system according to the present embodiment, is equal to or falls below the lower limit value, refractive power of the most object side lens component in the second lens group becomes large, and it becomes difficult to correct superbly spherical aberration and other various aberrations. Meanwhile, in order to secure the advantageous effect of the variable magnification optical system according to the present embodiment more surely, it is preferable to set the lower limit value of the conditional expression (10) to 0.600. And in order to secure the advantageous effect of the present embodiment much more surely, it is preferable to set the lower limit value of the conditional expression (10) to 0.650 and more preferable to 0.700.

Further, in the variable magnification optical system according to the present embodiment, it is desirable that the following conditional expression (11) is satisfied:

$$0.300 < fF/ft < 1.400 \quad (11)$$

where fF denotes a focal length of the focusing lens group, and ft denotes a focal length of the variable magnification optical system in the telephoto end state.

The conditional expression (11) defines a ratio of the focal length of the focusing lens group relative to the focal length of the variable magnification optical system in the tele photo end state. With satisfying the conditional expression (11), the variable magnification optical system according to the present embodiment can suppress variations in spherical aberration and in other various aberrations upon focusing from an infinite distance object to a close distance object, and the variable magnification optical system and the lens barrel may be made small-sized.

When the value of fF/ft is equal to or exceeds the upper limit value of the conditional expression (11) of the variable magnification optical system according to the present embodiment, refractive power of the focusing lens group becomes small, and it becomes difficult to correct superbly variations in various aberrations and, in particular, variation in spherical aberration, upon focusing from an infinite distance object to a close distance object. Meanwhile, in order to secure the advantageous effect of the present embodiment more surely, it is preferable to set the upper limit value of the conditional expression (11) to 1.000. Further, in order to secure the advantageous effect of the present embodiment much more surely, it is preferable to set the upper limit value of the conditional expression (11) to 0.900, and more preferable to 0.850.

On the other hand, when the value of fF/ft in the conditional expression (11) of the variable magnification optical system according to the present embodiment, is equal to or falls below the lower limit value, refractive power of the focusing lens group becomes large, and it becomes difficult to correct variations in various aberrations upon focusing from an infinite distance object to a close distance object and, in particular, variation in spherical aberration superbly. Meanwhile, in order to secure the advantageous effect of the present embodiment more surely, it is preferable to set the lower limit value of the conditional expression (11) to 0.500. And in order to secure the advantageous effect of the present embodiment much more surely, it is preferable to set the lower limit value of the conditional expression (11) to 0.600, and more preferable to 0.700.

In the variable magnification optical system according to the present embodiment, it is desirable that the following conditional expression (12) is satisfied:

$$40.00° < \omega w < 85.00° \quad (12)$$

where $\omega w$ denotes a half angle of view of the variable magnification optical system in the wide angle end state.

The conditional expression (12) defines the half angle of view of the variable magnification optical system in the wide angle end state. With satisfying the conditional expression (12), the variable magnification optical system according to the present embodiment can correct superbly various aberrations such as coma aberration, distortion and curvature of field and others, while maintaining large angle of view.

When the value of ωw is equal to or exceeds the upper limit value of the conditional expression (12) of the variable magnification optical system according to the present embodiment, the angle of view becomes too large and it becomes difficult to correct superbly various aberrations, such as, coma aberration, distortion and curvature of field. Meanwhile, in order to secure the advantageous effect of the present embodiment more surely, it is preferable to set the upper limit value of the conditional expression (12) to 84.00°. Further, in order to secure the advantageous effect of the present embodiment much more surely, it is preferable to set the upper limit value of the conditional expression (12) to 83.00°, and more preferable to 82.00°.

On the other hand, when the value of ωw in the conditional expression (12) of the variable magnification optical system according to the present embodiment, is equal to or falls below the lower limit value, the angle of view becomes small and it becomes difficult to correct superbly various aberrations. Meanwhile, in order to secure the advantageous effect of the present embodiment more surely, it is preferable to set the lower limit value of the conditional expression (12) to 41.00°. Further, in order to secure the advantageous effect of the present embodiment much more surely, it is preferable to set the lower limit value of the conditional expression (12) to 42.00°, and more preferable to 43.00°.

The optical apparatus of the present embodiment is equipped with the variable magnification optical system having the above described configuration, so it is possible to realize an optical apparatus which is compatible with a large-sized imaging device in spite that the optical apparatus is small-sized, and which can correct superbly various aberrations upon varying magnification as well as upon focusing.

A method for manufacturing a variable magnification optical system according to the present embodiment, is a method for manufacturing a variable magnification optical system which comprises, in order from an object side, a first lens group having positive refractive power, a second lens group having negative refractive power, a third lens group having positive refractive power and a rear lens group having positive refractive power;

configuring such that, upon varying a magnification from a wide angle end state to a telephoto end state, a distance between said first lens group and said second lens group is varied, a distance between said second lens group and said third lens group is varied, and a distance between said third lens group and said rear lens group is varied;

configuring such that said rear lens group comprises a focusing lens group which is moved upon carrying out focusing from an infinite distance object to a close distance object; and configuring such that the following conditional expressions (1) and (2) are satisfied:

$$-1.00 < f3f/f3r < -0.0500 \quad (1)$$

$$0.100 < BFw/fw < 1.00 \quad (2)$$

where f3f denotes a focal length of a most image plane side negative lens component in said third lens group; f3r denotes a composite focal length of lens components disposed on a side which is closer to the object than said most image plane side negative lens component in said third lens group; BFw denotes a back focus of said variable magnification optical system in a wide angle end state; and fw denotes a focal length of said variable magnification optical system in the wide angle end state.

By this method, it is possible to manufacture a variable magnification optical system which is compatible with a large-sized imaging device in spite that the optical system is small-sized, and which can correct superbly various aberrations upon varying magnification as well as upon focusing.

Hereinafter, the variable magnification optical systems relating to numerical examples of the present embodiment will be explained with reference to the accompanying drawings.

First Example

Figure 1B:
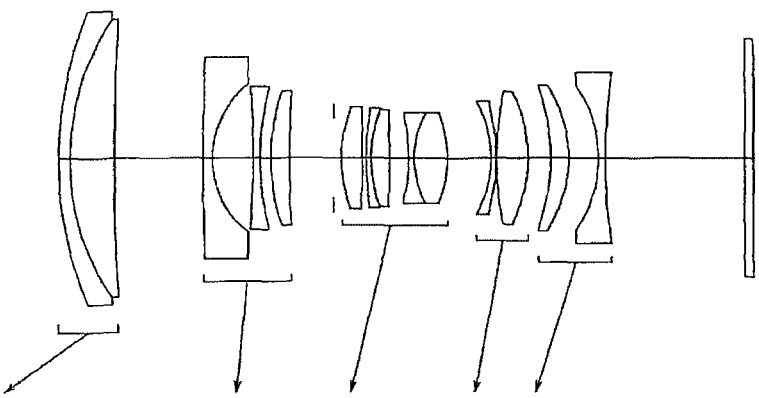
Figure 1C:
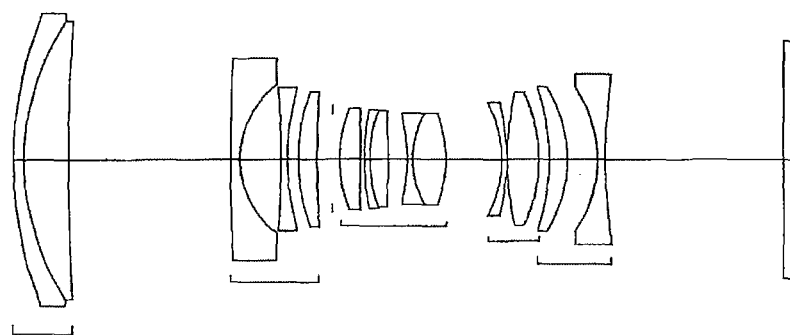

FIGS. 1A, 1B and 1C are, respectively, cross sectional views in a wide angle end state, in an intermediate focal length state and in an telephoto end state, of a variable magnification optical system according to a First Example of the variable magnification optical system of the present embodiment. Arrows below each lens group in FIG. 1A show directions of movements of respective lens groups upon varying magnification from a wide angle end state to an intermediate focal length state. Arrows below each lens group in FIG. 1B show movement trajectories of respective lens groups upon varying magnification from the intermediate focal length state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose image plane I side lens surface is aspherical.

The third lens group G3 consists of, in order from the object side along the optical axis, a double convex positive lens L31, a cemented lens constructed by a negative meniscus lens L32 having a convex surface facing the object side cemented with a double convex positive lens L33, and a cemented lens constructed by a double concave negative lens L34 cemented with a double convex positive lens L35. The double convex positive lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a negative meniscus lens L41 having a concave surface facing the object side, and a double convex positive lens L42. The double convex positive lens L42 is a glass mold type aspherical lens whose image plane I side lens surface is aspherical.

The fifth lens group G5 consists of, in order from the object side along the optical axis, a positive meniscus lens L51 having a concave surface facing the object side and a double concave negative lens L52. The positive meniscus lens L51 is a glass mold type aspherical lens whose image plane I side lens surface is aspherical.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 1 below shows various values of the variable magnification optical system relating to the present Example.

In [Surface Data], "m" denotes an order of an optical surface counted from the object side, "r" denotes a radius of curvature, "d" denotes a surface-to-surface distance, that is, an interval from an n-th surface to an (n+1)-th surface, where n is an integer, "nd" denotes refractive index for d-line (wavelength λ=587.6 nm) and "vd" denotes an Abbe's number for d-line (wavelength λ=587.6 nm). Further, "OP" denotes an object surface, "Dn" denotes a variable surface-to-surface distance, where n is an integer, "S" denotes an aperture stop, and "I" denotes an image plane. Meanwhile, radius of curvature r=∞ denotes a plane surface, and refractive index of the air nd=1.00000 is omitted. In addition, an aspherical surface is expressed by attaching "*" to the surface number, and in the column of the radius of curvature "r", a paraxial radius of curvature is shown.

In [Various Data], "f" denotes a focal length, "FNO" denotes an F-number, "ω" denotes a half angle of view (unit "°"), "Y" denotes a maximum image height, and "TL" denotes a total length of the variable magnification optical system according to the present Example, that is, a distance along the optical axis from the first lens surface to the image plane I. BF denotes a back focus, that is, a distance on the optical axis from a most image side lens surface to the image plane I, and BF (air converted length) is a value of the distance on the optical axis from the most image side lens surface to the image plane I measured in a state where optical block (s) such as filter (s) is (are) removed from on the optical path. Meanwhile, "W" denotes a wide angle end state, "M" denotes an intermediate focal length state, "T" denotes a tele photo end state.

In [Lens Group Data], a starting surface number "ST" and a focal length "f" of each lens group are shown.

In [Aspherical Surface Data], with respect to aspherical surface (s) shown in the [Surface Data], a shape of the aspherical surface is exhibited by the following expression:

$$X=(h^2/r)/[1+[1-\kappa(h/r)^2]^{1/2}]+A4h^4+A6h^6+A8h^8+A10y^{10}$$

where h denotes a vertical height from the optical axis; X denotes a sag amount which is a distance along the optical axis from the tangent plane at the vertex of the aspherical surface to the aspherical surface at the vertical height h; κ denotes a conical coefficient; A4, A6, A8 and A10 each denotes an aspherical surface coefficient; r denotes a radius of curvature of a reference sphere, that is, a paraxial radius of curvature. Meanwhile, "E-n" denotes "×10$^{-n}$", in which "n" is an integer, and for example "1.234E-05" denotes "1.234×10$^{-5}$". The second order aspherical coefficient A2 is 0 and omitted.

In [Variable Distance Data], Dn denotes a surface to surface distance from n-th surface to (n+1)-th surface, where n is an integer. Further, W denotes a wide-angle end state, M denotes an intermediate focal length state, T denotes a telephoto end state, "Infinite" denotes time on which an infinite distance object is focused, and "Close" denotes time on which a close distance object is focused.

In [Values for Conditional Expressions], values with respect to respective conditional expressions are shown.

The focal length "f", the radius of curvature "r" and other units on the length described in Table 1 involve using generally [mm], however, the optical system acquires the equal optical performance even when proportionally enlarged or reduced and is not therefore limited to this unit.

Note that the descriptions of the reference numerals and symbols in Table 1 are the same in the subsequent Examples.

TABLE 1

First Example

[Surface Data]

| m | r | d | nd | vd |
|---|---|---|----|----|
| OP | ∞ | | | |
| 1 | 73.00000 | 2.150 | 1.84666 | 23.8 |
| 2 | 47.49515 | 8.600 | 1.75500 | 52.3 |
| 3 | 417.04330 | D3 | | |
| 4 | 400.00000 | 1.800 | 1.74353 | 49.5 |
| *5 | 17.04241 | 8.087 | | |
| 6 | −181.13172 | 1.350 | 1.75500 | 52.3 |
| 7 | 49.98466 | 2.108 | | |
| 8 | 37.80684 | 3.693 | 2.00069 | 25.5 |
| 9 | 235.22758 | D9 | | |
| 10 (S) | ∞ | 1.500 | | |
| *11 | 25.88353 | 4.048 | 1.55332 | 71.7 |
| 12 | −254.63176 | 0.800 | | |
| 13 | 52.19394 | 1.000 | 1.83481 | 42.7 |
| 14 | 26.38369 | 3.546 | 1.61800 | 63.3 |
| 15 | −150.00000 | 3.743 | | |

TABLE 1-continued

First Example

| | | | | |
|---|---|---|---|---|
| 16 | −33.68615 | 1.000 | 1.81600 | 46.6 |
| 17 | 17.28639 | 6.494 | 1.59319 | 67.9 |
| 18 | −23.04098 | D18 | | |
| 19 | −22.45485 | 1.000 | 1.80100 | 34.9 |
| 20 | −41.05177 | 0.103 | | |
| 21 | 59.92172 | 6.115 | 1.59201 | 67.0 |
| *22 | −26.25646 | D22 | | |
| 23 | −40.60645 | 3.489 | 1.58913 | 61.2 |
| *24 | −24.00000 | 5.786 | | |
| 25 | −24.36536 | 1.500 | 1.61800 | 63.3 |
| 26 | 107.45414 | D26 | | |
| 27 | ∞ | 1.600 | 1.51680 | 64.1 |
| 28 | ∞ | D28 | | |
| I | ∞ | | | |

[Various Data]

Variable magnification ratio 2.75

| | W | M | T |
|---|---|---|---|
| f | 24.72 | 46.31 | 67.91 |
| FNo | 4.00 | 4.00 | 4.00 |
| ω | 43.3 | 24.0 | 16.7 |
| Y | 21.70 | 21.70 | 21.70 |
| TL | 121.583 | 134.978 | 151.029 |
| BF | 15.558 | 28.486 | 36.144 |
| BF (air converted length) | 15.013 | 27.941 | 35.599 |

[Lens Group Data]

| Lens Group | ST | f |
|---|---|---|
| 1$^{st}$ Lens Group | 1 | 125.09 |
| 2$^{nd}$ Lens Group | 4 | −28.96 |
| 3$^{rd}$ Lens Group | 10 | 39.65 |
| 4$^{th}$ Lens Group | 19 | 56.05 |
| 5$^{th}$ Lens Group | 23 | −51.52 |

[Aspherical Surface Data]

Surface Number: 5

K = 0.00000e+00   A4 = 2.11342e−05   A6 = 4.21453e−08
A8 = −3.77216e−11   A10 = 4.44697e−13

Surface Number: 11

K = 1.00000e+00   A4 = −5.01541e−06   A6 = 1.10914e−09
A8 = 4.72876e−11   A10 = −3.55280e−13

Surface Number: 22

K = 1.00000e+00   A4 = 1.52181e−05   A6 = −2.09730e−08
A8 = −1.77284e−11   A10 = −1.36838e−13

Surface Number: 24

K = 1.00000e+00   A4 = 3.09258e−06   A6 = 3.56902e−08
A8 = −3.36788e−11   A10 = 3.80333e−13

[Variable Distance Data]

| | W Infinite | M Infinite | T Infinite | W Close | M Close | T Close |
|---|---|---|---|---|---|---|
| D3 | 1.600 | 17.195 | 31.254 | 1.600 | 17.195 | 31.254 |
| D9 | 23.690 | 8.562 | 2.895 | 23.690 | 8.562 | 2.895 |
| D18 | 4.579 | 8.446 | 10.823 | 2.148 | 3.205 | 2.313 |
| D22 | 8.245 | 4.378 | 2.000 | 10.675 | 9.619 | 10.510 |
| D26 | 13.858 | 26.785 | 34.444 | 13.858 | 26.785 | 34.444 |
| D28 | 0.100 | 0.101 | 0.101 | 0.100 | 0.101 | 0.101 |

[Values for Conditional Expressions]

(1) f3f/f3r = −0.2127
(2) BFw/fw = 0.6901
(3) f1/fw = 5.0602
(4) βFw = 0.5234
(5) f5/f3 = −1.2993
(6) f1/f1Rw = 5.7747

TABLE 1-continued

First Example (7) nd3fp = 1.5533
(8) vd3p = 71.6835
(9) 1/βRw = 0.7853
(10) f2fn/f2 = 0.8285
(11) fF/ft = 0.8254
(12) ωw = 43.3420°

Figure 2A:
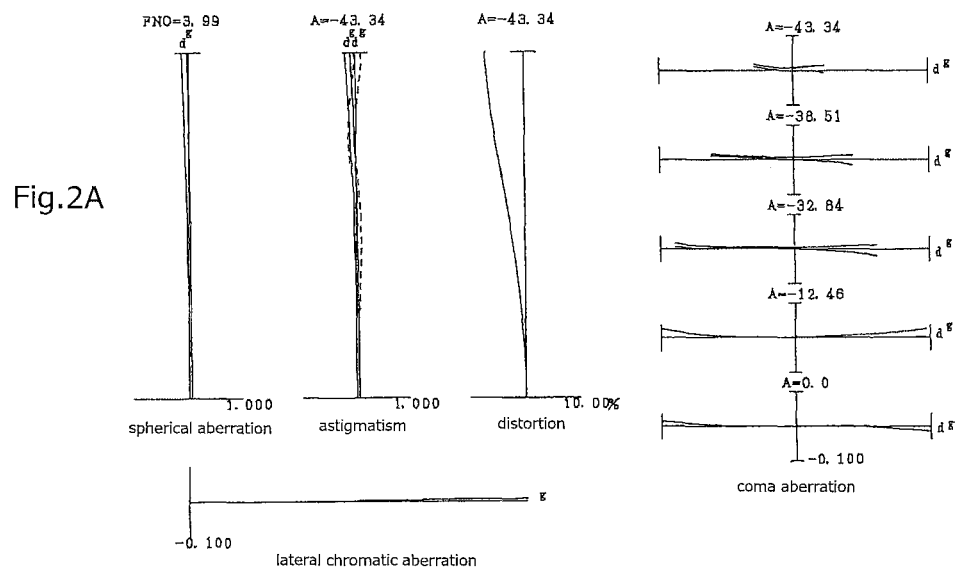
FIG. 2A, FIGS. 2B and 2C are graphs showing various aberrations, upon focusing on an infinite distance object, in the wide angle end state, in the intermediate focal length state, and in the telephoto end state, respectively, of the variable magnification optical system according to the First Example
Figure 2B:
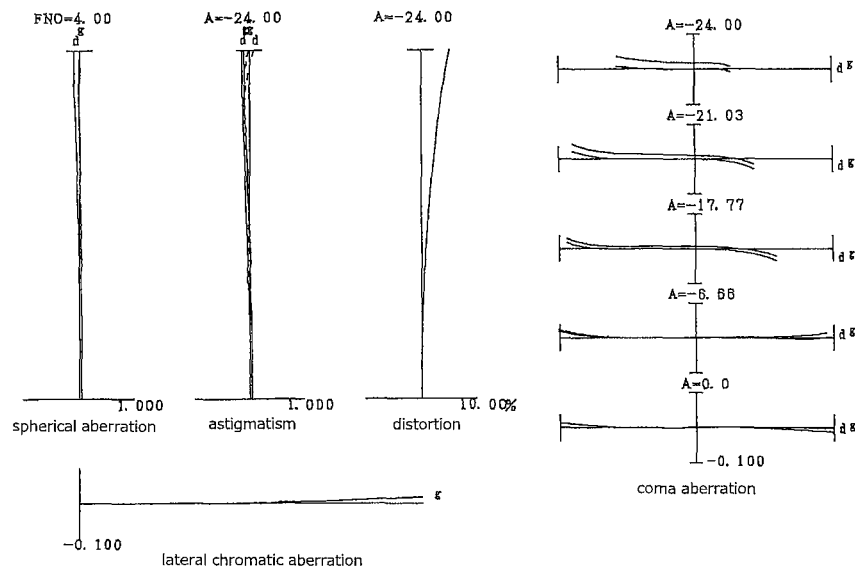
Figure 2C:
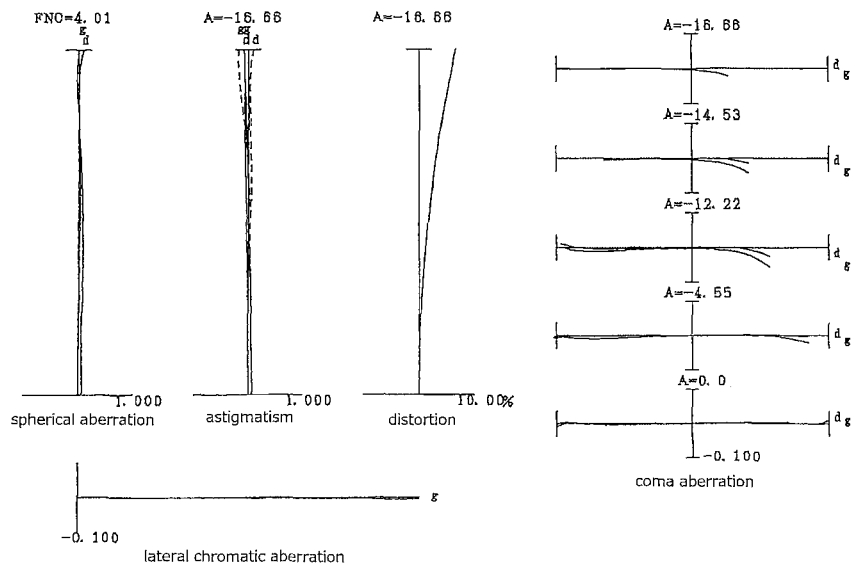

FIG. 2A, FIG. 2B and FIG. 2C are graphs showing various aberrations upon focusing on an infinite distance object, respectively, in the wide angle end state, in the intermediate focal length state and in the telephoto end state, of the variable magnification optical system according to the First Example.

Figure 3A:
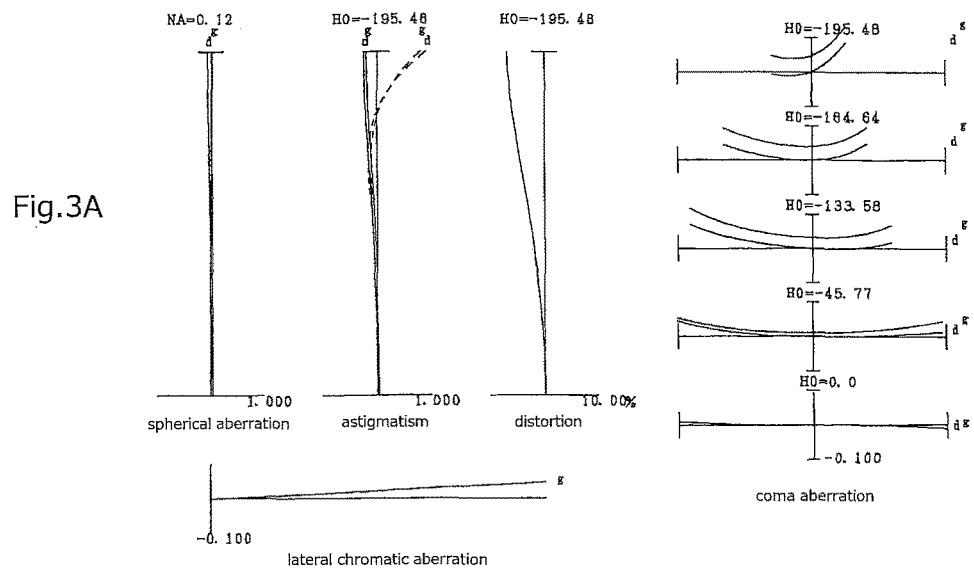
FIG. 3A, FIG. 3B and FIG. 3C are graphs showing various aberrations, upon focusing on a close distance object, in the wide angle end state, in the intermediate focal length state, and in the telephoto end state, respectively, of the variable magnification optical system according to the First Example.
Figure 3B:
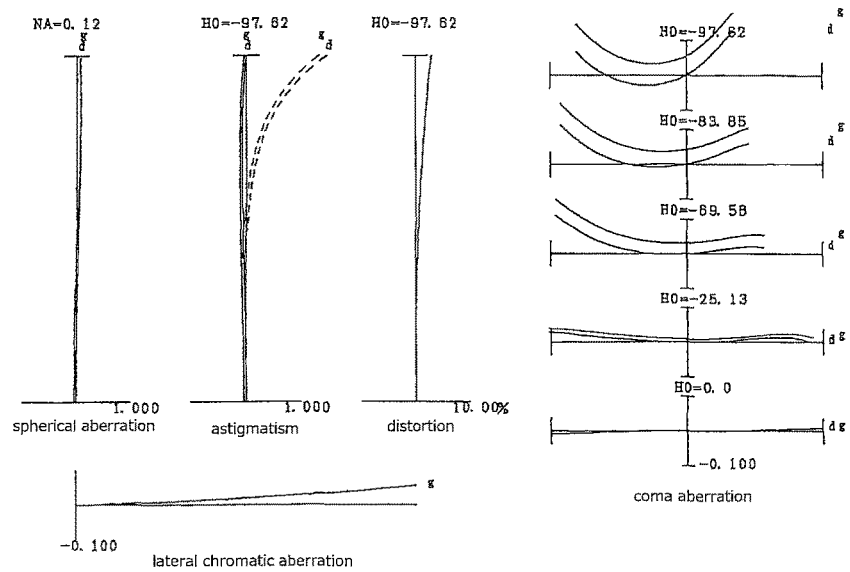
Figure 3C:
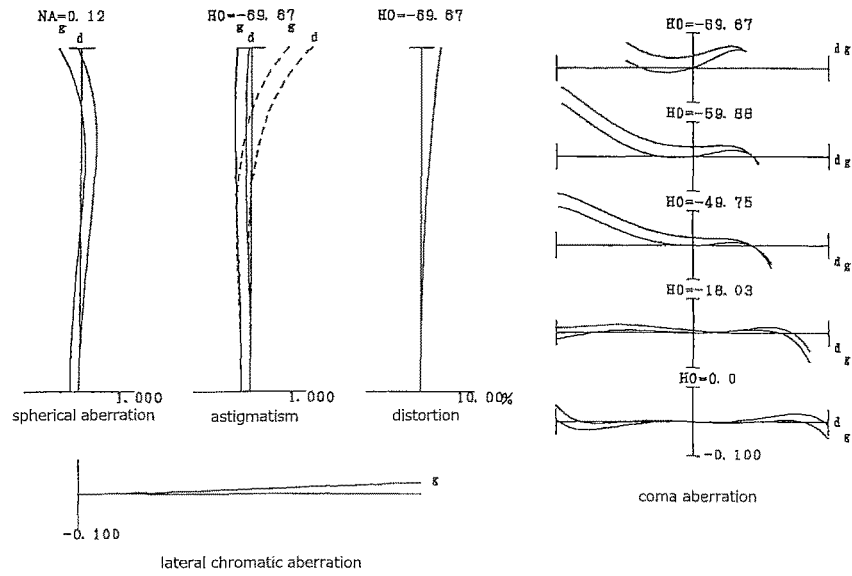

FIG. 3A, FIG. 3B and FIG. 3C are graphs showing various aberrations upon focusing on a close distance object, respectively, in the wide angle end state, in the intermediate focal length state and in the telephoto end state, of the variable magnification optical system according to the First Example.

In the respective graphs showing aberrations, "FNO" denotes an F-number, "NA" denotes a numerical aperture, and "A" denotes an incident angle of light rays, that is, a half angle of view (unit "°"), and "HO" denotes an object height (unit: mm). In detail, in graphs showing spherical aberrations, the value of F-number FNO or numerical aperture NA corresponding to the maximum aperture is shown. In graphs showing astigmatism and distortions, the maximum values of the half angle of view or of the object height are shown respectively, and in graphs showing coma aberration, each half angle of view or each object height is shown. "d" denotes abberatino for d-line (wavelength λ=587.6 nm), "g" denotes abberatino for g-line (wavelength λ=435.8 nm), and graphs with "g" or "d" being not attached, show aberration for d-line. In graphs showing astigmatism, a solid line indicates a sagittal image plane, and a broken line indicates a meridional image plane. In graphs showing coma aberration, coma aberration in each half angle of view or each object height, that is, transverse aberration is shown. Meanwhile, in graphs showing various aberrations in the respective Examples as described below, the same symbols as in the present Example are employed.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

Second Example

Figure 4A:
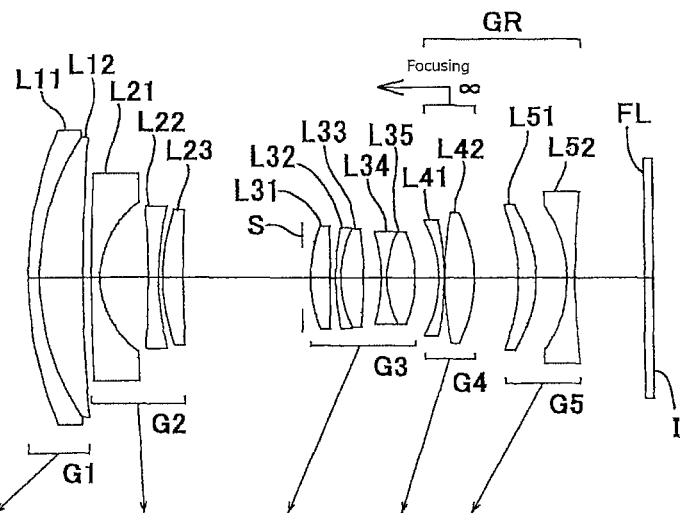
FIG. 4A, FIG. 4B and FIG. 4C are cross sectional views in the wide angle end state, in the intermediate focal length state and in the telephoto end state, respectively, of a variable magnification optical system according to a Second Example.
Figure 4B:
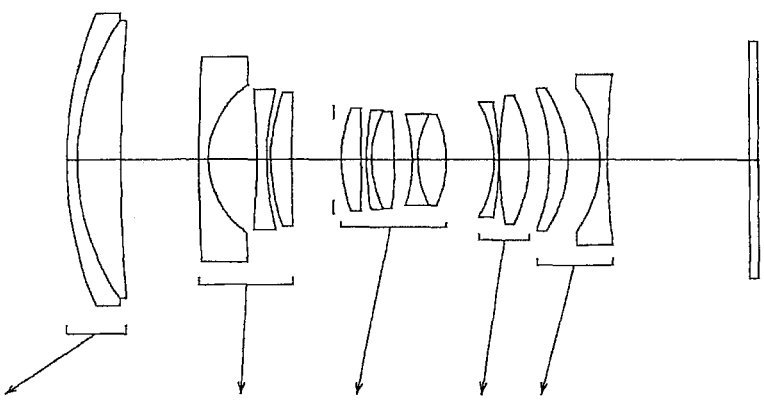
Figure 4C:
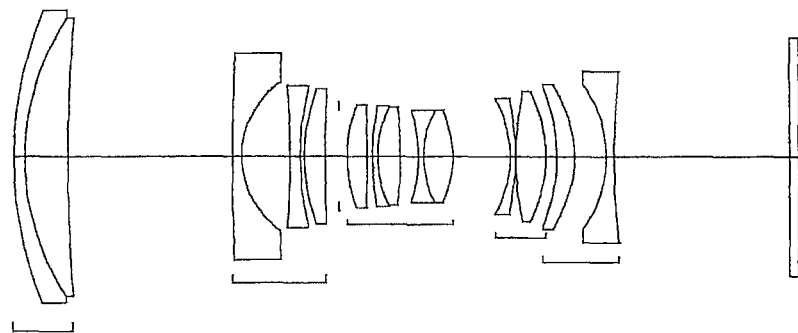

FIG. 4A, FIG. 4B and FIG. 4C are, respectively, cross sectional views in a wide angle end state, in an intermediate focal length state and in a telephoto end state, of a variable magnification optical system according to a Second Example of the variable magnification optical system of the present embodiment. Arrows below each lens group in FIG. 4A show directions of movements of respective lens groups upon varying magnification from the wide angle end state to the intermediate focal length state. Arrows below each lens group in FIG. 4B show movement trajectories of respective lens groups upon varying magnification from the intermediate focal length state to the telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose image plane I side lens surface is aspherical.

The third lens group G3 consists of, in order from the object side along the optical axis, a double convex positive lens L31, a cemented lens constructed by a negative meniscus lens L32 having a convex surface facing the object side cemented with a double convex positive lens L33, and a cemented lens constructed by a double concave negative lens L34 cemented with a double convex positive lens L35. The double convex positive lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side, a negative meniscus lens L41 having a concave surface facing the object side, and a double convex positive lens L42. The double convex positive lens L42 is a glass mold type aspherical lens whose image plane I side lens surface is aspherical.

The fifth lens group G5 consists of, in order from the object side along the optical axis, a positive meniscus lens L51 having a concave surface facing the object side and a double concave negative lens L52. The positive meniscus lens L51 is a glass mold type aspherical lens whose image plane I side lens surface is aspherical.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 2 below shows various values of the variable magnification optical system relating to the present Example.

TABLE 2

Second Example

[Surface Data]

| m | r | d | nd | νd |
|---|---|---|---|---|
| OP | ∞ | | | |
| 1 | 71.32483 | 2.150 | 1.84666 | 23.8 |
| 2 | 47.40907 | 8.400 | 1.75500 | 52.3 |
| 3 | 322.63295 | D3 | | |
| 4 | 400.00000 | 1.800 | 1.74353 | 49.5 |
| *5 | 16.36859 | 9.475 | | |
| 6 | −167.05753 | 2.029 | 1.75500 | 52.3 |
| 7 | 52.89355 | 0.797 | | |
| 8 | 36.08835 | 4.010 | 2.00069 | 25.5 |
| 9 | 256.44936 | D9 | | |
| 10 (S) | ∞ | 1.500 | | |
| *11 | 25.91417 | 3.857 | 1.55332 | 71.7 |
| 12 | −275.22572 | 1.078 | | |
| 13 | 51.71743 | 1.000 | 1.83481 | 42.7 |
| 14 | 21.38295 | 4.402 | 1.61800 | 63.3 |
| 15 | −80.10599 | 3.539 | | |
| 16 | −29.70942 | 1.000 | 1.81600 | 46.6 |
| 17 | 18.35723 | 5.582 | 1.59349 | 67.0 |
| 18 | −21.31475 | D18 | | |
| 19 | −21.98830 | 1.000 | 1.74950 | 35.2 |
| 20 | −53.12352 | 0.100 | | |
| 21 | 62.90338 | 5.816 | 1.62263 | 58.2 |
| *22 | −25.22856 | D22 | | |
| 23 | −35.90246 | 3.521 | 1.62263 | 58.2 |
| *24 | −23.00000 | 6.177 | | |
| 25 | −23.30716 | 1.500 | 1.61800 | 63.3 |
| 26 | 150.39447 | D26 | | |
| 27 | ∞ | 1.600 | 1.51680 | 64.1 |
| 28 | ∞ | D28 | | |
| I | ∞ | | | |

[Various Data]

Variable magnification ratio 2.75

| | W | M | T |
|---|---|---|---|
| f | 24.72 | 46.31 | 67.90 |
| FNo | 4.00 | 4.00 | 4.00 |
| ω | 43.6 | 24.3 | 16.8 |
| Y | 21.70 | 21.70 | 21.70 |
| TL | 122.013 | 134.611 | 152.248 |
| BF | 15.085 | 29.244 | 35.661 |
| BF (air converted length) | 14.540 | 28.699 | 35.116 |

[Lens Group Data]

| Lens Group | ST | f |
|---|---|---|
| 1$^{st}$ Lens Group | 1 | 128.74 |
| 2$^{nd}$ Lens Group | 4 | −28.81 |
| 3$^{rd}$ Lens Group | 10 | 38.09 |
| 4$^{th}$ Lens Group | 19 | 60.73 |
| 5$^{th}$ Lens Group | 23 | −52.48 |

[Aspherical Surface Data]

Surface Number: 5

K = 0.00000e+00  A4 = 2.31089e−05  A6 = 3.91931e−08
A8 = 8.80919e−12  A10 = 3.83889e−13

Surface Number: 11

K = 1.00000e+00  A4 = −6.11034e−06  A6 = 4.65530e−09
A8 = −7.97458e−11  A10 = 3.48297e−13

TABLE 2-continued

Second Example

Surface Number: 22

K = 1.00000e+00    A4 = 1.49147e−05    A6 = −1.52664e−08
A8 = −4.38703e−11    A10 = −3.36461e−14

Surface Number: 24

K = 1.00000e+00    A4 = 3.38657e−06    A6 = 2.78770e−08
A8 = 3.43065e−11    A10 = 1.67177e−13

[Variable Distance Data]

|  | W Infinite | M Infinite | T Infinite | W Close | M Close | T Close |
|---|---|---|---|---|---|---|
| D3 | 1.607 | 15.176 | 31.798 | 1.607 | 15.176 | 31.798 |
| D9 | 23.402 | 8.272 | 2.870 | 23.402 | 8.272 | 2.870 |
| D18 | 4.665 | 9.193 | 11.184 | 2.019 | 3.622 | 2.045 |
| D22 | 8.519 | 3.992 | 2.000 | 11.165 | 9.562 | 11.139 |
| D26 | 13.385 | 27.544 | 33.962 | 13.385 | 27.544 | 33.962 |
| D28 | 0.100 | 0.099 | 0.099 | 0.099 | 0.099 | 0.099 |

[Values for Conditional Expressions]

(1) f3f/f3r = −0.2058
(2) BFw/fw = 0.6709
(3) f1/fw = 5.2079
(4) βFw = 0.5717
(5) f5/f3 = −1.3777
(6) f1/f1Rw = 5.9279
(7) nd3fp = 1.5533
(8) vd3p = 71.6835
(9) 1/βRw = 0.7923
(10) f2fn/f2 = 0.7983
(11) fF/ft = 0.8944
(12) ωw = 43.6046°

Figure 5A:
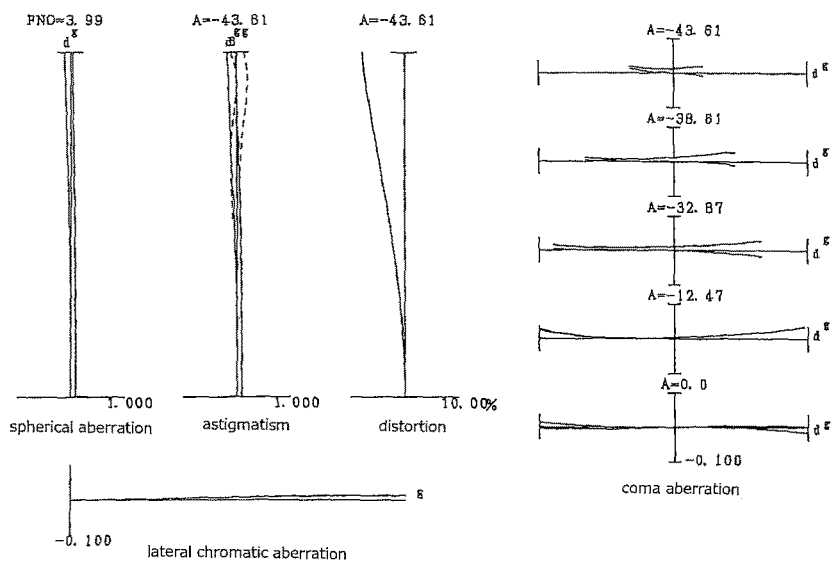
FIG. 5A, FIG. 5B and FIG. 5C are graphs showing various aberrations, upon focusing on an infinite distance object, in the wide angle end state, in the intermediate focal length state, and in the telephoto end state, respectively, of the variable magnification optical system according to the Second Example.
Figure 5B:
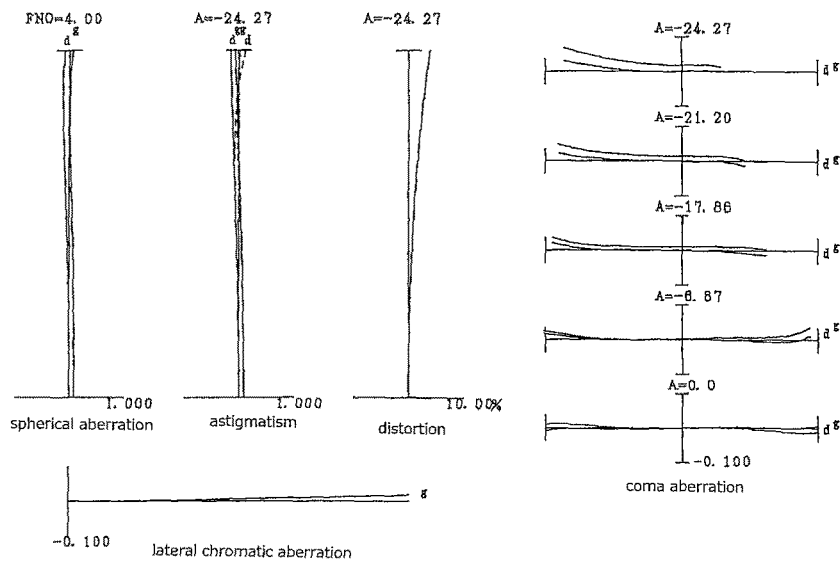
Figure 5C:
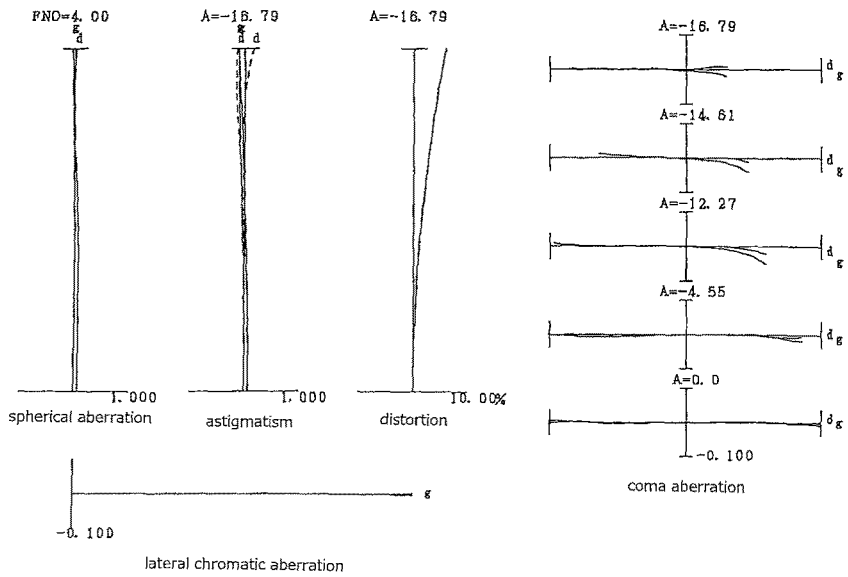

FIG. 5A, FIG. 5B and FIG. 5C are graphs showing various aberrations upon focusing on an infinite distance object, respectively, in the wide angle end state, in the intermediate focal length state and in the telephoto end state, of the variable magnification optical system according to the Second Example.

Figure 6A:
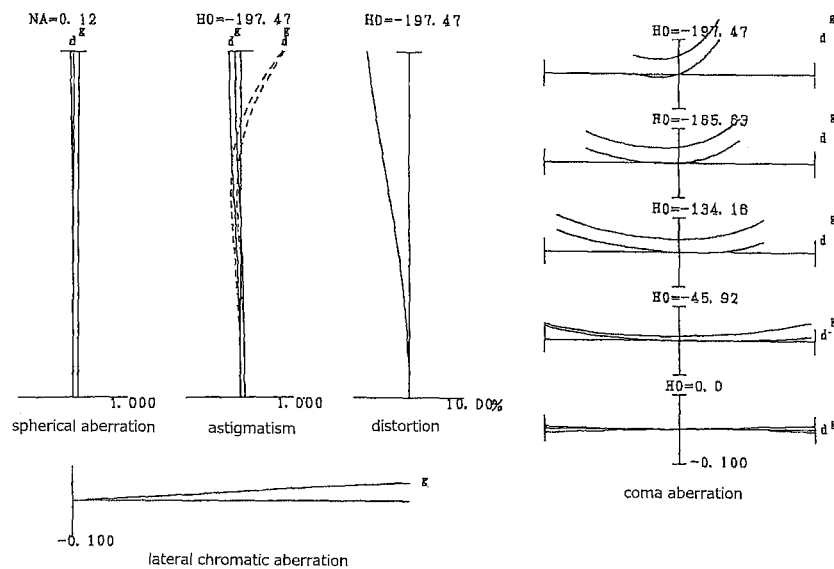
FIG. 6A, FIG. 6B and FIG. 6C are graphs showing various aberrations, upon focusing on a close distance object, in the wide angle end state, in the intermediate focal length state and in the telephoto end state, respectively, of the variable magnification optical system according to the Second Example.
Figure 6B:
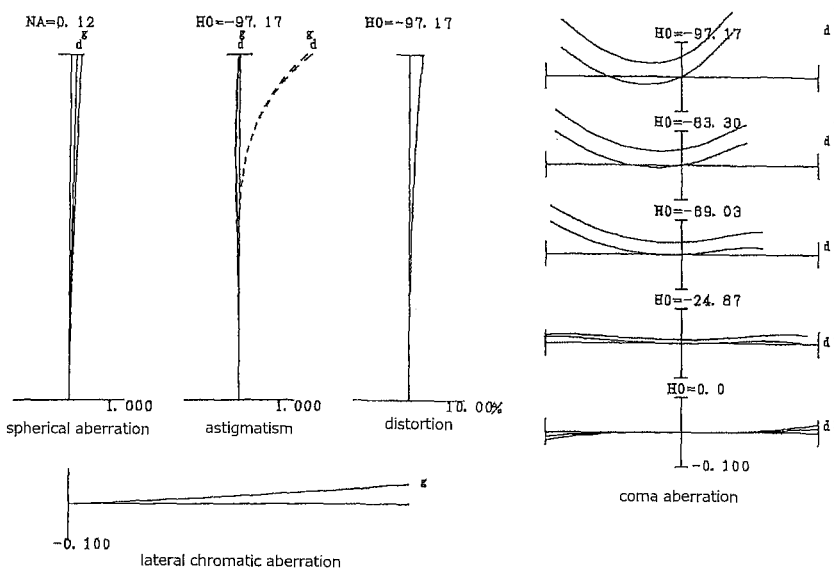
Figure 6C:
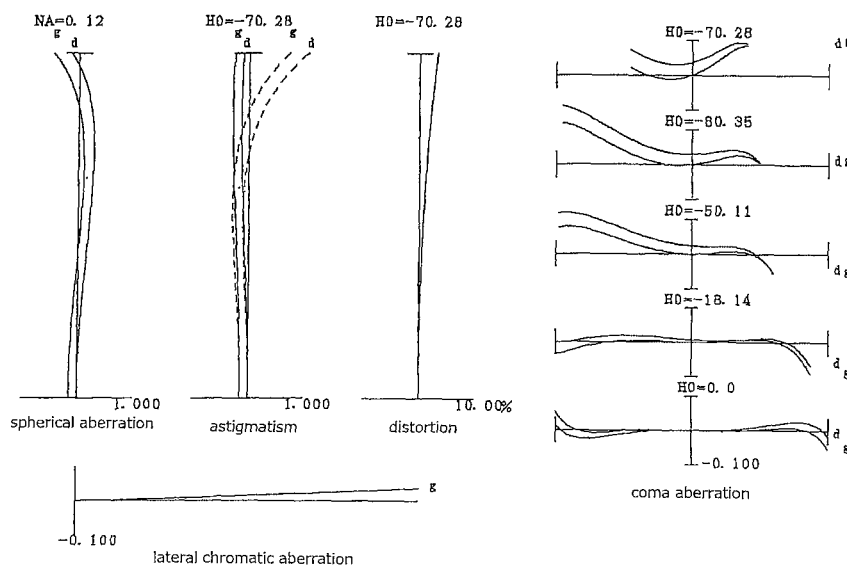

FIG. 6A, FIG. 6B and FIG. 6C are graphs showing various aberrations upon focusing on a close distance object, respectively, in the wide angle end state, in the intermediate focal length state and in the telephoto end state, of the variable magnification optical system according to the Second Example.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

Third Example

Figure 7A:
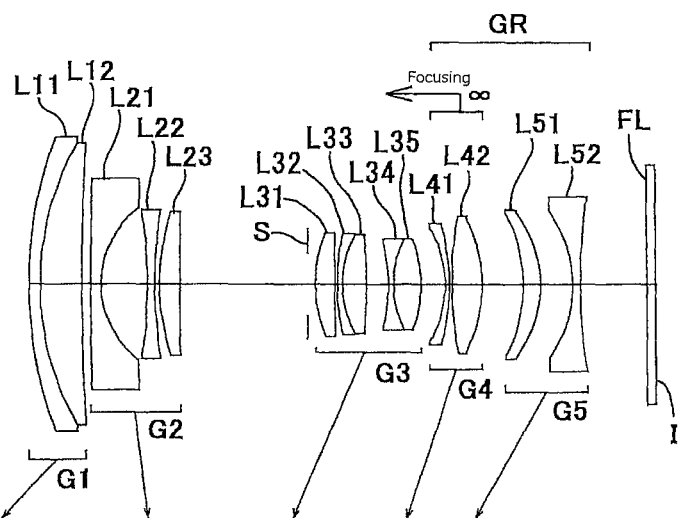
FIG. 7A, FIG. 7B and FIG. 7C are cross sectional views in the wide angle end state, in the intermediate focal length state and in the telephoto end state, respectively, of a variable magnification optical system according to a Third Example.
Figure 7B:
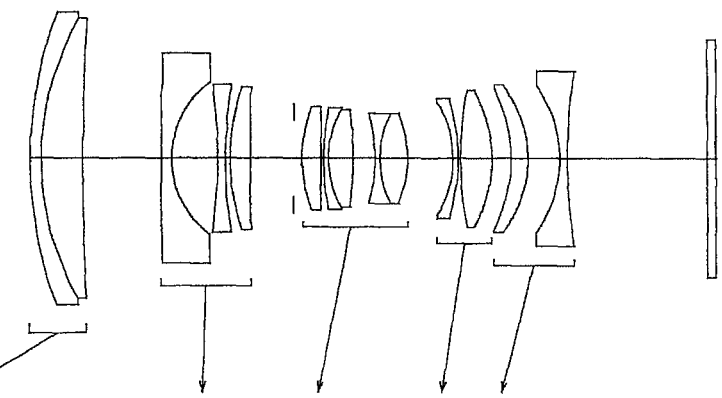
Figure 7C:
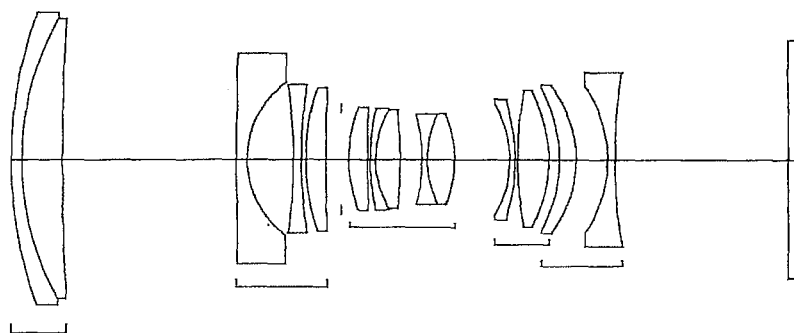

FIG. 7A, FIG. 7B and FIG. 7C are, respectively, cross sectional views in a wide angle end state, in an intermediate focal length state and in a telephoto end state, of a variable magnification optical system according to a Third Example of the variable magnification optical system of the present embodiment. Arrows below each lens group in FIG. 7A show directions of movements of respective lens groups upon varying magnification from a wide angle end state to an intermediate focal length state. Arrows below each lens group in FIG. 7B show movement trajectories of respective lens groups upon varying magnification from the intermediate focal length state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose image plane I side lens surface is aspherical.

The third lens group G3 consists of, in order from the object side along the optical axis, a positive meniscus lens L31 having a convex surface facing the object side, a cemented lens constructed by a negative meniscus lens L32 having a convex surface facing the object side cemented with a double convex positive lens L33, and a cemented lens constructed by a double concave negative lens L34 cemented with a double convex positive lens L35. The positive meniscus lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a negative meniscus lens L41 having a concave surface facing the object side, and a double convex positive lens L42. The double convex positive lens L42 is a glass mold type aspherical lens whose image plane I side lens surface is aspherical.

The fifth lens group G5 consists of, in order from the object side along the optical axis, a positive meniscus lens L51 having a concave surface facing the object side and a double concave negative lens L52. The positive meniscus lens L51 is a glass mold type aspherical lens whose image plane I side lens surface is aspherical.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 3 below shows various values of the variable magnification optical system relating to the present Example.

TABLE 3

Third Example

[Surface Data]

| m | r | d | nd | νd |
|---|---|---|---|---|
| OP | ∞ | | | |
| 1 | 77.74447 | 2.150 | 1.84666 | 23.8 |
| 2 | 53.55851 | 8.020 | 1.72916 | 54.6 |
| 3 | 478.39025 | D3 | | |
| 4 | 1000.00000 | 2.000 | 1.74250 | 49.4 |
| *5 | 17.13499 | 9.008 | | |
| 6 | −103.78967 | 1.500 | 1.75500 | 52.3 |
| 7 | 80.88445 | 0.942 | | |
| 8 | 41.82797 | 3.959 | 2.00069 | 25.5 |
| 9 | 874.65992 | D9 | | |
| 10 (S) | ∞ | 1.500 | | |
| *11 | 25.63046 | 3.669 | 1.55332 | 71.7 |
| 12 | 649.10845 | 0.500 | | |
| 13 | 43.22955 | 1.000 | 1.83481 | 42.7 |
| 14 | 18.28418 | 4.715 | 1.61800 | 63.3 |
| 15 | −90.27190 | 4.286 | | |
| 16 | −32.75074 | 1.000 | 1.81600 | 46.6 |
| 17 | 18.81533 | 5.331 | 1.59349 | 67.0 |
| 18 | −22.38426 | D18 | | |
| 19 | −20.95545 | 1.000 | 1.80610 | 33.3 |
| 20 | −38.43736 | 0.450 | | |
| 21 | 70.13258 | 6.000 | 1.62263 | 58.2 |
| *22 | −25.20560 | D22 | | |
| 23 | −28.47777 | 3.307 | 1.69350 | 53.3 |
| *24 | −21.27208 | 6.193 | | |
| 25 | −24.27627 | 1.500 | 1.61881 | 63.9 |
| 26 | 106.34326 | D26 | | |
| 27 | ∞ | 1.600 | 1.51680 | 64.1 |
| 28 | ∞ | D28 | | |
| I | ∞ | | | |

[Various Data]
Variable magnification ratio 2.75

| | W | M | T |
|---|---|---|---|
| f | 24.72 | 46.31 | 67.90 |
| FNo | 4.00 | 4.28 | 4.00 |
| ω | 43.9 | 24.1 | 16.6 |
| Y | 21.70 | 21.70 | 21.70 |
| TL | 121.939 | 132.931 | 151.948 |
| BF | 14.546 | 28.656 | 35.001 |
| BF (air converted length) | 14.000 | 28.111 | 34.456 |

TABLE 3-continued

Third Example

[Lens Group Data]

| Lens Group | ST | f |
|---|---|---|
| $1^{st}$ Lens Group | 1 | 137.34 |
| $2^{nd}$ Lens Group | 4 | −31.18 |
| $3^{rd}$ Lens Group | 10 | 38.77 |
| $4^{th}$ Lens Group | 19 | 54.86 |
| $5^{th}$ Lens Group | 23 | −47.21 |

[Aspherical Surface Data]

Surface Number: 5 K = 0.00000e+00 A4 = 2.00686e−05 A6 = 2.97810e−08
A8 = 2.98043e−11 A10 = 1.72509e−13
Surface Number: 11 K = 1.00000e+00 A4 = −5.31955e−06 A6 = 1.45892e−09
A8 = 2.19477e−11 A10 = −2.48946e−13
Surface Number: 22 K = 1.00000e+00 A4 = 1.44228e−05 A6 = −1.30721e−08
A8 = 5.35466e−12 A10 = −2.19209e−13
Surface Number: 24 K = 1.00000e+00 A4 = 5.35295e−06 A6 = 2.89950e−08
A8 = −2.95842e−11 A10 = 3.75280e−13

[Variable Distance Data]

| | W Infinite | M Infinite | T Infinite | W Close | M Close | T Close |
|---|---|---|---|---|---|---|
| D3 | 1.704 | 15.094 | 33.353 | 1.704 | 15.094 | 33.353 |
| D9 | 24.986 | 8.476 | 2.890 | 24.986 | 8.476 | 2.890 |
| D18 | 4.613 | 8.792 | 10.677 | 2.183 | 3.795 | 2.527 |
| D22 | 8.064 | 3.886 | 2.000 | 10.494 | 8.882 | 10.150 |
| D26 | 12.846 | 26.958 | 33.303 | 12.846 | 26.958 | 33.303 |
| D28 | 0.100 | 0.099 | 0.098 | 0.099 | 0.098 | 0.098 |

[Values for Conditional Expressions]

| (1) | f3f/f3r = −0.2001 |
|---|---|
| (2) | BFw/fw = 0.6491 |
| (3) | f1/fw = 5.5559 |
| (4) | βFw = 0.5546 |
| (5) | f5/f3 = −1.2178 |
| (6) | f1/f1Rw = 6.2478 |
| (7) | nd3fp = 1.5533 |
| (8) | vd3p = 1.6835 |
| (9) | 1/βRw = 0.7706 |
| (10) | f2fn/f2 = 0.7537 |
| (11) | fF/ft = 0.8080 |
| (12) | ωw = 43.9044° |

Figure 8A:
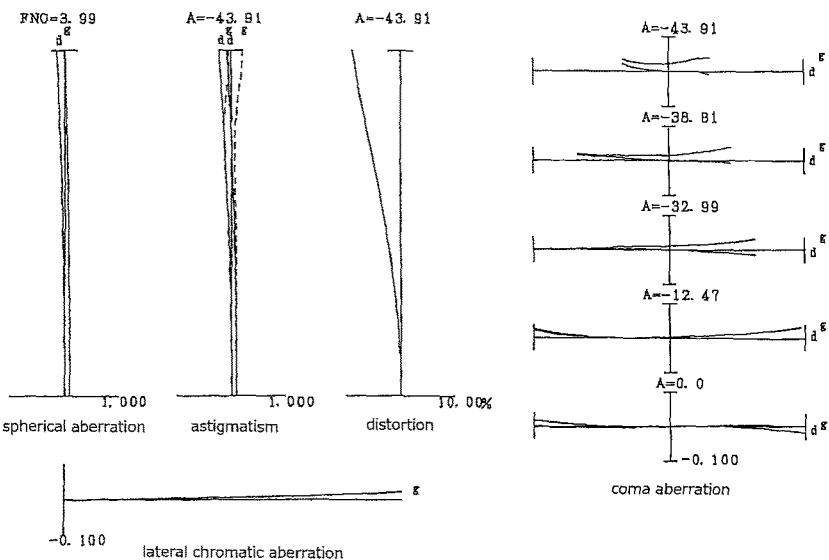
FIG. 8A, FIG. 8B and FIG. 8C are graphs showing various aberrations, upon focusing on an infinite distance object, in the wide angle end state, in the intermediate focal length state, and in the telephoto end state, respectively, of the variable magnification optical system according to the Third Example.
Figure 8B:
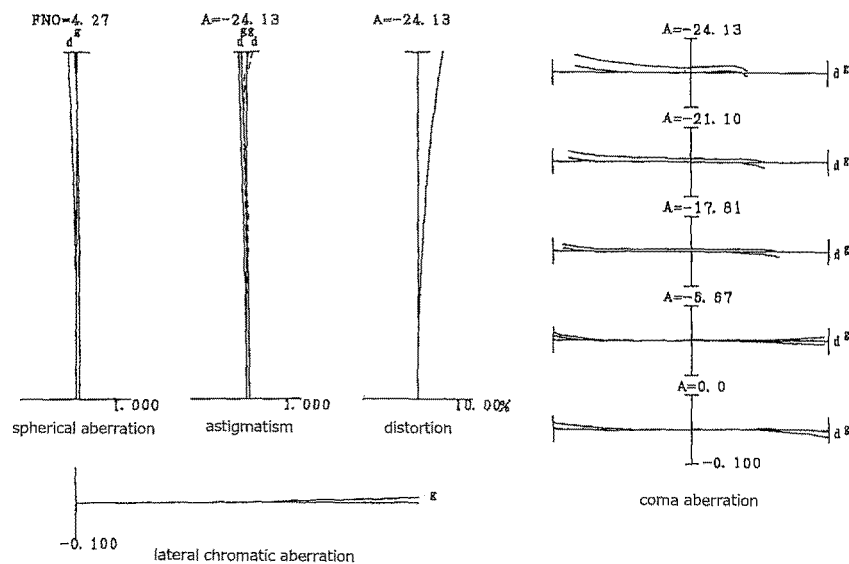
Figure 8C:
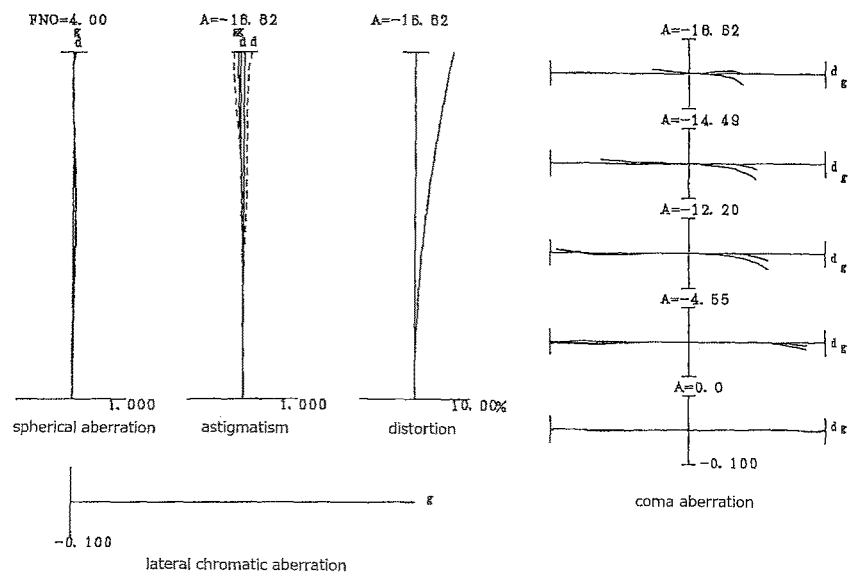

FIG. 8A, FIG. 8B and FIG. 8C are graphs showing various aberrations upon focusing on an infinite distance object, respectively, in the wide angle end state, in the intermediate focal length state and in the telephoto end state, of the variable magnification optical system according to the Third Example.

Figure 9A:
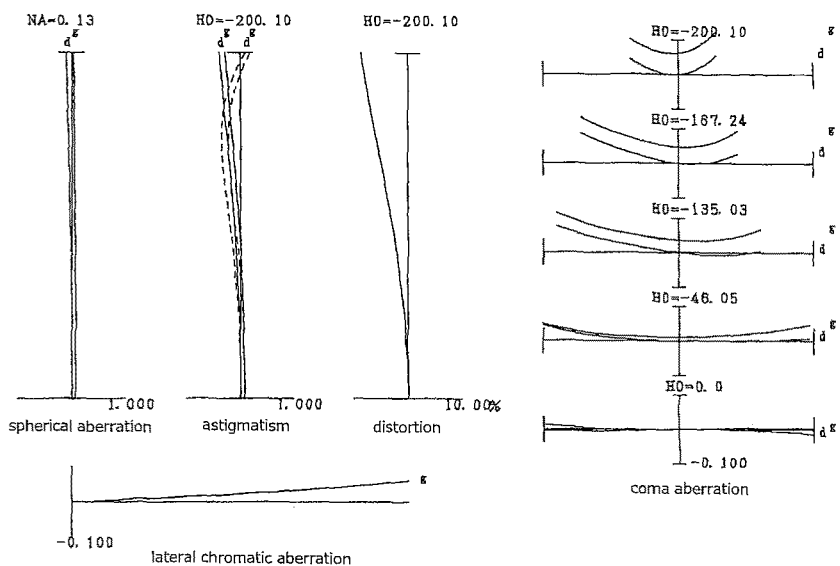
FIG. 9A, FIG. 9B and FIG. 9C are graphs showing various aberrations, upon focusing on a close distance object, in the wide angle end state, in the intermediate focal length state and in the telephoto end state, respectively, of the variable magnification optical system according to the Third Example.
Figure 9B:
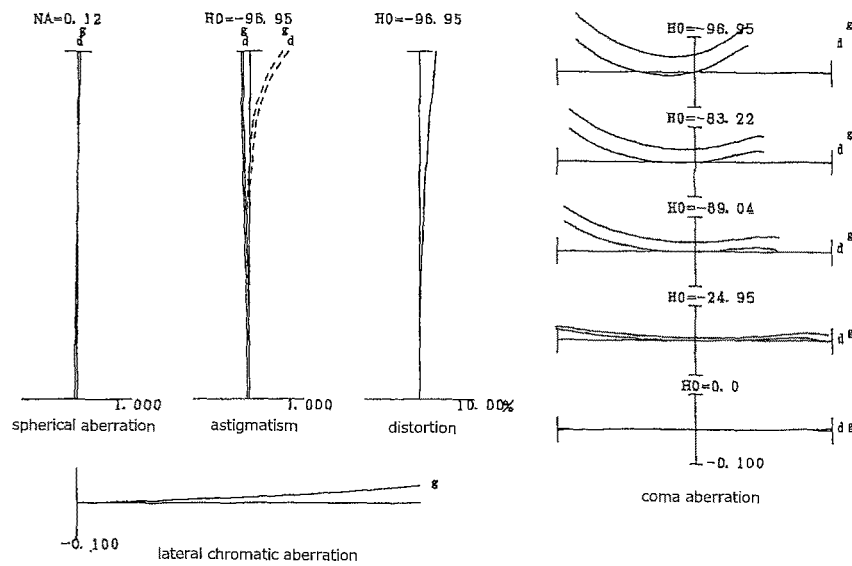
Figure 9C:
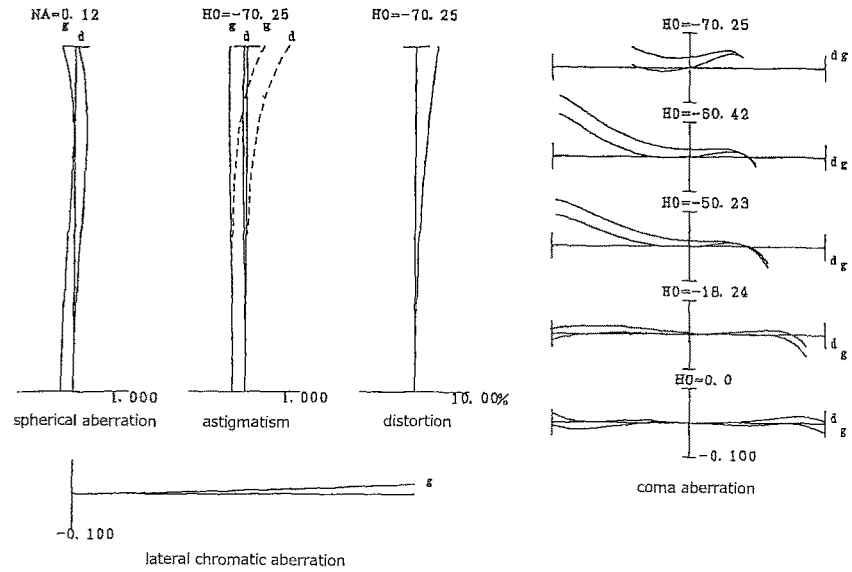

FIG. 9A, FIG. 9B and FIG. 9C are graphs showing various aberrations upon focusing on a close distance object, respectively, in the wide angle end state, in the intermediate focal length state and in the telephoto end state, of the variable magnification optical system according to the Third Example.

As is apparent from the above-mentioned graphs showing aberrations, it is understood that the variable magnification optical system relating to the present Example can correct superbly various aberrations over the wide angle end state to the telephoto end state and has excellent performance, and further has excellent imaging performance even upon focusing on a close distance object.

Fourth Example

Figure 10A:
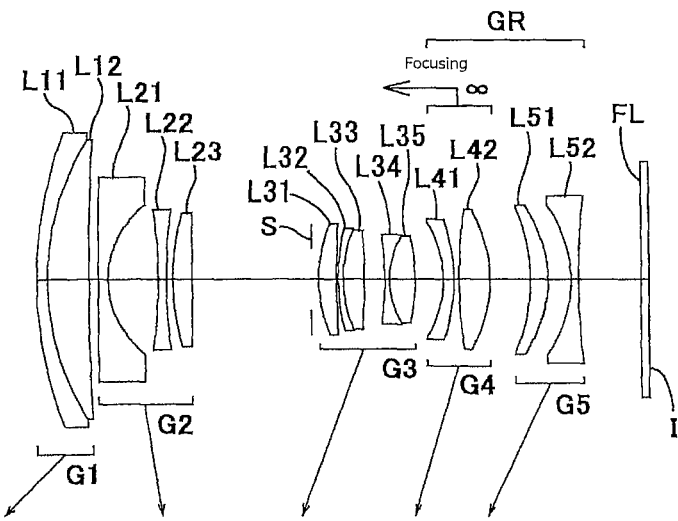
FIG. 10A, FIG. 10B and FIG. 10C are cross sectional views in the wide angle end state, in the intermediate focal length state and in the telephoto end state, respectively, of a variable magnification optical system according to a Fourth Example.
Figure 10B:
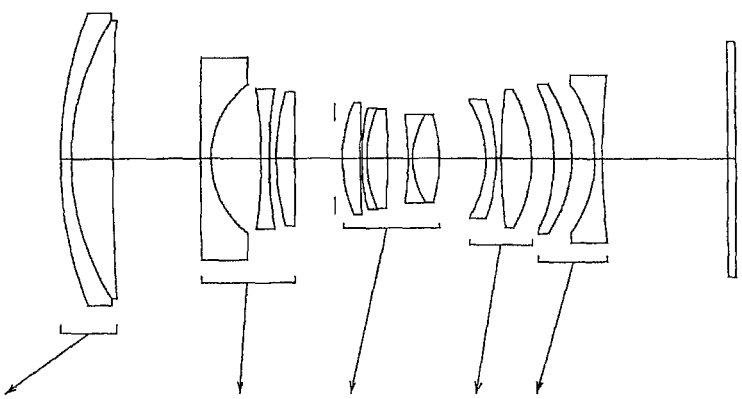
Figure 10C:
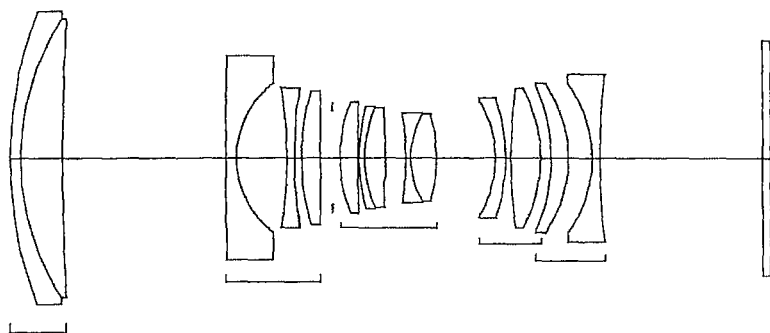

FIG. 10A, FIG. 10B and FIG. 10C are, respectively, cross sectional views in a wide angle end state, in an intermediate focal length state and in a telephoto end state, of a variable magnification optical system according to a Fourth Example of the variable magnification optical system of the present embodiment. Arrows below each lens group in FIG. 10A show directions of movements of respective lens groups upon varying magnification from a wide angle end state to an intermediate focal length state. Arrows below each lens group in FIG. 10B show movement trajectories of respective lens groups upon varying magnification from the intermediate focal length state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose image plane I side lens surface is aspherical.

The third lens group G3 consists of, in order from the object side along the optical axis, a positive meniscus lens L31 having a convex surface facing the object side, a cemented lens constructed by a negative meniscus lens L32 having a convex surface facing the object side cemented with a double convex positive lens L33, and a cemented lens constructed by a double concave negative lens L34 cemented with a double convex positive lens L35. The positive meniscus lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a negative meniscus lens L41 having a concave surface facing the object side, and a double convex positive lens L42. The double convex positive lens L42 is a glass mold type aspherical lens whose image plane I side lens surface is aspherical.

The fifth lens group G5 consists of, in order from the object side, a positive meniscus lens L51 having a concave surface facing the object side and a double concave negative lens L52. The positive meniscus lens L51 is a glass mold type aspherical lens whose image plane I side lens surface is aspherical.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 4 below shows various values of the variable magnification optical system relating to the present Example.

TABLE 4

Fourth Example

[Surface Data]

| m | r | d | nd | vd |
|---|---|---|---|---|
| OP | ∞ | | | |
| 1 | 76.69882 | 2.150 | 1.84666 | 23.8 |
| 2 | 49.37863 | 8.183 | 1.75500 | 52.3 |
| 3 | 439.48582 | D3 | | |
| 4 | 1000.00000 | 2.000 | 1.74250 | 49.4 |
| *5 | 17.13499 | 9.947 | | |
| 6 | −92.86562 | 1.500 | 1.75500 | 52.3 |
| 7 | 89.43926 | 1.284 | | |
| 8 | 45.22218 | 3.631 | 2.00069 | 25.5 |
| 9 | 1279.93050 | D9 | | |
| 10 (S) | ∞ | 1.500 | | |
| *11 | 25.91677 | 3.597 | 1.55332 | 71.7 |
| 12 | 261.64746 | 0.300 | | |
| 13 | 38.95443 | 1.000 | 1.83481 | 42.7 |
| 14 | 23.18065 | 4.122 | 1.61800 | 63.3 |
| 15 | −155.71305 | 4.035 | | |
| 16 | −65.68195 | 1.000 | 1.83481 | 42.7 |
| 17 | 15.75952 | 5.135 | 1.61800 | 63.3 |
| 18 | −32.57355 | D18 | | |
| 19 | −20.56363 | 2.000 | 1.80100 | 34.9 |
| 20 | −34.41474 | 1.000 | | |
| 21 | 89.46436 | 6.000 | 1.59201 | 67.0 |
| *22 | −24.96683 | D22 | | |
| 23 | −34.33374 | 3.425 | 1.55332 | 71.7 |
| *24 | −23.28316 | 4.520 | | |
| 25 | −24.47581 | 1.500 | 1.61881 | 63.9 |
| 26 | 132.00709 | D26 | | |
| 27 | ∞ | 1.500 | 1.51680 | 64.1 |
| 28 | ∞ | D28 | | |
| I | ∞ | | | |

TABLE 4-continued

Fourth Example

[Various Data]
Variable magnification ratio 2.75

|  | W | M | T |
|---|---|---|---|
| f | 24.72 | 46.31 | 67.90 |
| FNo | 4.00 | 4.18 | 4.00 |
| ω | 43.6 | 23.8 | 16.5 |
| Y | 21.70 | 21.70 | 21.70 |
| TL | 121.051 | 133.285 | 149.815 |
| BF | 14.060 | 26.434 | 33.679 |
| BF (air converted length) | 13.549 | 25.923 | 33.168 |

[Lens Group Data]

| Lens Group | ST | f |
|---|---|---|
| $1^{st}$ Lens Group | 1 | 131.85 |
| $2^{nd}$ Lens Group | 4 | −29.95 |
| $3^{rd}$ Lens Group | 10 | 35.73 |
| $4^{th}$ Lens Group | 19 | 55.25 |
| $5^{th}$ Lens Group | 23 | −46.59 |

[Aspherical Surface Data]

Surface Number: 5 K = 0.00000e+00 A4 = 1.93492e−05 A6 = 2.97056e−08
A8 = 3.40451e−11 A10 = 1.36704e−13
Surface Number: 11 K = 1.00000e+00 A4 = −5.53738e−06 A6 = 5.67727e−10
A8 = 5.02317e−11 A10 = −4.30689e−13
Surface Number: 22 K = 1.00000e+00 A4 = 1.49131e−05 A6 = −1.16787e−08
A8 = 1.79818e−12 A10 = −2.00447e−13
Surface Number: 24 K = 1.00000e+00 A4 = 3.34976e−06 A6 = 2.85281e−08
A8 = −3.37056e−11 A10 = 3.81301e−13

[Variable Distance Data]

|  | W Infinite | M Infinite | T Infinite | W Close | M Close | T Close |
|---|---|---|---|---|---|---|
| D3 | 1.800 | 17.426 | 32.352 | 1.800 | 17.426 | 32.352 |
| D9 | 23.692 | 7.926 | 2.285 | 23.692 | 7.926 | 2.285 |
| D18 | 5.643 | 9.324 | 11.669 | 2.987 | 3.852 | 2.996 |
| D22 | 8.025 | 4.345 | 2.000 | 10.681 | 9.817 | 10.673 |
| D26 | 12.460 | 24.834 | 32.078 | 12.460 | 24.834 | 32.078 |
| D28 | 0.100 | 0.101 | 0.101 | 0.100 | 0.101 | 0.101 |

[Values for Conditional Expressions]

| (1) | f3f/f3r = −0.1708 |
|---|---|
| (2) | BFw/fw = 0.6294 |
| (3) | f1/fw = 5.3337 |
| (4) | βFw = 0.6214 |
| (5) | f5/f3 = −1.3040 |
| (6) | f1/f1Rw = 6.0287 |
| (7) | nd3fp = 1.5533 |
| (8) | υd3p = 71.6835 |
| (9) | 1/βRw = 0.7672 |
| (10) | f2fn/f2 = 0.7846 |
| (11) | fF/ft = 0.8135 |
| (12) | ωw = 43.5536° |

Figure 11A:
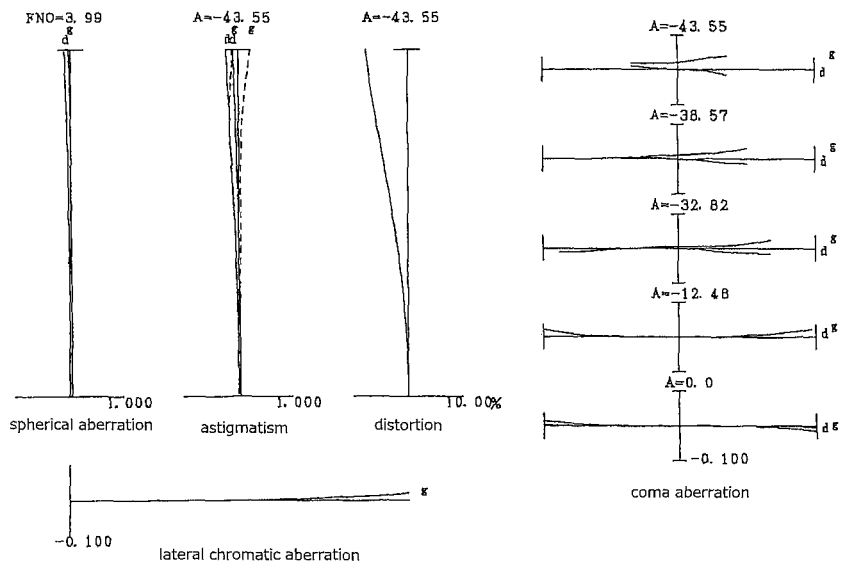
FIG. 11A, FIG. 11B and FIG. 11C are graphs showing various aberrations, upon focusing on an infinite distance object, in the wide angle end state, in the intermediate focal length state and in the telephoto end state, respectively, of the variable magnification optical system according to the Fourth Example.
Figure 11B:
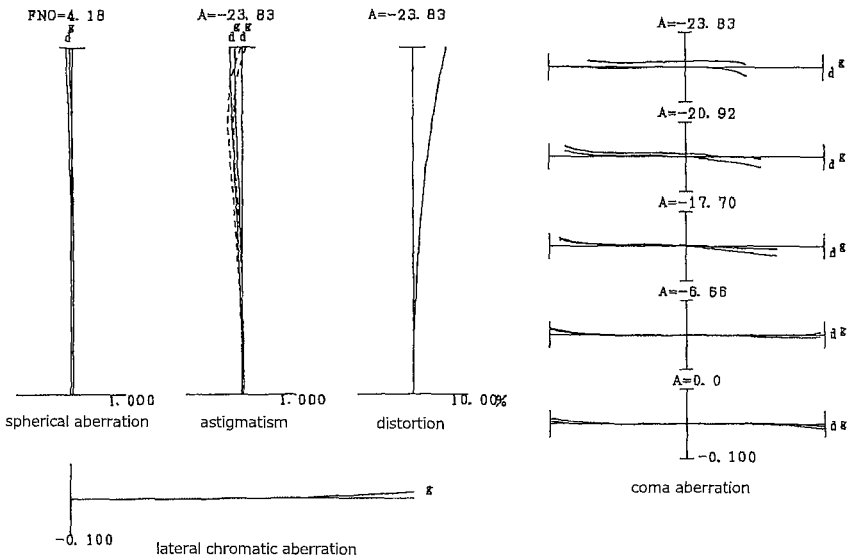
Figure 11C:
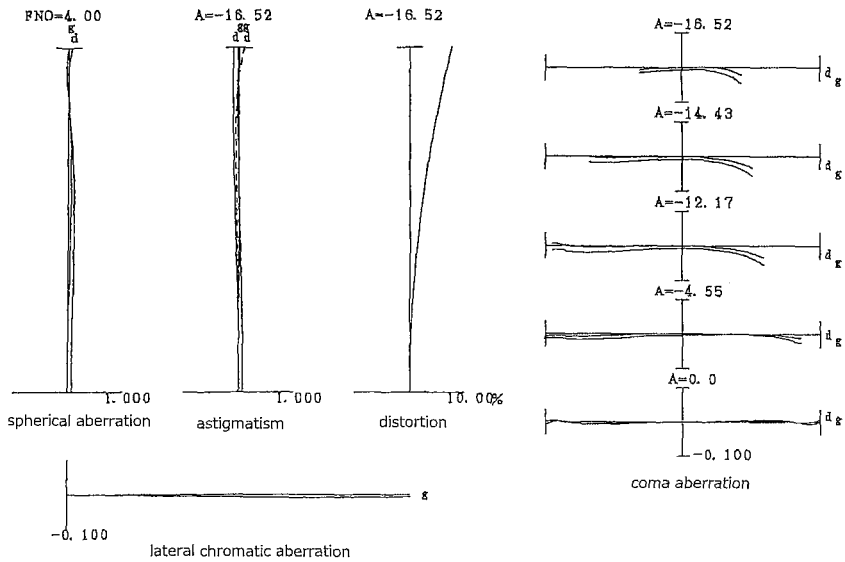

FIG. 11A, FIG. 11B and FIG. 11C are graphs showing various aberrations upon focusing on an infinite distance object, respectively, in the wide angle end state, in the intermediate focal length state and in the telephoto end state, of the variable magnification optical system according to the Fourth Example.

Figure 12A:
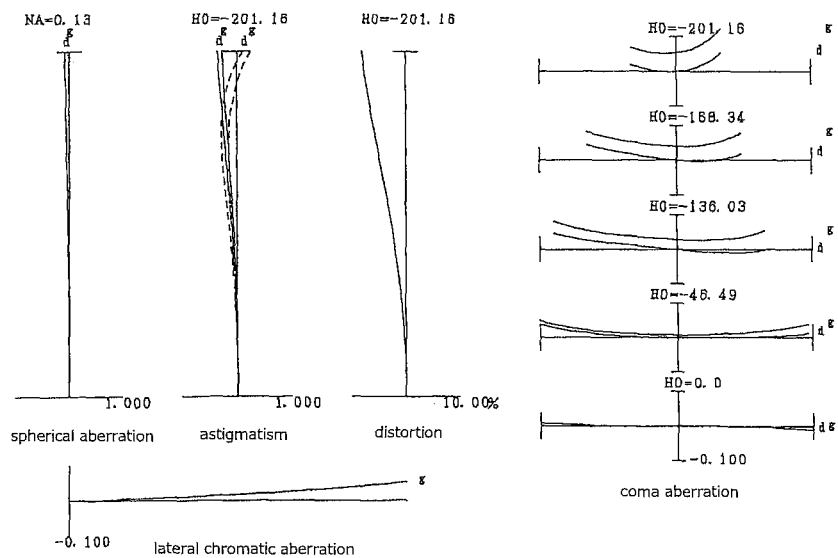
FIG. 12A, FIG. 12B and FIG. 12C are graphs showing various aberrations, upon focusing on a close distance object, in the wide angle end state, in the intermediate focal length state and in the telephoto end state, respectively, of the variable magnification optical system according to the Fourth Example.
Figure 12B:
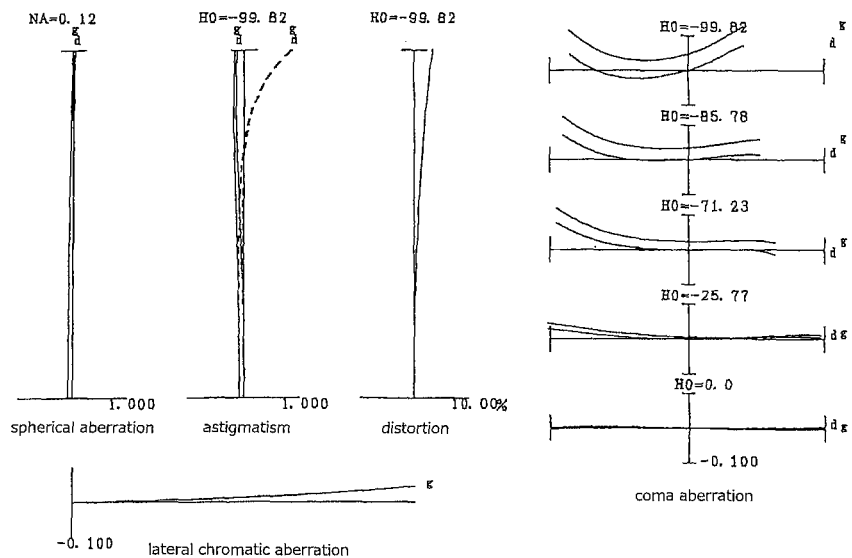
Figure 12C:
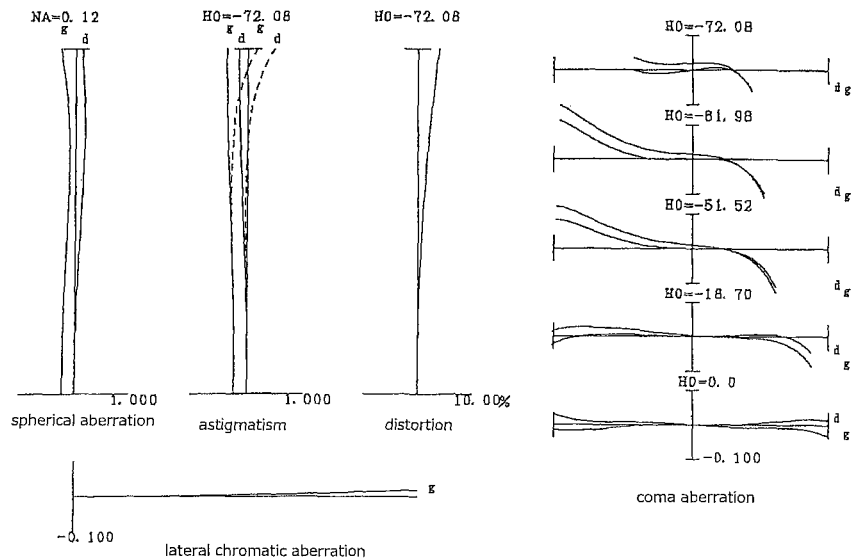

FIG. 12A, FIG. 12B and FIG. 12C are graphs showing various aberrations upon focusing on a close distance object, respectively, in the wide angle end state, in the intermediate focal length state and in the telephoto end state, of the variable magnification optical system according to the Fourth Example.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

Fifth Example

Figure 13A:
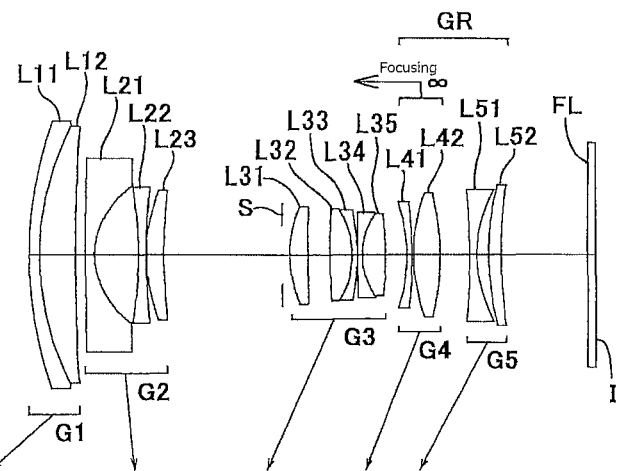
FIG. 13A, FIG. 13B and FIG. 13C are cross sectional views in the wide angle end state, in the intermediate focal length state and in the telephoto end state, respectively, of a variable magnification optical system according to a Fifth Example.
Figure 13B:
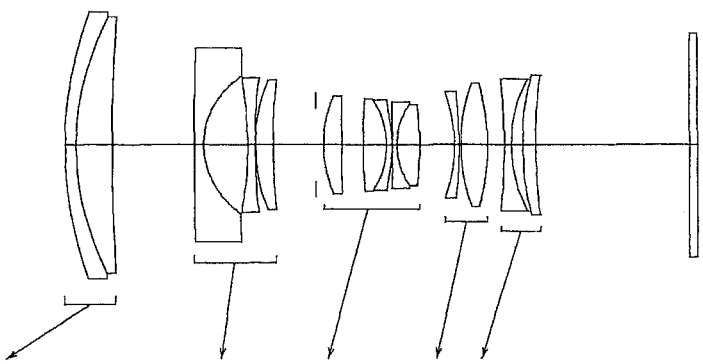
Figure 13C:
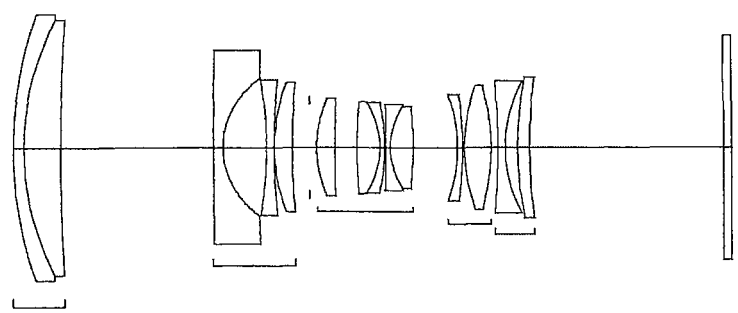

FIG. 13A, FIG. 13B and FIG. 13C are, respectively, cross sectional views in a wide angle end state, in an intermediate focal length state and in a telephoto end state, of a variable magnification optical system according to a Fifth Example of the variable magnification optical system of the present embodiment. Arrows below each lens group in FIG. 13A show directions of movements of respective lens groups upon varying magnification from a wide angle end state to an intermediate focal length state. Arrows below each lens group in FIG. 13B show movement trajectories of respective lens groups upon varying magnification from the intermediate focal length state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose object side lens surface and image plane I side lens surface are aspherical.

The third lens group G3 consists of, in order from the object side along the optical axis, a positive meniscus lens L31 having a convex surface facing the object side, a cemented lens constructed by a double convex positive lens L32 cemented with a negative meniscus lens L33 having a concave surface facing the object side and a cemented lens constructed by a double concave negative lens L34 cemented with a double convex positive lens L35. The positive meniscus lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a negative meniscus lens L41 having a concave surface facing the object side, and a double convex positive lens L42. The double convex positive lens L42 is a glass mold type aspherical lens whose image plane I side lens surface is aspherical.

The fifth lens group G5 consists of, in order from the object side along the optical axis, a double concave negative lens L51 and a positive meniscus lens L52 having a convex surface facing the object side.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 5 below shows various values of the variable magnification optical system relating to the present Example.

TABLE 5

Fifth Example

[Surface Data]

| m | r | d | nd | vd |
|---|---|---|---|---|
| OP | ∞ | | | |
| 1 | 78.28661 | 2.200 | 1.94595 | 18.0 |
| 2 | 55.12139 | 7.465 | 1.83481 | 42.7 |
| 3 | 416.58751 | D3 | | |
| *4 | 600.00000 | 2.000 | 1.74330 | 49.3 |
| *5 | 14.79065 | 9.268 | | |
| 6 | −80.00000 | 1.500 | 1.49782 | 82.6 |
| 7 | 112.11004 | 0.150 | | |
| 8 | 35.97822 | 3.589 | 2.00069 | 25.5 |
| 9 | 115.26124 | D9 | | |
| 10 (S) | ∞ | 1.500 | | |
| *11 | 22.34807 | 3.756 | 1.61881 | 63.9 |
| 12 | 215.30357 | 4.534 | | |
| 13 | 116.19602 | 4.736 | 1.61800 | 63.3 |
| 14 | −16.99559 | 1.000 | 1.61266 | 44.5 |
| 15 | −42.70583 | 0.150 | | |
| 16 | −3080.10830 | 1.000 | 1.83481 | 42.7 |
| 17 | 14.42589 | 4.664 | 1.49782 | 82.6 |
| 18 | −73.51276 | D18 | | |
| 19 | −32.33307 | 1.000 | 1.80100 | 34.9 |
| 20 | −94.44385 | 0.415 | | |
| 21 | 34.51492 | 5.500 | 1.69350 | 53.2 |

TABLE 5-continued

Fifth Example

| | | | | |
|---|---|---|---|---|
| *22 | −39.28206 | D22 | | |
| 23 | −146.73735 | 1.500 | 1.59319 | 67.9 |
| 24 | 27.39699 | 2.426 | | |
| 25 | 58.23961 | 2.594 | 1.69895 | 30.1 |
| 26 | 100.00000 | D26 | | |
| 27 | ∞ | 1.500 | 1.51680 | 64.1 |
| 28 | ∞ | D28 | | |
| I | ∞ | | | |

[Various Data]
Variable magnification ratio 2.75

| | W | M | T |
|---|---|---|---|
| f | 24.71 | 46.31 | 67.90 |
| FNo | 4.00 | 4.18 | 4.00 |
| ω | 43.3 | 23.8 | 16.5 |
| Y | 21.70 | 21.70 | 21.70 |
| TL | 117.744 | 130.814 | 147.913 |
| BF | 19.640 | 33.380 | 41.487 |
| BF (air converted length) | 19.129 | 32.869 | 40.976 |

[Lens Group Data]

| Lens Group | ST | f |
|---|---|---|
| $1^{st}$ Lens Group | 1 | 121.95 |
| $2^{nd}$ Lens Group | 4 | −27.81 |
| $3^{rd}$ Lens Group | 10 | 36.02 |
| $4^{th}$ Lens Group | 19 | 45.26 |
| $5^{th}$ Lens Group | 23 | −48.61 |

[Aspherical Surface Data]

Surface Number: 4 K = 1.00000e+00 A4 = 1.94041e−06 A6 = −1.27348e−08
A8 = 2.13014e−11 A10 = −1.37676e−14
Surface Number: 5 K = 0.00000e+00 A4 = 2.59781e−05 A6 = 6.01951e−08
A8 = −1.23842e−10 A10 = 2.09998e−13
Surface Number: 11 K = 1.00000e+00 A4 = −1.43227e−05 A6 = 1.69157e−08
A8 = −3.97283e−10 A10 = 1.27743e−12
Surface Number: 22 K = 1.00000e+00 A4 = 1.66914e−05 A6 = −1.21729e−08
A8 = −1.24851e−12 A10 = 9.57183e−15

[Variable Distance Data]

| | W Infinite | M Infinite | T Infinite | W Close | M Close | T Close |
|---|---|---|---|---|---|---|
| D3 | 2.000 | 16.993 | 31.289 | 2.000 | 16.993 | 31.289 |
| D9 | 24.595 | 8.932 | 3.628 | 24.595 | 8.932 | 3.628 |
| D18 | 4.555 | 7.160 | 9.062 | 2.811 | 3.351 | 2.811 |
| D22 | 6.007 | 3.402 | 1.500 | 7.751 | 7.211 | 7.751 |
| D26 | 18.040 | 31.781 | 39.888 | 18.040 | 31.781 | 39.888 |
| D28 | 0.100 | 0.100 | 0.100 | 0.100 | 0.099 | 0.100 |

[Values for Conditional Expressions]

(1) f3f/f3r = −0.4100
(2) BFw/fw = 0.8998
(3) f1/fw = 4.9349
(4) βFw = 0.5108
(5) f5/f3 = −1.3496
(6) f1/f1Rw = 5.6533
(7) nd3fp = 1.6188
(8) υd3p = 63.8544
(9) 1/βRw = 0.6758
(10) f2fn/f2 = 0.7346
(11) fF/ft = 0.6668
(12) ωw = 43.2711°

Figure 14A:
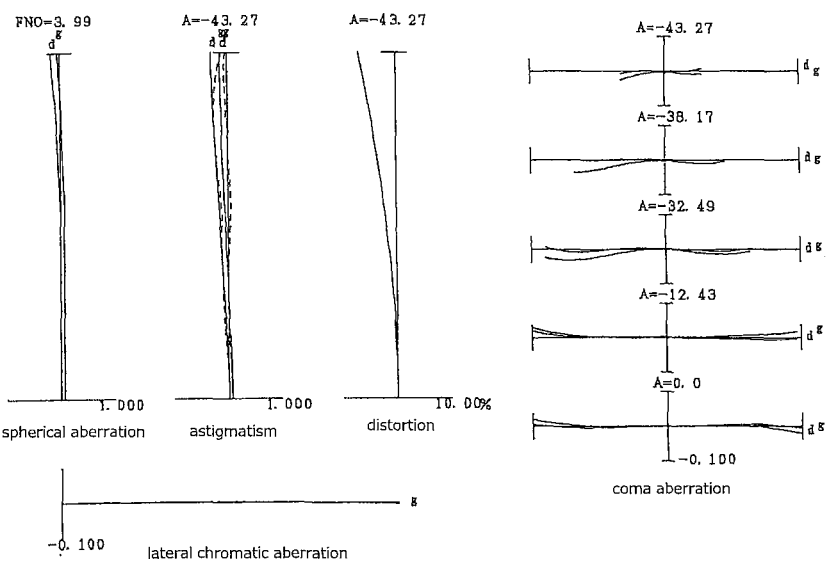
FIG. 14A, FIG. 14B and FIG. 14C are graphs showing various aberrations, upon focusing on an infinite distance object, in the wide angle end state, in the intermediate focal length state and in the telephoto end state, respectively, of the variable magnification optical system according to the Fifth Example.
Figure 14B:
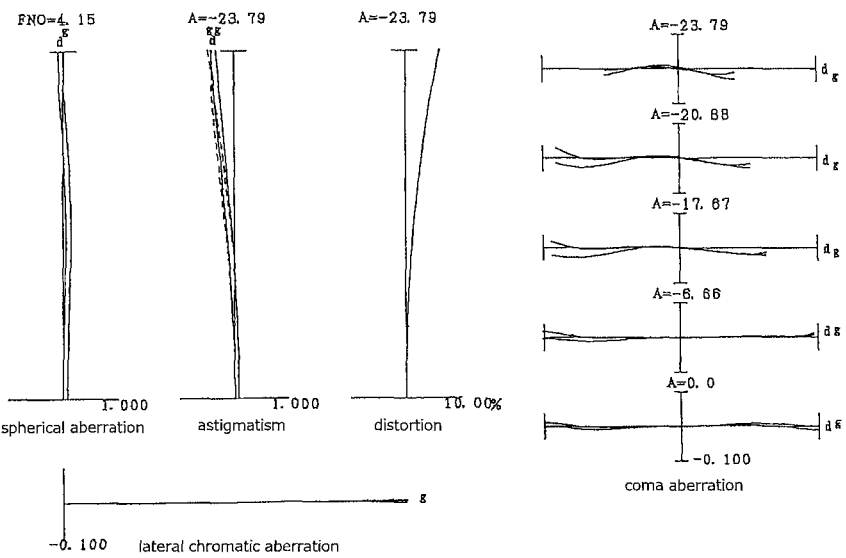
Figure 14C:
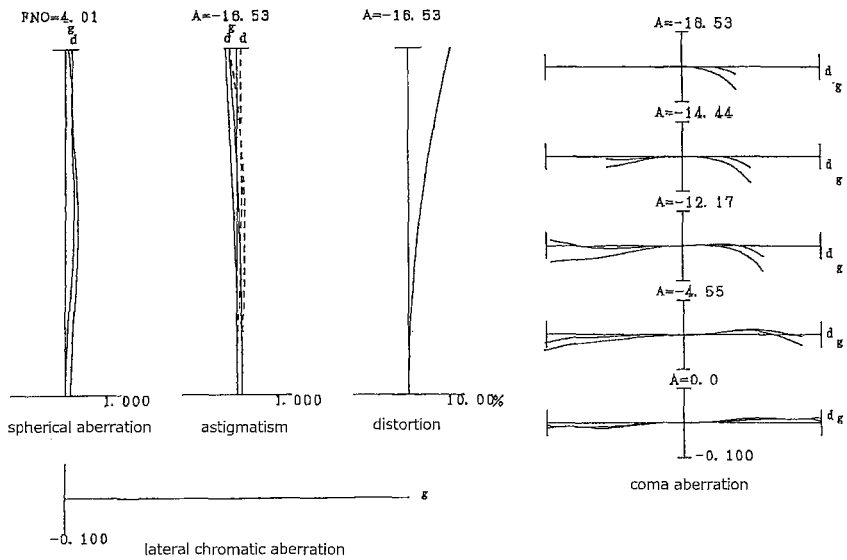

FIG. 14A, FIG. 14B and FIG. 14C are graphs showing various aberrations upon focusing on an infinite distance object, respectively, in the wide angle end state, in the intermediate focal length state and in the telephoto end state, of the variable magnification optical system according to the Fifth Example.

Figure 15A:
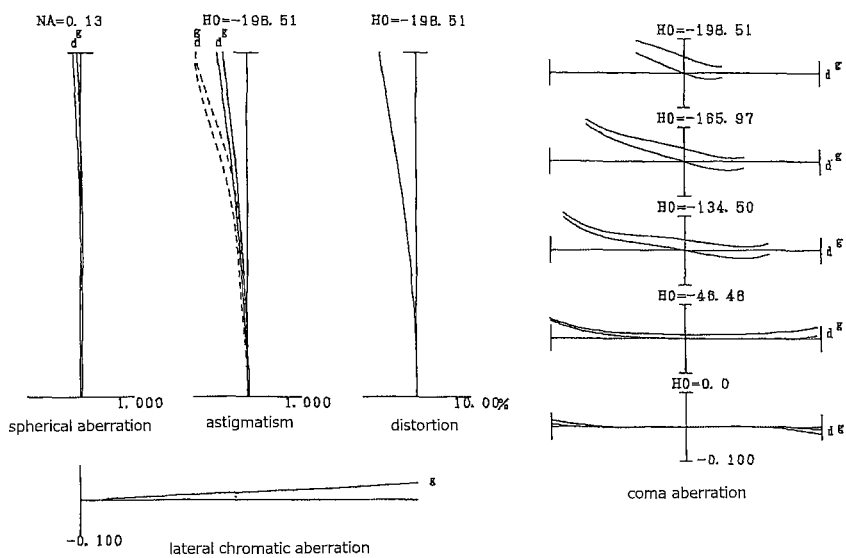
FIG. 15A, FIG. 15B and FIG. 15C are graphs showing various aberrations, upon focusing on a close distance object, in the wide angle end state, in the intermediate focal length state and in the telephoto end state, respectively, of the variable magnification optical system according to the Fifth Example.
Figure 15B:
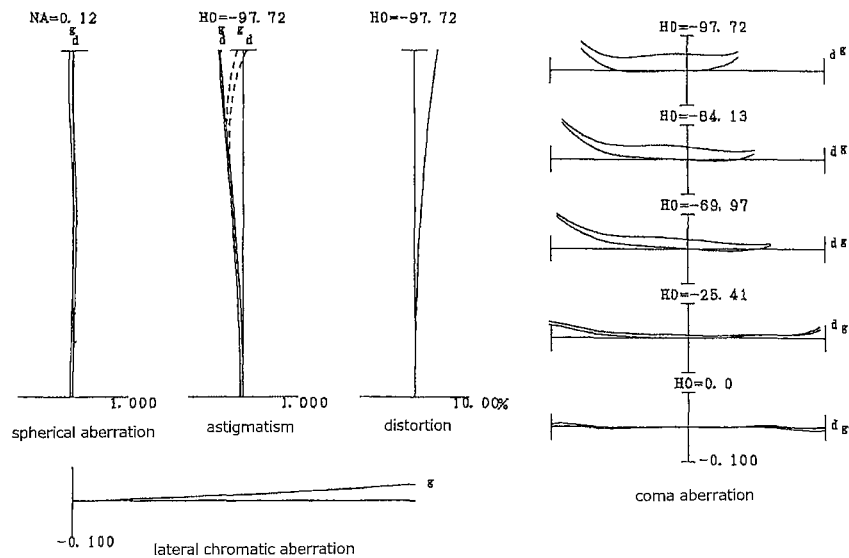
Figure 15C:
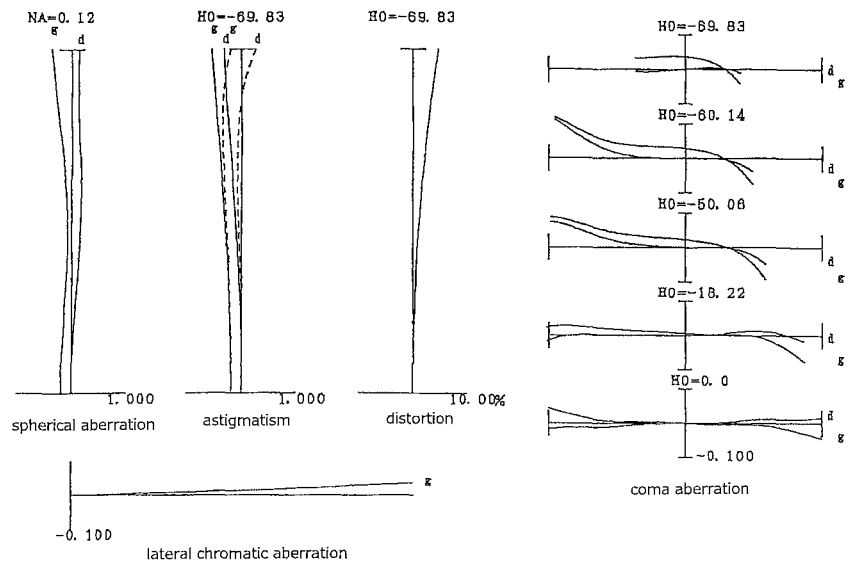

FIG. 15A, FIG. 15B and FIG. 15C are graphs showing various aberrations upon focusing on a close distance object, respectively, in the wide angle end state, in the intermediate focal length state and in the telephoto end state, of the variable magnification optical system according to the Fifth Example.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

Sixth Example

Figure 16A:
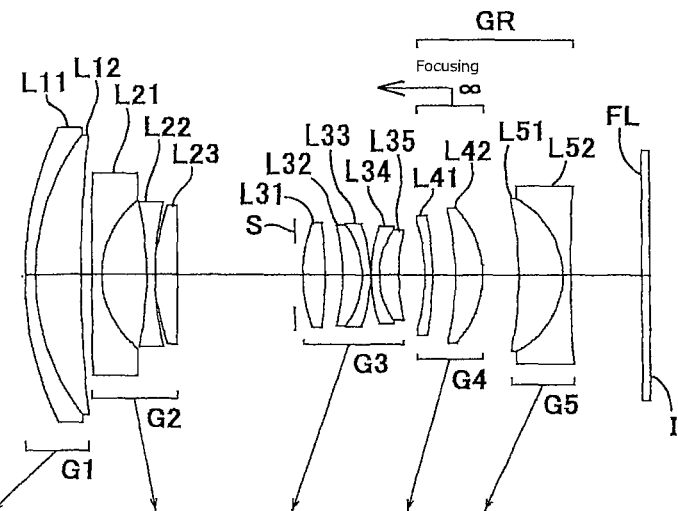
FIG. 16A, FIG. 16B and FIG. 16C are cross sectional views in the wide angle end state, in the intermediate focal length state and in the telephoto end state, respectively, of a variable magnification optical system according to a Sixth Example.
Figure 16B:
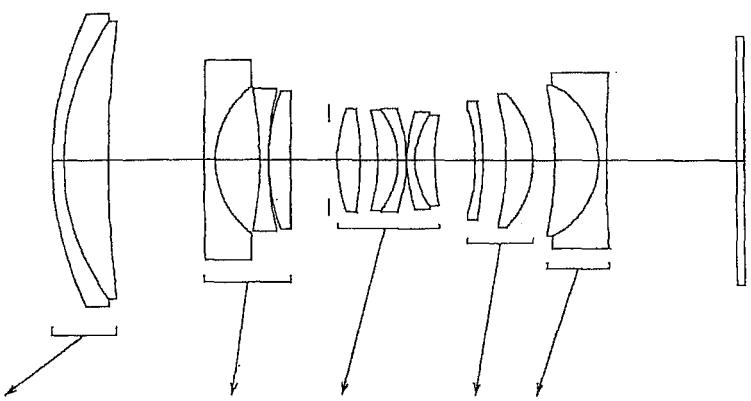
Figure 16C:
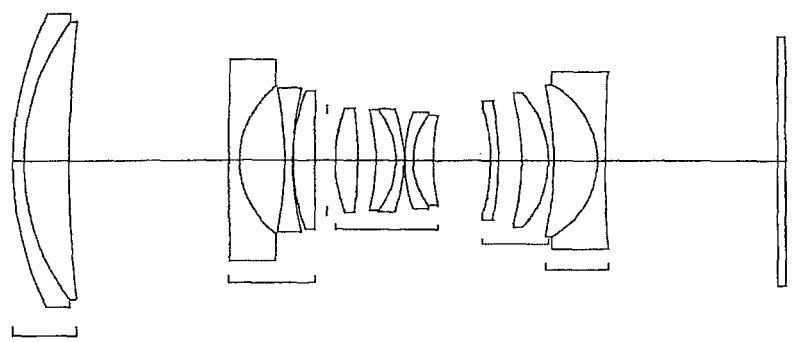

FIG. 16A, FIG. 16B and FIG. 16C are, respectively, cross sectional views in a wide angle end state, in an intermediate focal length end state and in a telephoto end state, of a variable magnification optical system according to a Sixth Example of the variable magnification optical system of the present embodiment. Arrows below each lens group in FIG. 16A show directions of movements of respective lens groups upon varying magnification from a wide angle end state to an intermediate focal length state. Arrows below each lens group in FIG. 16B show movement trajectories of respective lens groups upon varying magnification from the intermediate focal length state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a positive meniscus lens L12 having a convex surface facing the object side.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose image plane I side lens surface is aspherical.

The third lens group G3 consists of, in order from the object side along the optical axis, a double convex positive lens L31, a cemented lens constructed by a positive meniscus lens L32 having a concave surface facing the object side cemented with a negative meniscus lens L33 having a concave surface facing the object side, and a cemented lens constructed by a negative meniscus lens L34 having a convex surface facing the object side cemented with a positive meniscus lens L35 having a convex surface facing the object side. The double convex positive lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a negative meniscus lens L41 having a concave surface facing the object side, and a positive meniscus lens L42 having a concave surface facing the object side. The negative meniscus lens L41 is a glass mold type aspherical lens whose object side lens surface is aspherical. The positive meniscus lens L42 is a glass mold type aspherical lens whose image plane I side lens surface is aspherical.

The fifth lens group G5 consists of, in order from the object side along the optical axis, a positive meniscus lens L51 having concave surface facing the object side and a double concave negative lens L52.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 6 below shows various values of the variable magnification optical system relating to the present Example.

TABLE 6

Sixth Example

[Surface Data]

| m | r | d | nd | vd |
|---|---|---|---|---|
| OP | ∞ | | | |
| 1 | 60.32635 | 2.039 | 1.80809 | 22.7 |
| 2 | 41.97920 | 8.268 | 1.75500 | 52.3 |
| 3 | 207.34902 | D3 | | |
| 4 | 1000.00000 | 2.000 | 1.82886 | 42.3 |
| *5 | 15.73567 | 8.461 | | |
| 6 | −59.96573 | 1.500 | 1.49782 | 82.6 |
| 7 | 49.78382 | 0.150 | | |
| 8 | 35.18437 | 4.075 | 1.98917 | 26.2 |
| 9 | 1619.58040 | D9 | | |
| 10 (S) | ∞ | 1.500 | | |

TABLE 6-continued

Sixth Example

| | | | | |
|---|---|---|---|---|
| *11 | 25.50000 | 4.170 | 1.55332 | 71.7 |
| 12 | −65.45591 | 3.367 | | |
| 13 | −32.91804 | 3.671 | 1.83645 | 42.6 |
| 14 | −14.77178 | 1.500 | 1.94754 | 27.1 |
| 15 | −26.35178 | 0.150 | | |
| 16 | 26.26299 | 1.500 | 1.99662 | 26.6 |
| 17 | 13.56251 | 3.695 | 1.64836 | 33.2 |
| 18 | 37.92217 | D18 | | |
| *19 | −45.13942 | 1.500 | 1.58313 | 59.4 |
| 20 | −55.10622 | 4.314 | | |
| 21 | −45.22291 | 5.000 | 1.55332 | 71.7 |
| *22 | −17.65257 | D22 | | |
| 23 | −60.30075 | 8.069 | 1.65648 | 32.5 |
| 24 | −15.50000 | 1.500 | 1.75698 | 36.7 |
| 25 | 290.03399 | D25 | | |
| 26 | ∞ | 1.500 | 1.51680 | 64.1 |
| 27 | ∞ | D27 | | |
| I | ∞ | | | |

[Various Data]
Variable magnification ratio 2.75

| | W | M | T |
|---|---|---|---|
| f | 24.72 | 46.31 | 67.90 |
| FNo | 4.00 | 4.09 | 4.00 |
| ω | 44.7 | 24.0 | 16.7 |
| Y | 21.70 | 21.70 | 21.70 |
| TL | 116.526 | 128.486 | 142.973 |
| BF | 14.627 | 25.478 | 33.218 |
| BF (air converted length) | 14.116 | 24.967 | 32.707 |

[Lens Group Data]

| Lens Group | ST | f |
|---|---|---|
| 1$^{st}$ Lens Group | 1 | 114.00 |
| 2$^{nd}$ Lens Group | 4 | −26.90 |
| 3$^{rd}$ Lens Group | 10 | 31.86 |
| 4$^{th}$ Lens Group | 19 | 53.18 |
| 5$^{th}$ Lens Group | 23 | −48.77 |

[Aspherical Surface Data]

Surface Number: 5 K = 0.00000e+00 A4 = 2.28397e−05 A6 = 5.52091e−08
A8 = −3.85159e−11 A10 = 3.96575e−13
Surface Number: 11 K = 1.00000e+00 A4 = −1.02420e−05 A6 = −5.12185e−09
A8 = 2.80701e−11 A10 = −2.18997e−13
Surface Number: 19 K = 1.00000e+00 A4 = −3.49441e−05 A6 = −2.07361e−07
A8 = 1.87328e−09 A10 = −1.70790e−11
Surface Number: 22 K = 1.00000e+00 A4 = 7.10600e−06 A6 = −6.76172e−08
A8 = 4.93526e−10 A10 = −2.53168e−12

[Variable Distance Data]

| | W Infinite | M Infinite | T Infinite | W Close | M Close | T Close |
|---|---|---|---|---|---|---|
| D3 | 2.000 | 17.776 | 29.427 | 2.000 | 17.776 | 29.427 |
| D9 | 21.834 | 7.167 | 2.262 | 21.834 | 7.167 | 2.262 |
| D18 | 4.820 | 7.522 | 10.636 | 2.245 | 2.026 | 1.830 |
| D22 | 6.816 | 4.114 | 1.000 | 9.392 | 9.610 | 9.806 |
| D26 | 13.027 | 23.878 | 31.619 | 13.027 | 23.878 | 31.619 |
| D28 | 0.100 | 0.100 | 0.100 | 0.100 | 0.099 | 0.100 |

[Values for Conditional Expressions]

(1) f3f/f3r = −0.0982
(2) BFw/fw = 0.6524
(3) f1/fw = 4.6115
(4) βFw = 0.6567
(5) f5/f3 = −1.5310
(6) f1/f1Rw = 5.3365
(7) nd3fp = 1.5533
(8) νd3p = 71.6835
(9) 1/βRw = 0.7366
(10) f2fn/f2 = 0.7177

TABLE 6-continued

Sixth Example

(11) fF/ft = 0.7832
(12) ωw = 44.7194°

Figure 17A:
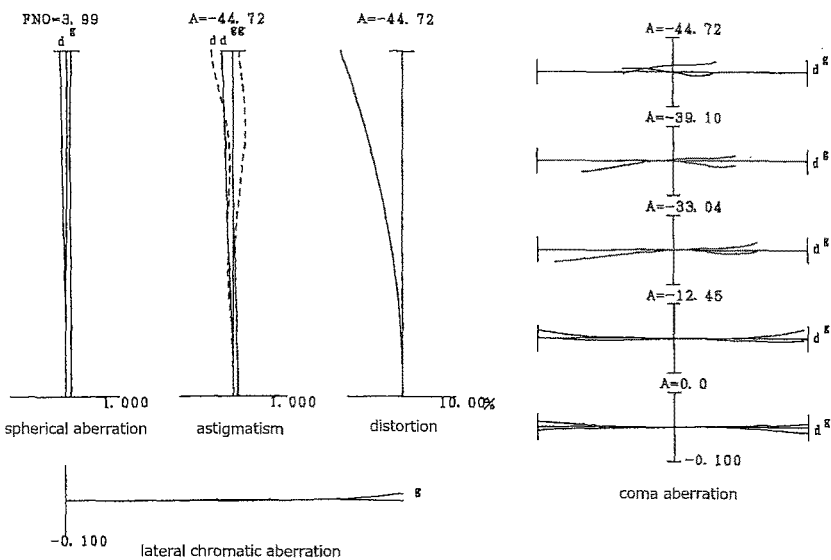
FIG. 17A, FIG. 17B and FIG. 17C are graphs showing various aberrations, upon focusing on an infinite distance object, in the wide angle end state, in the intermediate focal length state and in the telephoto end state, respectively, of the variable magnification optical system according to the Sixth Example.
Figure 17B:
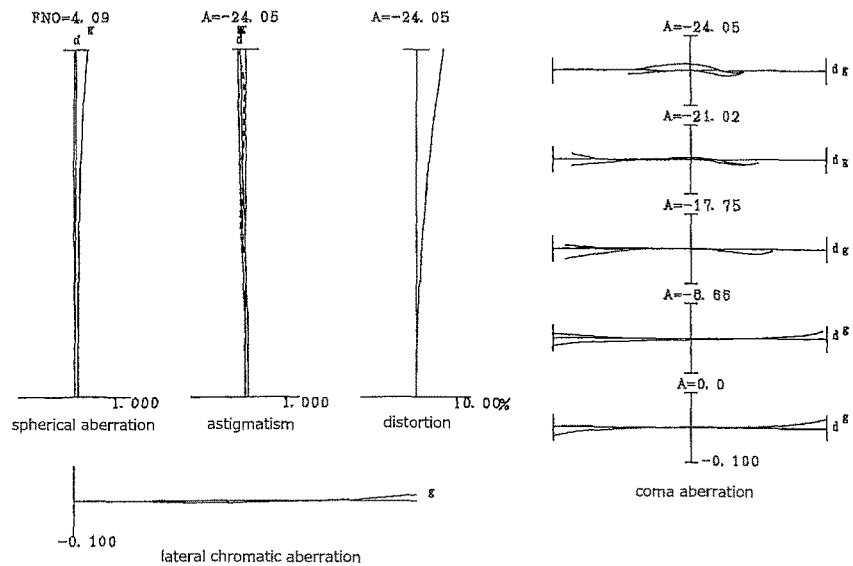
Figure 17C:
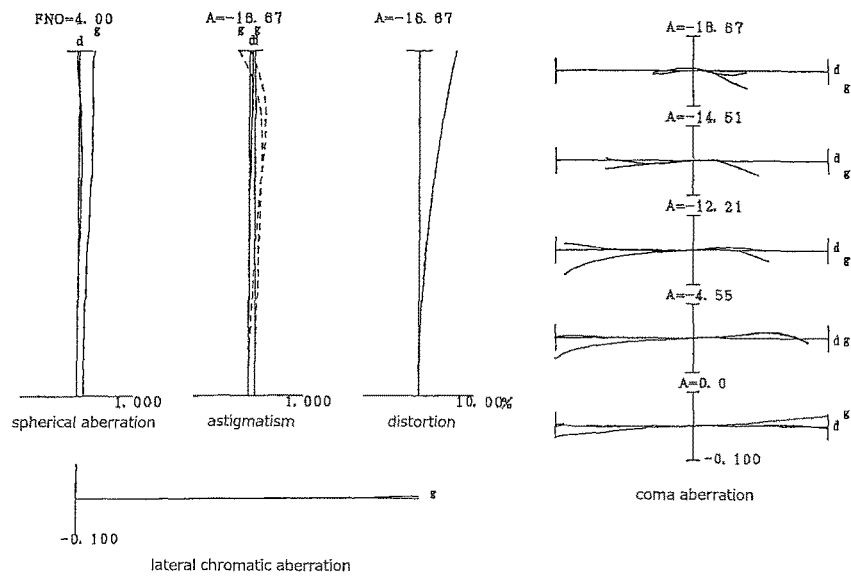

FIG. 17A, FIG. 17B and FIG. 17C are graphs showing various aberrations upon focusing on an infinite distance object, respectively, in the wide angle end state, in the intermediate focal length state and in the telephoto end state, of the variable magnification optical system according to the Sixth Example.

Figure 18A:
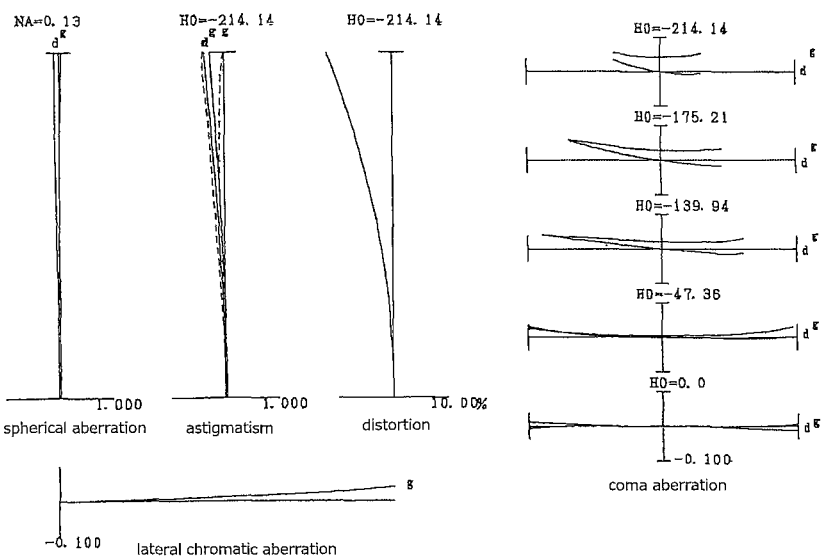
FIG. 18A, FIG. 18B and FIG. 18C are graphs showing various aberrations, upon focusing on a close distance object, in the wide angle end state, in the intermediate focal length state and in the telephoto end state, respectively, of the variable magnification optical system according to the Sixth Example.
Figure 18B:
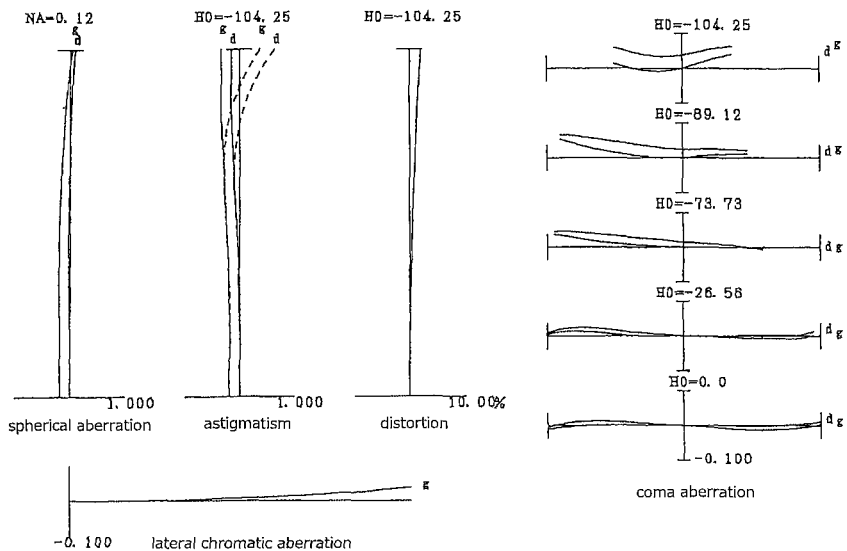
Figure 18C:
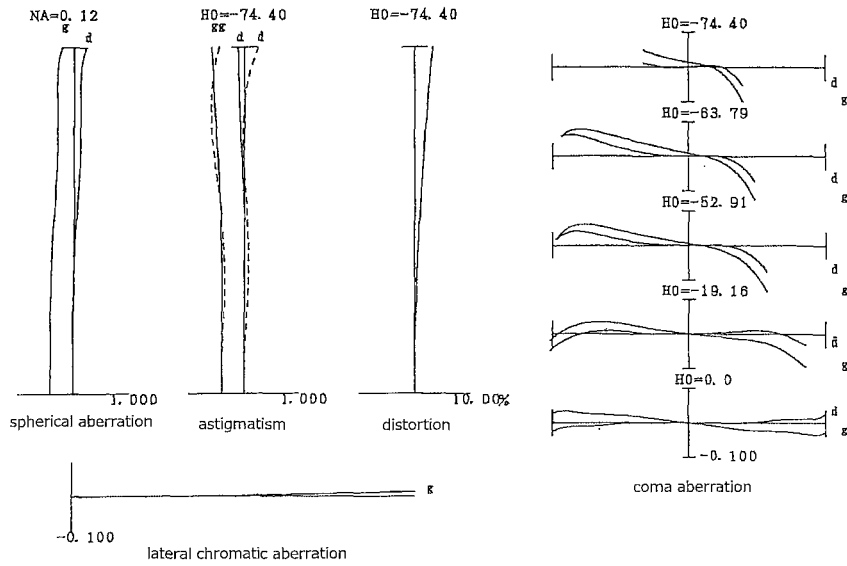

FIG. 18A, FIG. 18B and FIG. 18C are graphs showing various aberrations upon focusing on a close distance object, respectively, in the wide angle end state, in the intermediate focal length state and in the telephoto end state, of the variable magnification optical system according to the Sixth Example.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

Seventh Example

Figure 19A:
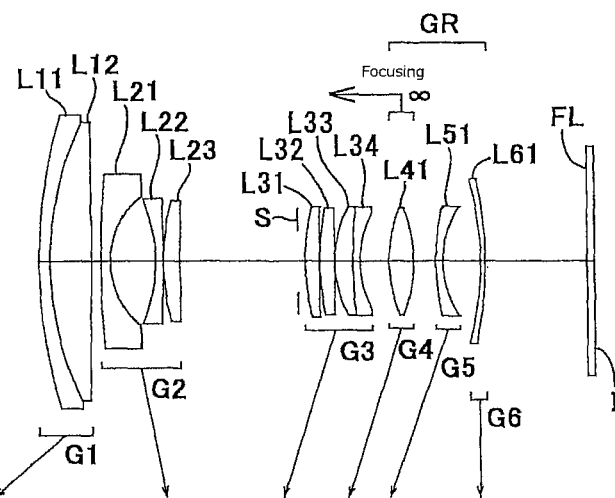
FIG. 19A, FIG. 19B and FIG. 19C are cross sectional views in the wide angle end state, in the intermediate focal length state and in the telephoto end state, respectively, of a variable magnification optical system according to a Seventh Example.
Figure 19B:
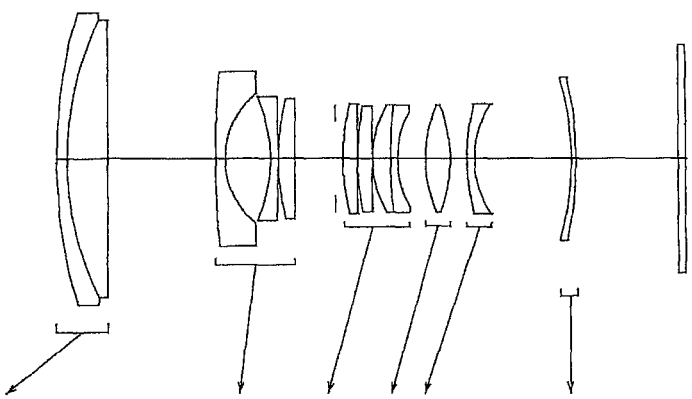
Figure 19C:
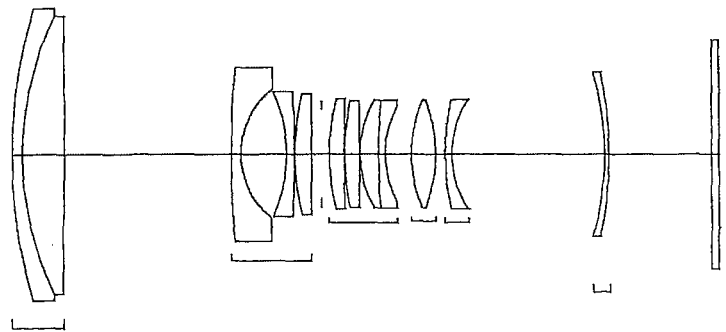

FIG. 19A, FIG. 19B and FIG. 19C are, respectively, cross sectional views in a wide angle end state, in an intermediate focal length state and in a telephoto end state, of a variable magnification optical system according to a Seventh Example of the variable magnification optical system of the present embodiment. Arrows below each lens group in FIG. 19A show directions of movements of respective lens groups upon varying magnification from a wide angle end state to an intermediate focal length state. Arrows below each lens group in FIG. 19B show movement trajectories of respective lens groups upon varying magnification from the intermediate focal length state to the telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a double convex positive lens L12.

The second lens group G2 consists of, in order from the object side along the optical axis, a negative meniscus lens L21 having a convex surface facing the object side, a negative meniscus lens L22 having a concave surface facing the object side, and a positive meniscus lens L23 having a convex surface facing the object side. The negative meniscus lens L21 is a glass mold type aspherical lens whose object side lens surface and image plane I side lens surface are aspherical.

The third lens group G3 consists of, in order from the object side along the optical axis, a positive meniscus lens L31 having a convex surface facing the object side, a positive meniscus lens L32 having a convex surface facing the object side, and a cemented lens constructed by a positive meniscus lens L33 having a convex surface facing the object side cemented with a negative meniscus lens L34 having a convex surface facing the object side. The positive meniscus lens L31 is a glass mold type aspherical lens whose object side lens surface is aspherical.

The rear lens group GR is composed of, in order from the object side along the optical axis, a fourth lens group G4 having positive refractive power, a fifth lens group G5 having negative refractive power and a sixth lens group G6 having negative refractive power.

The fourth lens group G4 consists of a double convex positive lens L41. The double convex positive lens L41 is a glass mold type aspherical lens whose object side lens surface and image plane I side lens surface are aspherical.

The fifth lens group G5 consists of a negative meniscus lens L51 having a convex surface facing the object side. The negative meniscus lens group L51 is a glass mold type aspherical lens whose object side lens surface is aspherical.

The sixth lens group G6 consists of a negative meniscus lens L61 having a concave surface facing the object side.

A filter FL such as a low pass filter is disposed between the sixth lens group G6 and the image plane I.

On the image plane I, an imaging device (not shown) composed of CCD, CMOS or the like is disposed.

In the variable magnification optical system according to the present Example, upon varying magnification from the wide angle end state to the telephoto end state, the first lens group G1, the second lens group G2, the third lens group G3, the fourth lens group G4 and the fifth lens group G5, are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5 and a distance between the fifth lens group G5 and the sixth lens group G6 are varied. At this time, the sixth lens group G6 is fixed in its position with respect to the image plane I. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the fourth lens group G4 toward the object along the optical axis as a focusing lens group.

Table 7 below shows various values of the variable magnification optical system relating to the present Example.

TABLE 7

Seventh Example

[Surface Data]

| m | r | d | nd | νd |
|---|---|---|---|---|
| OP | ∞ | | | |
| 1 | 101.78373 | 2.263 | 1.84666 | 23.8 |
| 2 | 64.09488 | 8.457 | 1.75500 | 52.3 |
| 3 | −4649.78570 | D3 | | |
| *4 | 338.09183 | 2.000 | 1.85135 | 40.1 |
| *5 | 17.62582 | 9.239 | | |
| 6 | −31.88780 | 1.500 | 1.49782 | 82.6 |
| 7 | −480.92591 | 0.150 | | |
| 8 | 48.76651 | 3.362 | 2.00069 | 25.5 |
| 9 | 1462.00720 | D9 | | |
| 10 (S) | ∞ | 1.500 | | |
| *11 | 40.00000 | 3.061 | 1.49710 | 81.5 |
| 12 | 746.47149 | 0.150 | | |
| 13 | 56.62003 | 3.000 | 1.85896 | 22.7 |
| 14 | 1991.68980 | 0.150 | | |
| 15 | 22.31377 | 3.732 | 1.49782 | 82.6 |
| 16 | 102.88645 | 1.500 | 1.85896 | 22.7 |
| 17 | 20.13958 | D17 | | |
| *18 | 25.58334 | 5.130 | 1.49710 | 81.5 |
| *19 | −26.20789 | D19 | | |
| *20 | 44.84857 | 1.500 | 1.74330 | 49.3 |
| 21 | 19.56479 | D21 | | |
| *22 | −58.99276 | 0.839 | 1.61800 | 63.3 |
| 23 | −84.99207 | 21.000 | | |
| 24 | ∞ | 1.500 | 1.51680 | 64.1 |
| 25 | ∞ | D25 | | |
| I | ∞ | | | |

[Various Data]
Variable magnification ratio 2.75

| | W | M | T |
|---|---|---|---|
| f | 24.72 | 46.32 | 67.90 |
| FNo | 4.02 | 4.01 | 4.02 |
| ω | 43.5 | 23.3 | 16.4 |
| Y | 21.70 | 21.70 | 21.70 |
| TL | 115.000 | 129.999 | 145.678 |
| BF | 22.601 | 22.601 | 22.602 |
| BF (air converted length) | 22.090 | 22.090 | 22.091 |

[Lens Group Data]

| Lens Group | ST | f |
|---|---|---|
| $1^{st}$ Lens Group | 1 | 141.68 |
| $2^{nd}$ Lens Group | 4 | −27.31 |
| $3^{rd}$ Lens Group | 10 | 59.45 |
| $4^{th}$ Lens Group | 18 | 26.93 |
| $5^{th}$ Lens Group | 20 | −47.90 |
| $6^{th}$ Lens Group | 22 | −315.95 |

[Aspherical Surface Data]

Surface Number: 5 K = 0.00000e+00 A4 = 2.28397e−05 A6 = 5.52091e−08
A8 = −3.85159e−11 A10 = 3.96575e−13
Surface Number: 4 K = 1.00000e+00 A4 = 1.12967e−05 A6 = −4.46018e−08
A8 = 1.00140e−10 A10 = −1.05741e−13
Surface Number: 5 K = 0.00000e+00 A4 = 3.44021e−05 A6 = 7.39481e−08
A8 = −2.03619e−10 A10 = 1.51680e−12
Surface Number: 11 K = 1.00000e+00 A4 = −6.99848e−06 A6 = −1.23976e−08
A8 = 1.83746e−10 A10 = −4.96062e−13
Surface Number: 18 K = 1.00000e+00 A4 = −1.46574e−05 A6 = 2.12049e−07
A8 = −8.82713e−10 A10 = −5.22530e−12
Surface Number: 19 K = 1.00000e+00 A4 = 2.32857e−05 A6 = 1.32158e−07
A8 = −5.88648e−10 A10 = −6.83977e−12
Surface Number: 20 K = 1.00000e+00 A4 = 4.54779e−06 A6 = −1.12679e−08
A8 = −3.81570e−10 A10 = 0.00000e+00

TABLE 7-continued

Seventh Example

[Variable Distance Data]

|  | W<br>Infinite | M<br>Infinite | T<br>Infinite | W<br>Close | M<br>Close | T<br>Close |
|---|---|---|---|---|---|---|
| D3 | 2.000 | 22.166 | 34.570 | 2.000 | 22.166 | 34.570 |
| D9 | 24.510 | 8.331 | 2.222 | 24.510 | 8.331 | 2.222 |
| D17 | 5.931 | 5.867 | 5.409 | 4.929 | 3.275 | 0.788 |
| D19 | 4.569 | 3.472 | 1.944 | 5.571 | 6.063 | 6.565 |
| D21 | 7.856 | 20.029 | 31.398 | 7.856 | 20.029 | 31.398 |
| D25 | 0.101 | 0.101 | 0.102 | 0.101 | 0.101 | 0.103 |

[Values for Conditional Expressions]

| (1) | $f3f/f3r = -0.5270$ |
| (2) | $BFw/fw = 0.9668$ |
| (3) | $f1/fw = 5.7316$ |
| (4) | $\beta Fw = 0.0452$ |
| (5) | $f5/f3 = -0.8058$ |
| (6) | $f1/f1Rw = 6.3640$ |
| (7) | $nd3fp = 1.4971$ |
| (8) | $\nu d3p = 81.5584$ |
| (9) | $1/\beta Rw = 0.9286$ |
| (10) | $f2fn/f2 = 0.8021$ |
| (11) | $fF/ft = 0.3965$ |
| (12) | $\omega w = 43.4833°$ |

Figure 20A:
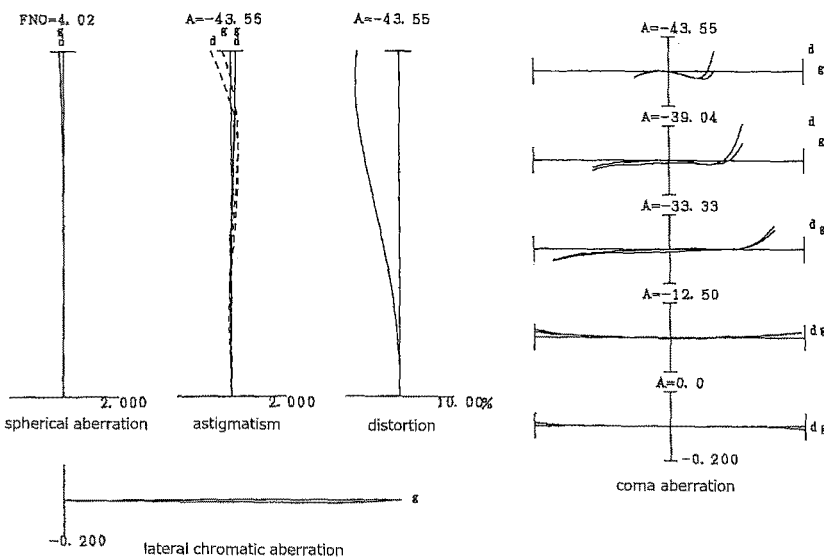
FIG. 20A, FIG. 20B and FIG. 20C are graphs showing various aberrations, upon focusing on an infinite distance object, in the wide angle end state, in the intermediate focal length state and in the telephoto end state, respectively, of the variable magnification optical system according to the Seventh Example.
Figure 20B:
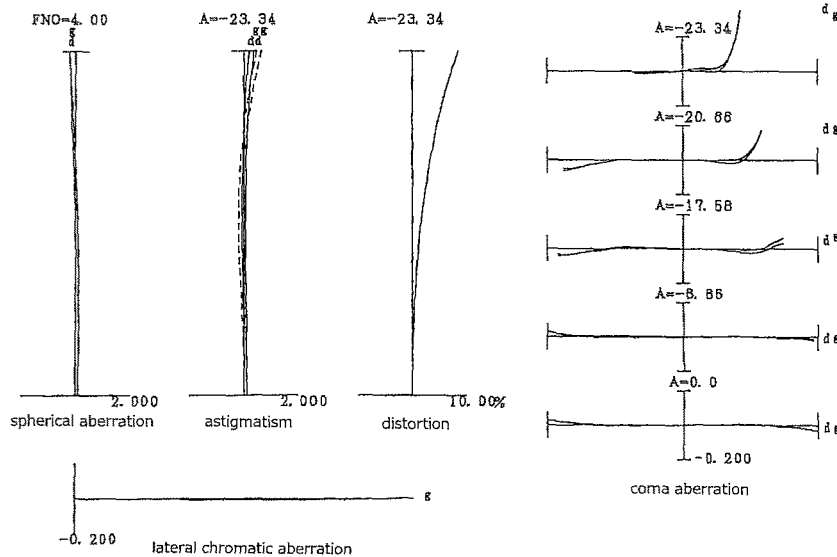
Figure 20C:
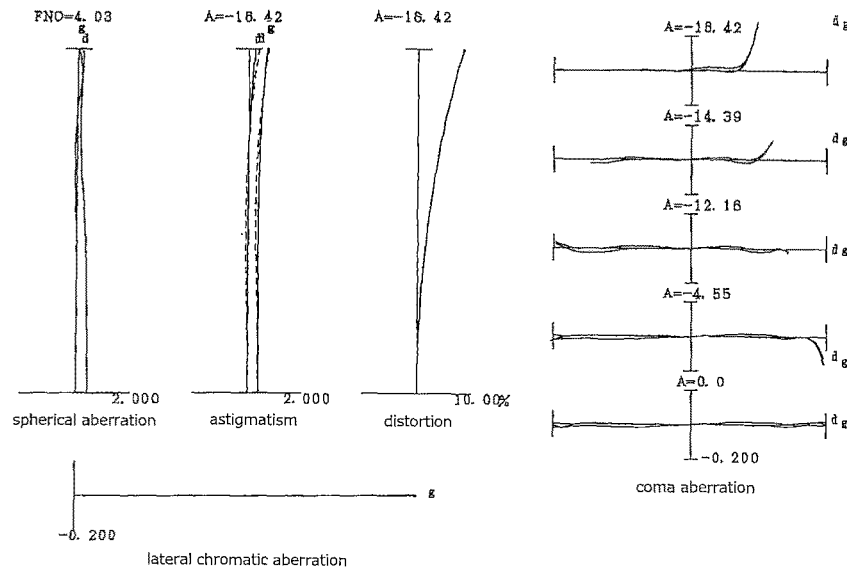

FIG. 20A, FIG. 20B and FIG. 20C are graphs showing various aberrations upon focusing on an infinite distance object, respectively, in the wide angle end state, in the intermediate focal length state and in the telephoto end state, of the variable magnification optical system according to the Seventh Example.

Figure 21A:
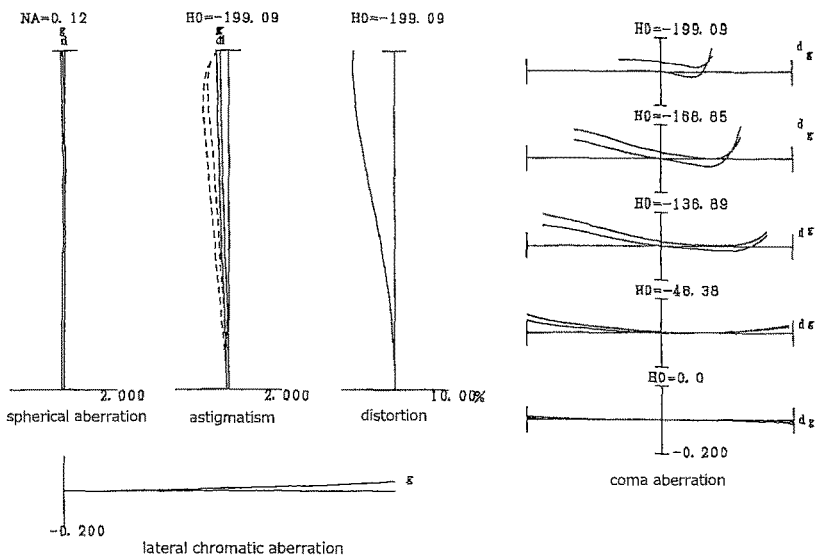
FIG. 21A, FIG. 21B and FIG. 21C are graphs showing various aberrations, upon focusing on a close distance object, in the wide angle end state, in the intermediate focal length state, and in the telephoto end state, respectively, of the variable magnification optical system according to the Seventh Example.
Figure 21B:
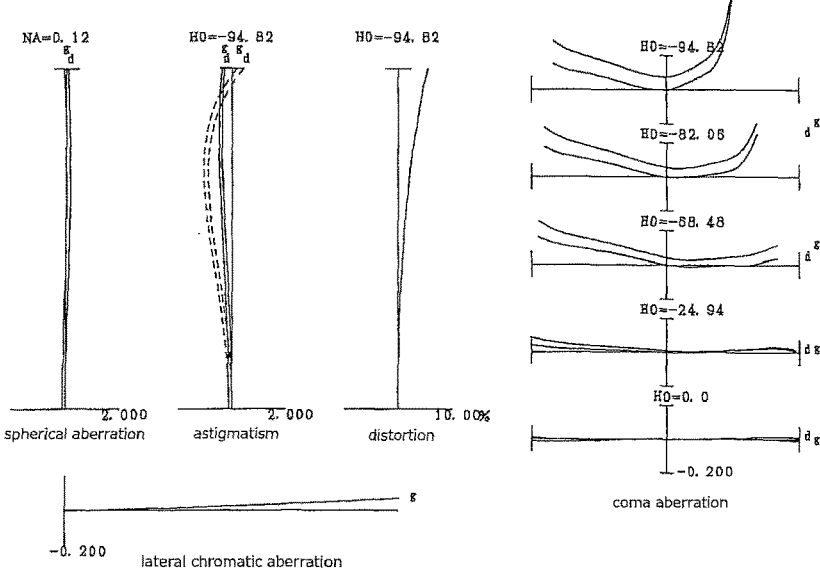
Figure 21C:
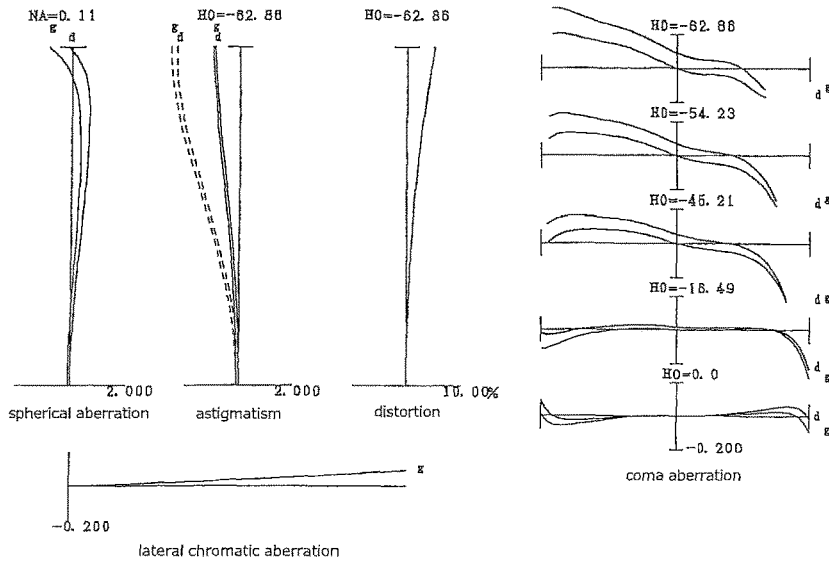

FIG. 21A, FIG. 21B and FIG. 21C are graphs showing various aberrations upon focusing on a close distance object, respectively, in the wide angle end state, in the intermediate focal length state and in the telephoto end state, of the variable magnification optical system according to the Seventh Example.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

Eighth Example

Figure 22A:
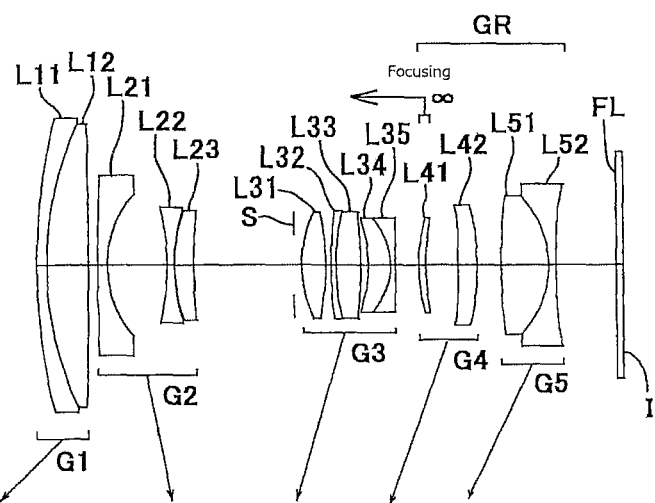
FIG. 22A, FIG. 22B and FIG. 22C are cross sectional views in the wide angle end state, in the intermediate focal length state and in the telephoto end state, respectively, of a variable magnification optical system according to an Eighth Example.
Figure 22B:
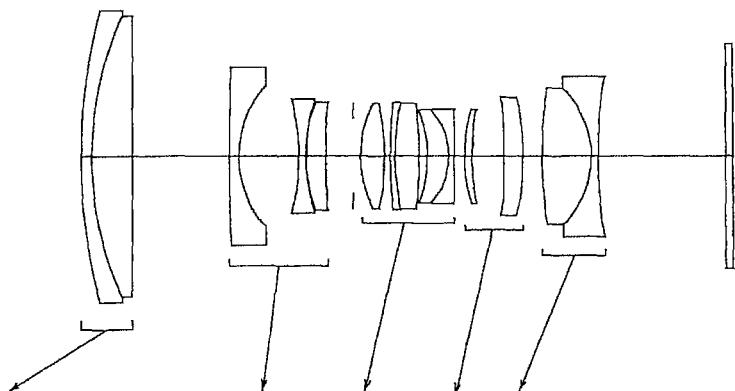
Figure 22C:
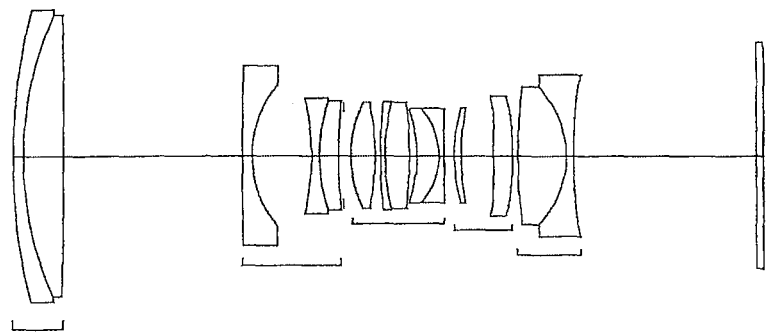

FIG. 22A, FIG. 22B and FIG. 22C are, respectively, cross sectional views in a wide angle end state, in an intermediate focal length state and in a telephoto end state, of a variable magnification optical system according to an Eighth Example of the variable magnification optical system of the present embodiment. Arrows below each lens group in FIG. 22A show directions of movements of respective lens groups upon varying magnification from a wide angle end state to an intermediate focal length state. Arrows below each lens group in FIG. 22B show movement trajectories of respective lens groups upon varying magnification from the intermediate focal length state to a telephoto end state.

The variable magnification optical system according to the present Example is composed of, in order from an object side along the optical axis, a first lens group G1 having positive refractive power, a second lens group G2 having negative refractive power, an aperture stop S, a third lens group G3 having positive refractive power, and a rear lens group GR having positive refractive power.

The first lens group G1 consists of a cemented lens constructed by, in order from the object side along the optical axis, a negative meniscus lens L11 having a convex surface facing the object side cemented with a double convex positive lens L12.

The second lens group G2 consists of, in order from the object side along the optical axis, a negative meniscus lens L21 having a convex surface facing the object side, a double concave negative lens L22, and a positive meniscus lens L23 having a convex surface facing the object side. The negative meniscus lens L21 is a glass mold type aspherical lens whose image plane I side lens surface is aspherical.

The third lens group G3 consists of, in order from the object side along the optical axis, a double convex positive lens L31, a cemented lens constructed by a negative meniscus lens L32 having a convex surface facing the object side cemented with a double convex positive lens L33, and a cemented lens constructed by a positive meniscus lens L34 having a concave surface facing the object side cemented with a double concave negative lens L35. The double convex positive lens L31 is a glass mold type aspherical lens whose object side lens surface is aspherical.

The rear lens group GR is composed of, in order from the object side along the optical axis, a fourth lens group G4 having positive refractive power and a fifth lens group G5 having negative refractive power.

The fourth lens group G4 consists of, in order from the object side along the optical axis, a positive meniscus lens L41 having a convex surface facing the object side, and a double convex positive lens L42. The double convex positive lens L42 is a glass mold type aspherical lens whose object side lens surface and image plane I side lens surface are aspherical.

The fifth lens group G5 consists of a cemented lens constructed by, in order from the object side along the optical axis, a double convex positive lens L51 and a double concave negative lens L52. The double concave negative lens L52 is a glass mold type aspherical lens whose object side lens surface is aspherical.

A filter FL such as a low pass filter is disposed between the fifth lens group G5 and the image plane I.

On the image plane I, an imaging device (not shown) composed of CCD, CMOS or the like is disposed.

In the variable magnification optical system according to the present Example, upon varying magnification from the wide angle end state to the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied. The aperture stop S is moved in a body with the third lens group G3 upon varying magnification from the wide angle end state to the telephoto end state.

In the variable magnification optical system according to the present Example, focusing from an infinite distance object to a close distance object is carried out by moving the positive meniscus lens L41 of the fourth lens group G4 toward the object along the optical axis as a focusing lens group.

Table 8 below shows various values of the variable magnification optical system relating to the present Example.

TABLE 8

Eighth Example

[Surface Data]

| m | r | d | nd | νd |
|---|---|---|----|----|
| OP | ∞ | | | |
| 1 | 116.51174 | 2.150 | 1.84666 | 23.8 |
| 2 | 68.14169 | 8.500 | 1.75500 | 52.3 |
| 3 | −1607.21650 | D3 | | |
| *4 | 643.64333 | 2.000 | 1.85135 | 40.1 |
| *5 | 22.47852 | 12.291 | | |
| 6 | −49.00635 | 1.500 | 1.49782 | 82.6 |
| 7 | 35.41428 | 0.100 | | |
| 8 | 32.93414 | 4.000 | 2.00069 | 25.5 |
| 9 | 134.12564 | D9 | | |
| 10 (S) | ∞ | 1.500 | | |
| *11 | 23.68026 | 5.000 | 1.55332 | 71.7 |
| 12 | −51.23473 | 1.136 | | |
| 13 | 87.42815 | 1.000 | 1.97484 | 25.9 |
| 14 | 48.00600 | 5.000 | 1.61800 | 63.3 |
| 15 | −93.41134 | 1.653 | | |
| 16 | −27.67767 | 4.500 | 1.61800 | 63.3 |
| 17 | −14.25207 | 1.000 | 1.63137 | 35.1 |
| 18 | 3549.62960 | D18 | | |
| 19 | 34.01132 | 1.500 | 1.83858 | 33.3 |
| 20 | 52.01107 | 6.500 | | |
| *21 | 505.55440 | 4.000 | 1.59201 | 67.0 |
| *22 | −61.72425 | D22 | | |
| 23 | 106.95458 | 10.000 | 1.51680 | 64.1 |
| 24 | −20.00000 | 1.500 | 1.74330 | 49.3 |
| *25 | 144.50680 | D25 | | |
| 26 | ∞ | 1.500 | 1.51680 | 64.1 |
| 27 | ∞ | D27 | 1.00000 | |
| I | ∞ | | | |

[Various Data]
Variable magnification ratio 2.75

| | W | M | T |
|---|---|---|---|
| f | 24.72 | 46.31 | 67.89 |
| FNo | 4.00 | 4.00 | 4.00 |
| ω | 44.9 | 23.8 | 16.5 |
| Y | 21.70 | 21.70 | 21.70 |
| TL | 121.839 | 134.775 | 154.929 |
| BF | 14.062 | 27.994 | 39.252 |
| BF (air converted length) | 13.551 | 27.483 | 38.741 |

[Lens Group Data]

| Lens Group | ST | f |
|---|---|---|
| 1$^{st}$ Lens Group | 1 | 156.61 |
| 2$^{nd}$ Lens Group | 4 | −26.22 |
| 3$^{rd}$ Lens Group | 10 | 38.65 |
| 4$^{th}$ Lens Group | 19 | 53.93 |
| 5$^{th}$ Lens Group | 23 | −89.77 |

TABLE 8-continued

Eighth Example

[Aspherical Surface Data]

Surface Number: 5   K = 0.00000e+00   A4 = 2.28397e−05   A6 = 5.52091e−08
                     A8 = −3.85159e−11   A10 = 3.96575e−13
Surface Number: 5   K = 0.00000e+00   A4 = 1.29856e−05   A6 = 3.72807e−08
                     A8 = −9.91643e−11   A10 = 5.62653e−13
Surface Number: 11  K = 1.00000e+00   A4 = −6.13337e−06   A6 = 1.52342e−08
                     A8 = −1.33494e−10   A10 = 5.07280e−13
Surface Number: 21  K = 1.00000e+00   A4 = −1.56957e−05   A6 = −4.44053e−08
                     A8 = −8.01823e−10   A10 = −6.52474e−14
Surface Number: 22  K = 1.00000e+00   A4 = 6.23173e−06   A6 = −4.75716e−08
                     A8 = −5.19265e−10   A10 = −1.02402e−13
Surface Number: 25  K = 1.00000e+00   A4 = 1.25490e−06   A6 = 3.00760e−08
                     A8 = −1.22687e−10   A10 = 3.40306e−13

[Variable Distance Data]

|     | W Infinite | M Infinite | T Infinite | W Close | M Close | T Close |
|-----|-----------|-----------|-----------|---------|---------|---------|
| D3  | 2.000     | 19.945    | 36.744    | 2.000   | 19.945  | 36.744  |
| D9  | 20.989    | 5.771     | 1.000     | 20.989  | 5.771   | 1.000   |
| D17 | 4.914     | 2.181     | 2.103     | 4.914   | 2.181   | 2.103   |
| D19 | 5.044     | 4.055     | 1.000     | 6.288   | 6.671   | 5.279   |
| D21 | 12.462    | 26.394    | 37.651    | 12.462  | 26.394  | 37.651  |
| D25 | 0.100     | 0.100     | 0.101     | 0.100   | 0.100   | 0.101   |

[Values for Conditional Expressions]

(1)  f3f/f3r = −0.5628
(2)  BFw/fw = 0.6275
(3)  f1/fw = 6.3354
(4)  βFw = 0.7271
(5)  f5/f3 = −2.3229
(6)  f1/f1Rw = 8.1273
(7)  nd3fp = 1.5533
(8)  υd3p = 71.6835
(9)  1/βRw = 0.8894
(10) f2fn/f2 = 1.0450
(11) fF/ft = 1.3722
(12) ωw = 45.6019°

Figure 23A:
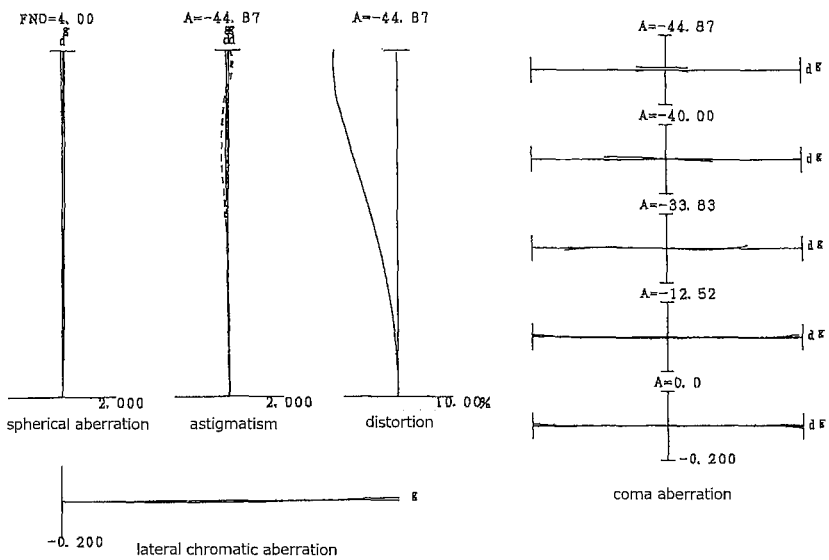
FIG. 23A, FIG. 23B and FIG. 23C are graphs showing various aberrations, upon focusing on an infinite distance object, in the wide angle end state, in the intermediate focal length state and in the telephoto end state, respectively, of the variable magnification optical system according to the Eighth Example.
Figure 23B:
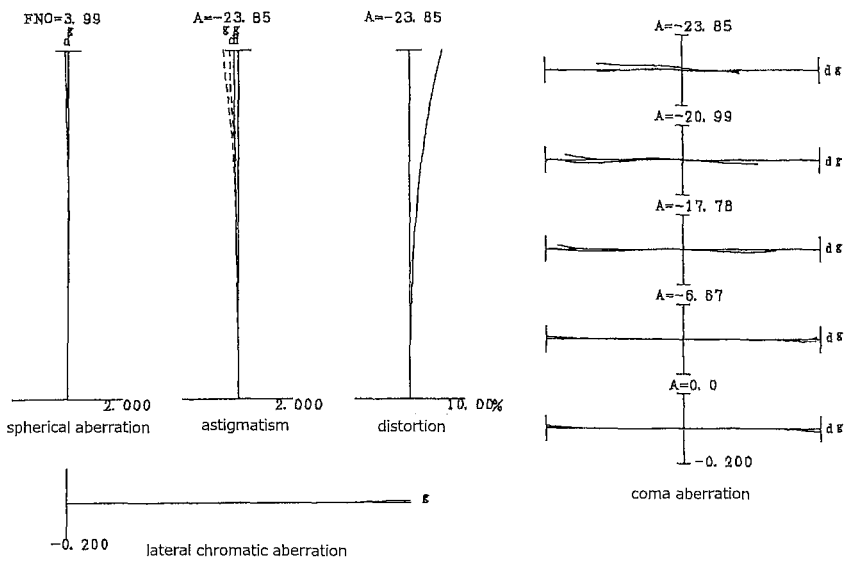
Figure 23C:
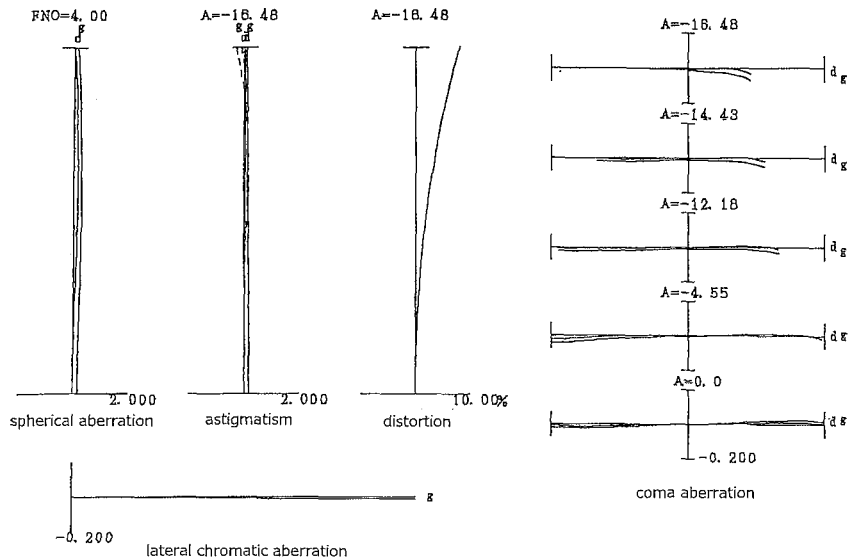

FIG. 23A, FIG. 23B and FIG. 23C are graphs showing various aberrations upon focusing on an infinite distance object, respectively, in the wide angle end state, in the intermediate focal length state and in the telephoto end state, of the variable magnification optical system according to the Eighth Example.

Figure 24A:
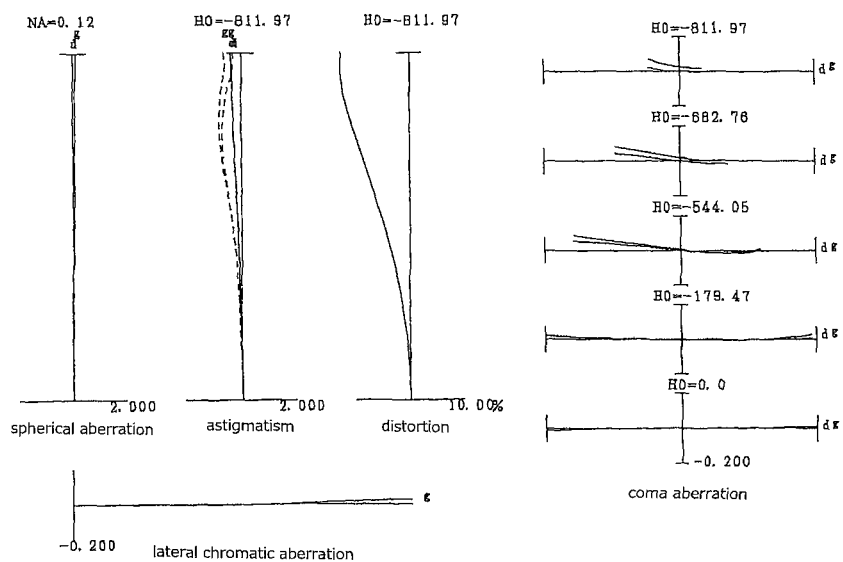
FIG. 24A, FIG. 24B and FIG. 24C are graphs showing various aberrations, upon focusing on a close distance object, in the wide angle end state, in the intermediate focal length state, and in the telephoto end state, respectively, of the variable magnification optical system according to the Eighth Example.
Figure 24B:
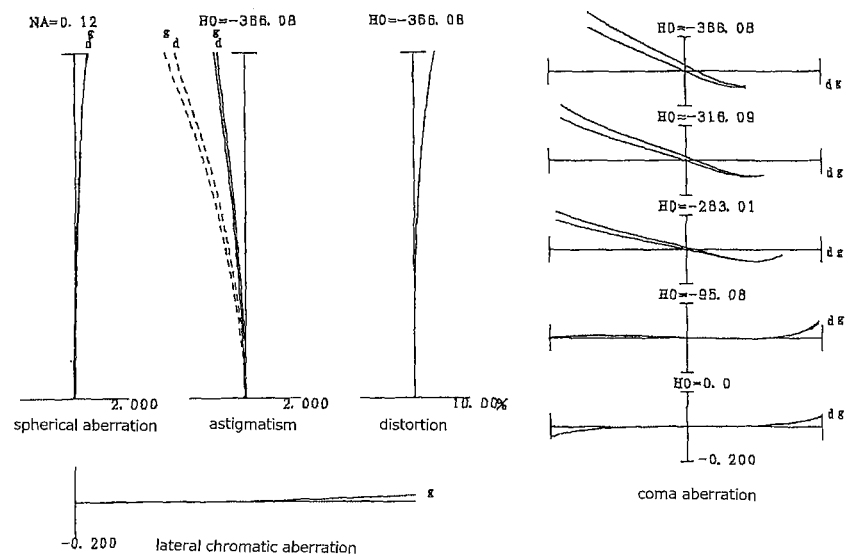
Figure 24C:
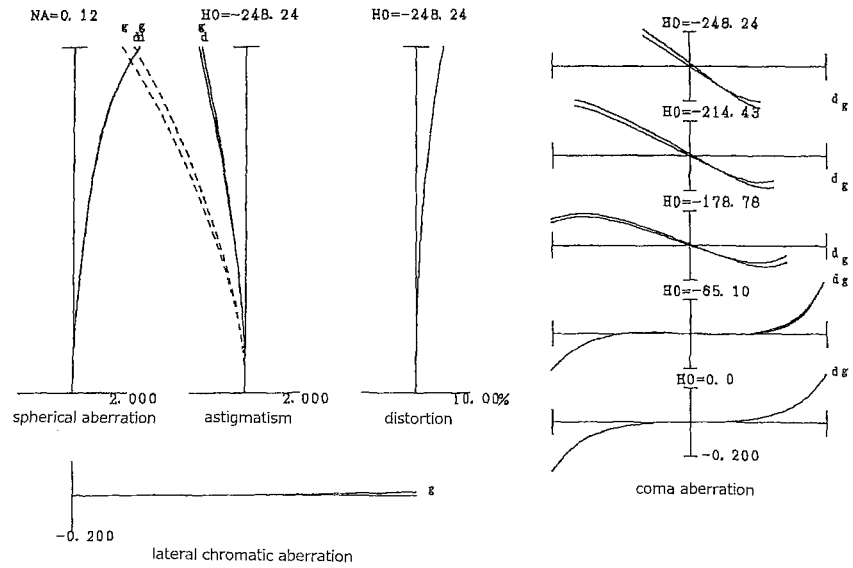

FIG. 24A, FIG. 24B and FIG. 24C are graphs showing various aberrations upon focusing on a close distance object, respectively, in the wide angle end state, in the intermediate focal length state and in the telephoto end state, of the variable magnification optical system according to the Eighth Example.

As is apparent from the above-mentioned graphs showing aberrations, it is understood that the variable magnification optical system relating to the present Example can correct superbly various aberrations over the wide angle end state to the telephoto end state and has excellent imaging performance, and further has excellent imaging performance even upon focusing on a close distance object.

According to the above described respective examples, it is possible to realize a variable magnification optical system which is compatible with a large-sized imaging device in spite that the optical system is small in size, and which can correct superbly various aberrations upon varying magnification over the wide angle end state to the telephoto end state, and further has excellent imaging performance even upon focusing on a close distance object.

Meanwhile, in the variable magnification optical system according to the present embodiment, a variable magnification ratio is in the range of 2 to 10 times and a 35 mm-size converted focal length in the wide angle end state is in the range of 20 to 30 mm. Further, in the variable magnification optical system according to the present embodiment, an F-number in the wide angle end state is in the range of about f/2.0 to f/4.5, the F-number in the telephoto end state is in the range of about f/2.0 to f/6.3.

Further, each of the above described Examples is a concrete example of the present embodiment, and the present embodiment is not limited to them. The contents described below can be adopted without deteriorating optical performance of the variable magnification optical systems according to the present embodiment.

Although variable magnification optical systems having a five group configuration or a six group configuration were illustrated above as numerical examples of the variable magnification optical systems according to the present embodiment, the present embodiment is not limited to them and variable magnification optical systems having other configurations, such as seven group configuration, or the like, can be configured. Concretely, a configuration that a lens or a lens group is added to the most object side or to the most image side of the variable magnification optical system according to the each of the above described Examples is possible. Alternatively, a lens or a lens group may be added between the first lens group G1 and the second lens group G2. Alternatively, a lens or a lens group may be added between the second lens group G2 and the third lens group G3. Alternatively, a lens or a lens group may be added between the third lens group G3 and the rear lens group GR.

Further, in each of the above described Examples, configurations that the rear lens group GR is composed of the fourth lens group G4 and the fifth lens group G5, or of the fourth lens group G4, fifth lens group G5 and the sixth lens groups G6, were illustrated, but configurations are not limited to them.

Further, in each of the above described Examples, a focusing lens group is composed of one lens group or a part of a lens group, but the focusing lens group may be composed of two or more lens groups. Auto focusing can be applied for such focusing group(s), and drive by motor for auto focusing, such as, ultrasonic motor, stepping motor or VCM motor may be suitably adopted.

Further, in the variable magnification optical systems according to each of the above described Examples, any lens group in the entirety thereof or a portion thereof can be moved in a direction including a component perpendicular to the optical axis as a vibration reduction lens group, or rotationally moved (swayed) in an in-plane direction including the optical axis, whereby a configuration of a vibration reduction can be taken.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical systems according to each of the above described Examples, it is preferable that the aperture stop S is disposed between the second lens group G2 and the third lens group G3. But, the function may be substituted by a lens frame without disposing a member as an aperture stop.

Further, the lens surface(s) of the lenses configuring the variable magnification optical systems according to each of the above described Examples, may be coated with anti-reflection coating(s) having a high transmittance in a wide wavelength region. With this contrivance, it is feasible to reduce a flare as well as ghost and attain excellent optical performance with high contrast.

Next, a camera equipped with the variable magnification optical system according to the present embodiment, will be explained with referring to FIG. 25.

Figure 25:
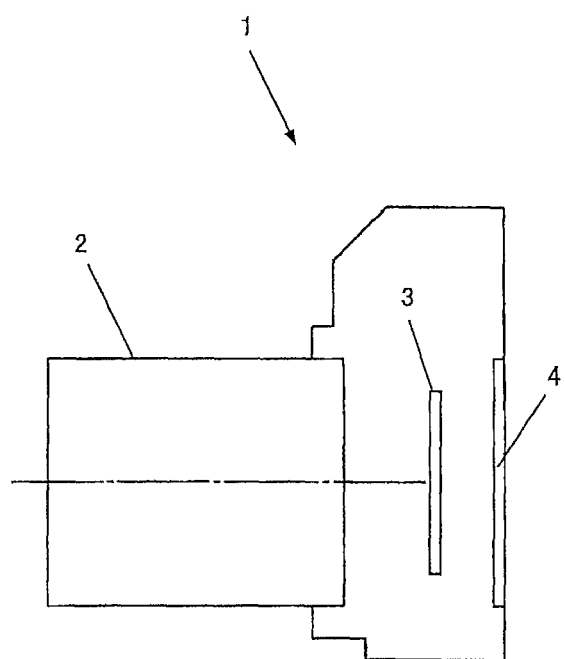
FIG. 25 is a view showing a configuration of a camera equipped with the variable magnification optical system.

FIG. 25 is a view showing a configuration of the camera equipped with the variable magnification optical system according to the present embodiment.

The camera 1 as shown in FIG. 25, is a so-called mirror-less camera of a lens interchangeable type equipped with the variable magnification optical system according to the first Example as an imaging lens 2.

In the present camera 1, a light emitted from an unillustrated object (an object to be photo-taken) is converged by the imaging lens 2, through a unillustrated OLPF (Optical low pass filter), and forms an image of the object on an imaging plane of an image pick-up portion 3. The light from the object is photo-electrically converted through a photo-electric conversion element provided on the image pick-up portion 3 to form a picture image of the object. This picture image is displayed on an EVF (electric view finder) 4 provided on the camera 1. Accordingly, a photographer can observe the object to be photo-taken through the EVF.

Further, upon unillustrated release button being depressed by the photographer, the picture image of the object formed by the image pick-up portion 3 is stored in an unillustrated memory. Thus, the photographer can take a photo of the object.

It is noted here that the variable magnification optical system relating to the First Example in which the present camera 1 is equipped with the imaging lens 2, has superb optical performance as described above and is made small in size. In other words, the present camera 1 can be made small in size and attain superb optical performances that various aberrations can be corrected well from the wide angle end state to the telephoto end state and excellent imaging performance is attained even upon focusing on a close distance object.

Incidentally, when there is configured a camera in which the variable magnification optical system according to any of the before-mentioned Second to Eighth Examples is installed as the imaging lens 2, the camera also can attain the same effects as those of the above-mentioned camera 1. Further, even when the variable magnification optical system according to any of the above Examples is installed in a camera of a single lens reflex type equipped with a quick return mirror in which the object image is observed through a finder optical system, the camera also can attain the same effects as those of the above-mentioned camera 1.

Figure 26:
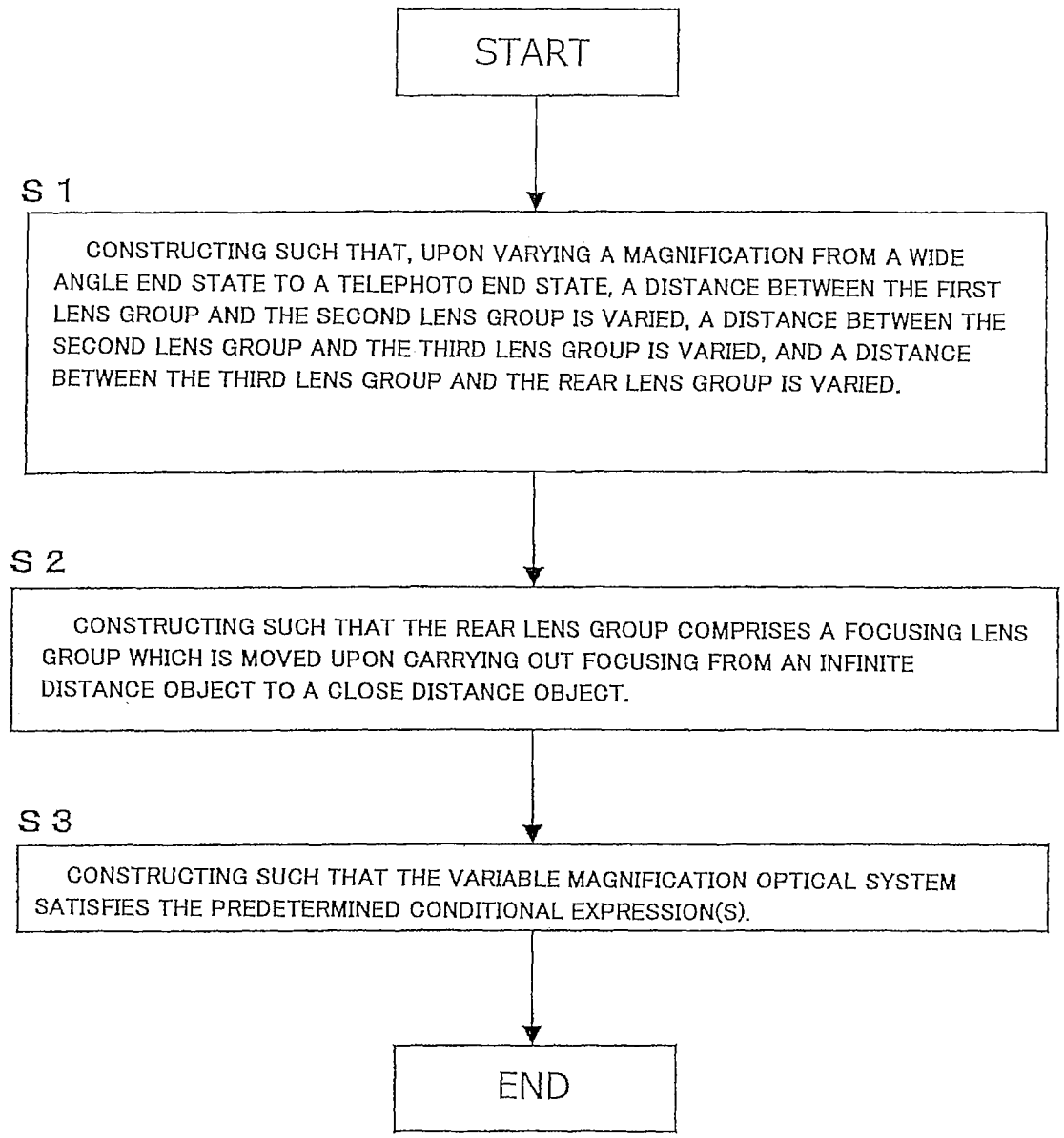
FIG. 26 is a flowchart schematically showing a method for manufacturing the variable magnification optical system.

Next, an outline of a method for manufacturing the variable magnification optical system according to the present embodiment, is described with referring to FIG. 26.

FIG. 26 is a flowchart schematically showing a method for manufacturing the variable magnification optical system according to the present embodiment.

The method for manufacturing the variable magnification optical system according to the present embodiment shown in FIG. 26, is a method for manufacturing a variable magnification optical system which comprises, in order from an object side, a first lens group having positive refractive power, a second lens group having negative refractive power, a third lens group having positive refractive power and a rear lens group having positive refractive power; the method comprising the following steps S1 to S3:

Step S1: constructing such that, upon varying a magnification from a wide angle end state to a telephoto end state, a distance between the first lens group and the second lens group is varied, a distance between the second lens group and the third lens group is varied, and a distance between the third lens group and the rear lens group is varied.

Step S2: constructing such that the rear lens group comprises a focusing lens group which is moved upon carrying out focusing from an infinite distance object to a close distance object.

Step S3: constructing such that the variable magnification optical system satisfies the following conditional expressions (1) and (2):

$$-1.00 < f3/f3r < -0.0500 \quad (1)$$

$$0.100 < BFw/fw < 1.00 \quad (2)$$

where f3f denotes a focal length of a most image plane side negative lens component in the third lens group; f3r denotes a composite focal length of lens components disposed on a side which is closer to the object than the most image plane side negative lens component, in the third lens group; BFw denotes aback focus of the variable magnification optical system in a wide angle end state; and fw denotes a focal length of the variable magnification optical system in the wide angle end state.

According to the above-stated method for manufacturing the variable magnification optical system according to the present embodiment, it is possible to realize a variable magnification optical system, while being downsized, is compatible with a large-sized imaging device, and which can attain superb optical performances that various aberrations can be corrected well over from the wide angle end state to the telephoto end state and excellent imaging performance is attained even upon focusing on a close distance object.

EXPLANATION OF REFERENCE SYMBOLS

G1 first lens group
G2 second lens group
G3 third lens group
G4 fourth lens group
G5 fifth lens group
G6 sixth lens group
GR rear lens group
S aperture stop
I image plane

What is claimed is:

1. A variable magnification optical system comprising, in order from an object side, a first lens group having positive refractive power, a second lens group having negative refractive power, a third lens group having positive refractive power, and a rear lens group having positive refractive power;
    the rear lens group comprising, in order from the object side, a fourth lens group having positive refractive power and a fifth lens group having negative refractive power;
    upon varying a magnification, a distance between the first lens group and the second lens group being varied, a distance between the second lens group and the third lens group being varied, a distance between the third lens group and the fourth lens group being varied, and a distance between the fourth lens group and the fifth lens group being varied;
    the rear lens group comprising a focusing lens group which is moved upon carrying out focusing;
    the fifth lens group consisting of one lens component constituted by a single lens or a cemented lens composed of a plurality of lenses cemented together; and
    the following conditional expressions being satisfied:

$4.00 < f1/fw < 6.500$ $0.100 < BFw/fw < 1.00$ $-3.000 < f5/f3 < -0.500$ where f1 denotes a focal length of the first lens group, fw denotes a focal length of the variable magnification optical system in a wide angle end state, BFw denotes a back focus of the variable magnification optical system in the wide angle end state, f3 denotes a focal length of the third lens group, and f5 denotes a focal length of the fifth lens group.

2. A variable magnification optical system according to claim 1, wherein
    the following conditional expression is satisfied:

$4.000 < f1/f1Rw < 9.000$ where f1 denotes a focal length of the first lens group, and f1Rw denotes a composite focal length of all of the lens groups in the wide angle end state disposed on the side which is closer to the image plane than the first lens group.

3. A variable magnification optical system according to claim 2, wherein
    the following conditional expression is satisfied:

$nd3fp < 1.800$ where nd3fp denotes refractive index of a lens having the largest refractive index in the third lens group.

4. A variable magnification optical system according to claim 3, wherein
    the following conditional expression is satisfied:

$40.00° < \omega w < 85.00°$ where $\omega w$ denotes a half angle of view of the variable magnification optical system in the telephoto end state.

5. An optical apparatus comprising a variable magnification optical system according to claim 1.

6. A variable magnification optical system according to claim 1, wherein the rear lens group comprises a sixth lens group having negative refractive power adjacent to the image side of the fifth lens group.

7. A variable magnification optical system comprises, in order from an object side, a first lens group having positive refractive power, a second lens group having negative refractive power, a third lens group having positive refractive power, and a rear lens group having positive refractive power;
    the rear lens group comprising, in order from the object side, a fourth lens group having positive refractive power and a fifth lens group having negative refractive power;
    upon varying a magnification, a distance between the first lens group and the second lens group being varied, a distance between the second lens group and the third lens group being varied, and a distance between the third lens group and the fourth lens group being varied, and a distance between the fourth lens group and the fifth lens group being varied;
    the rear lens group comprising a focusing lens group which is moved upon carrying out focusing;
    the fifth lens group consisting of one lens component constituted by a single lens or a cemented lens composed of a plurality of lenses cemented together; and
    the following conditional expressions being satisfied:

$2.00 < f1/fw < 6.500$ $0.100 < BFw/fw < 0.91$ $-3.000 < f5/f3 < -0.500$ where f1 denotes a focal length of the first lens group, fw denotes a focal length of the variable magnification optical system in a wide angle end state, BFw denotes a back focus of the variable magnification optical system in the wide angle end state, f3 denotes a focal length of the third lens group, and f5 denotes a focal length of the fifth lens group.

8. A variable magnification optical system according to claim 7, wherein
the following conditional expression is satisfied:

$$0.500<1/\beta Rw<1.000$$

where βRw denotes a transverse magnification of lens group disposed at the most image plane side in the wide angle end state.

9. A variable magnification optical system according to claim 7, wherein
the following conditional expression is satisfied:

$$4.000<f1/f1Rw<9.000$$

where f1 denotes a focal length of the first lens group, and f1Rw denotes a composite focal length of all of the lens groups in the wide angle end state disposed on the side which is closer to the image plane than the first lens group.

10. A variable magnification optical system according to claim 7, wherein the rear lens group comprises a sixth lens group having negative refractive power adjacent to the image side of the fifth lens group.

11. An optical apparatus comprising a variable magnification optical system according to claim 7.

12. A variable magnification optical system comprising, in order from an object side, a first lens group having positive refractive power, a second lens group having negative refractive power, a third lens group having positive refractive power, and a rear lens group having positive refractive power;
the rear lens group comprising, in order from the object side, a fourth lens group having positive refractive power and a fifth lens group having negative refractive power;
the rear lens group further comprising a sixth lens group having negative refractive power adjacent to the image side of the fifth lens group;
upon varying a magnification, a distance between the first lens group and the second lens group being varied, a distance between the second lens group and the third lens group being varied, a distance between the third lens group and the fourth lens group being varied, and a distance between the fourth lens group and the fifth lens group being varied;
the rear lens group comprising a focusing lens group which is moved upon carrying out focusing;
the fifth lens group consisting of one lens component constituted by a single lens or a cemented lens composed of a plurality of lenses cemented together; and
the following conditional expressions being satisfied:

$$4.00<f1/fw<6.500$$

$$0.100<BFw/fw<1.00$$

where f1 denotes a focal length of the first lens group, fw denotes a focal length of the variable magnification optical system in a wide angle end state, and BFw denotes a back focus of the variable magnification optical system in the wide angle end state.

13. An optical apparatus comprising a variable magnification optical system according to claim 12.

14. A method for manufacturing a variable magnification optical system which comprises, in order from an object side, a first lens group having positive refractive power, a second lens group having negative refractive power, a third lens group having positive refractive power and a rear lens group having positive refractive power;
the method comprising the following steps:
constructing such that the rear lens group comprises, in order from the object side, a fourth lens group having positive refractive power and a fifth lens group having negative refractive power;
constructing such that, upon varying a magnification, a distance between the first lens group and the second lens group is varied, a distance between the second lens group and the third lens group is varied, a distance between the third lens group and the fourth lens group is varied, and a distance between the fourth lens group and the fifth lens group is varied;
constructing such that the rear lens group comprises a focusing lens group which is moved upon carrying out focusing; and
constructing such that the fifth lens group consists of one lens component constituted by a single lens or a cemented lens composed of a plurality of lenses cemented together,
the method further comprising one of the following steps (A), (B), and (C):
(A) satisfying the following conditional expressions:

$$4.00<f1/fw<6.500$$

$$0.100<BFw/fw<1.00$$

$$-3.000<f5/f3<-0.500$$

(B) satisfying the following conditional expressions:

$$2.00<f1/fw<6.500$$

$$0.100<BFw/fw<0.91$$

$$-3.000<f5/f3<-0.500$$

(C) constructing such that the rear lens group further comprises a sixth lens group having negative refractive power adjacent to the image side of the fifth lens group, and
satisfying the following conditional expressions:

$$4.00<f1/fw<6.500$$

$$0.100<BFw/fw<1.00$$

where f1 denotes a focal length of the first lens group, fw denotes a focal length of the variable magnification optical system in a wide angle end state, BFw denotes a back focus of the variable magnification optical system in the wide angle end state, f3 denotes a focal length of the third lens group, and f5 denotes a focal length of the fifth lens group.

* * * * *